Dec. 3, 1946. F. KESSLER Re 22,813

TELEPHONE SYSTEM

Original Filed Feb. 3, 1938 10 Sheets-Sheet 1

INVENTOR.
FRANK KESSLER
BY
ATTORNEY.

Dec. 3, 1946. F. KESSLER Re 22,813

TELEPHONE SYSTEM

Original Filed Feb. 3, 1938 10 Sheets-Sheet 2

INVENTOR.
FRANK KESSLER

BY Chas. W. Candy.
ATTORNEY.

TELEPHONE SYSTEM

Original Filed Feb. 3, 1938 10 Sheets-Sheet 3

INVENTOR.
FRANK KESSLER

BY Chas. W. Candy
ATTORNEY.

Dec. 3, 1946. F. KESSLER Re 22,813

TELEPHONE SYSTEM

Original Filed Feb. 3, 1938 10 Sheets-Sheet 4

INVENTOR.
FRANK KESSLER

BY Chas. W. Candy.
ATTORNEY.

TELEPHONE SYSTEM

Original Filed Feb. 3, 1938 10 Sheets-Sheet 5

INVENTOR.
FRANK KESSLER

BY Chas. Ro. Candy.
ATTORNEY.

TELEPHONE SYSTEM

Original Filed Feb. 3, 1938 10 Sheets-Sheet 6

INVENTOR.
FRANK KESSLER
BY
Chas. H. Carly
ATTORNEY.

Dec. 3, 1946. F. KESSLER Re 22,813

TELEPHONE SYSTEM

Original Filed Feb. 3, 1938 10 Sheets-Sheet 7

INVENTOR.
FRANK KESSLER

BY Chas. W. Cooley

ATTORNEY.

Dec. 3, 1946. F. KESSLER Re 22,813

TELEPHONE SYSTEM

Original Filed Feb. 3, 1938 10 Sheets-Sheet 8

INVENTOR.
FRANK KESSLER

BY Chas. Th. Candy
ATTORNEY.

Dec. 3, 1946. F. KESSLER Re 22,813
TELEPHONE SYSTEM
Original Filed Feb. 3, 1938 10 Sheets-Sheet 9
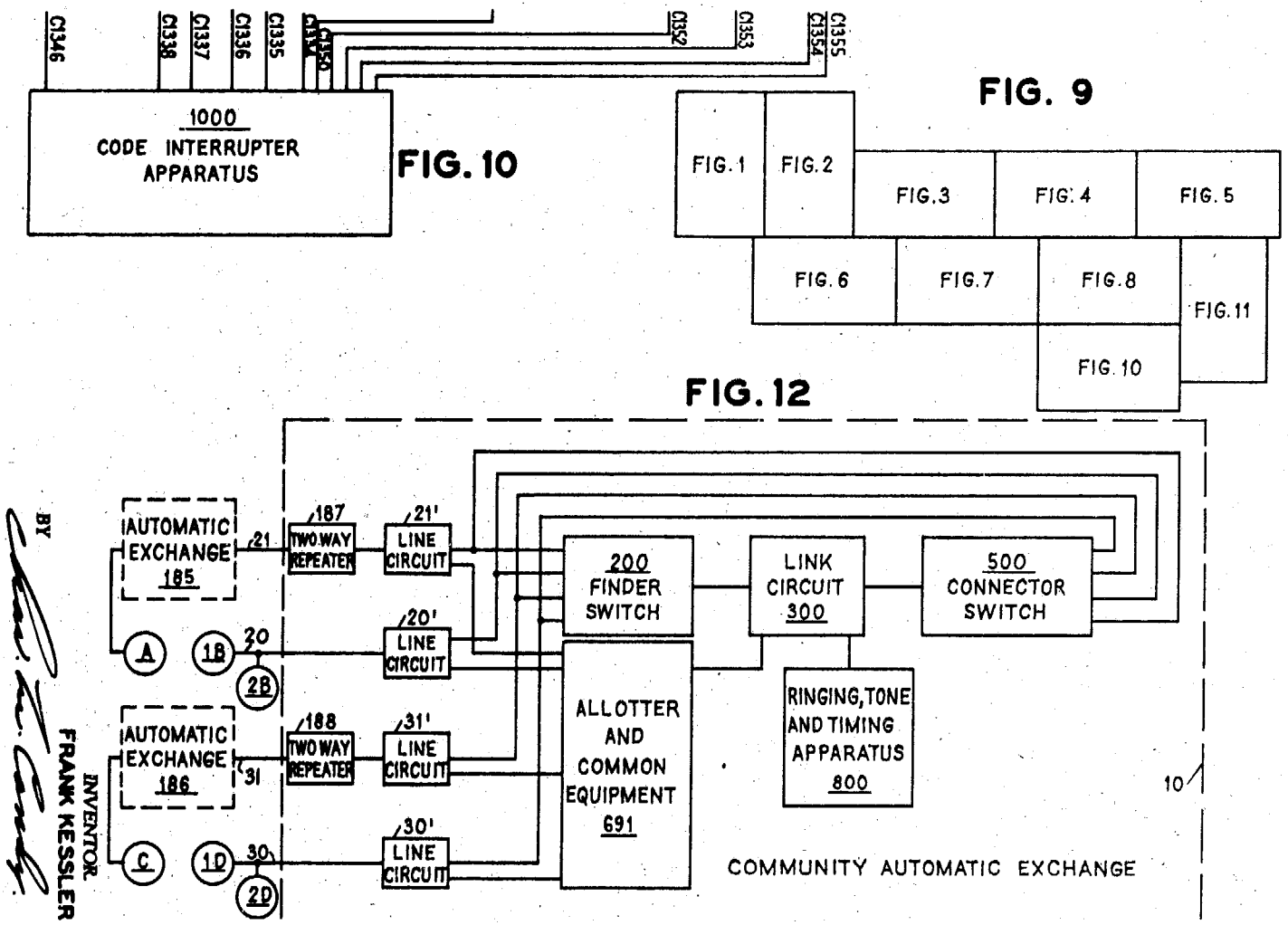
INVENTOR
FRANK KESSLER
BY
ATTORNEY.

TELEPHONE SYSTEM

Original Filed Feb. 3, 1938 10 Sheets-Sheet 10

INVENTOR.
FRANK KESSLER

BY Chas. Tu. Landy
ATTORNEY.

Reissued Dec. 3, 1946

Re. 22,813

UNITED STATES PATENT OFFICE 22,813

TELEPHONE SYSTEM

Frank Kessler, Lombard, Ill., assignor to Automatic Electric Laboratories, Inc., a corporation of Delaware Original No. 2,177,069, dated October 24, 1939, Serial No. 188,443, February 3, 1938. Application for reissue January 25, 1943, Serial No. 473,545

38 Claims. (Cl. 179—18)

Figure 1:
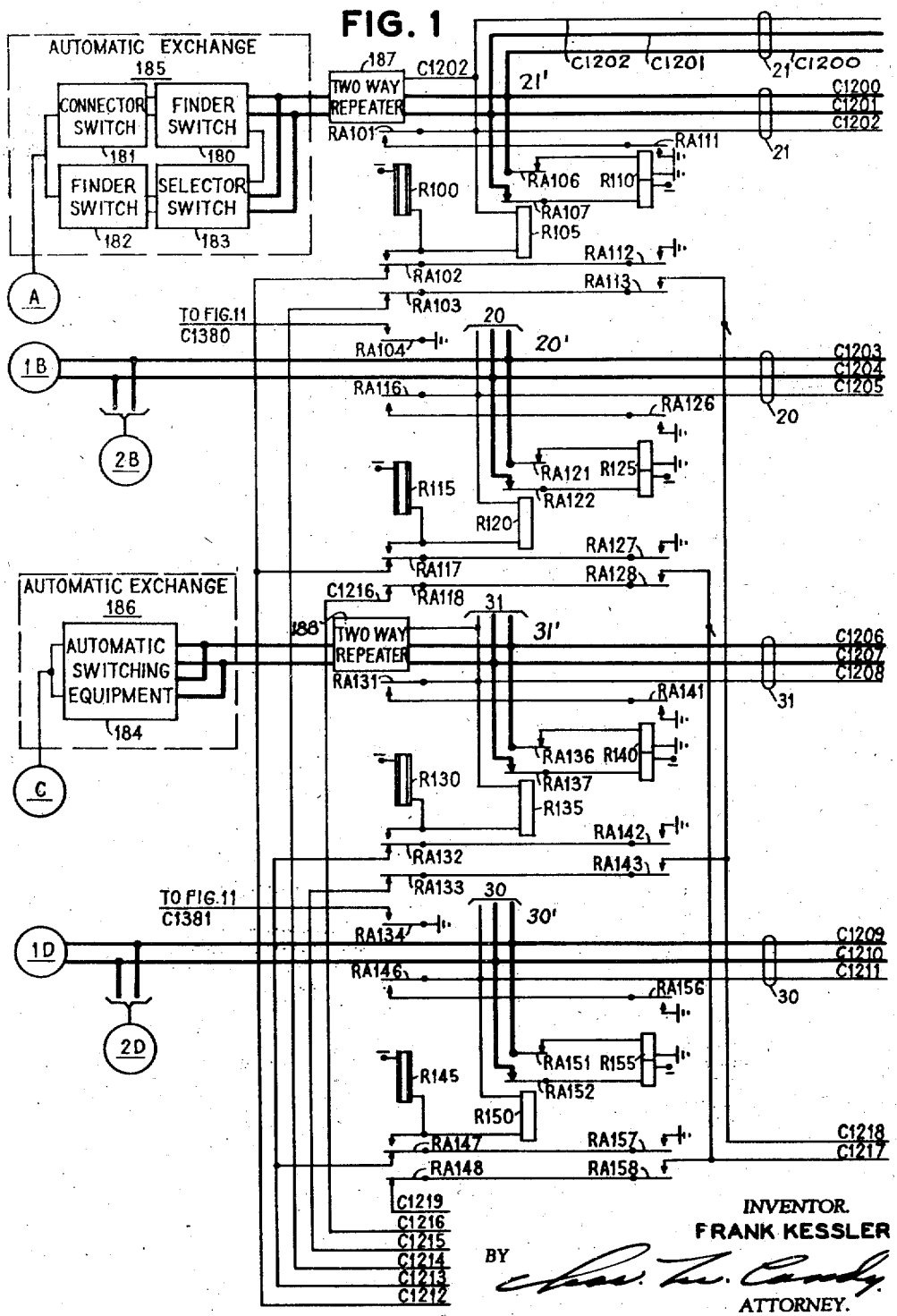

The present invention relates to telephone systems and more particularly to small automatic telephone systems of the type adapted for installation in small towns or villages.

An automatic telephone system of the character noted is generally known as a community automatic exchange or C. A. X and usually has a line capacity of one hundred lines or less. For reasons of economy, the lines are usually of the multi-party type and code ringing is utilized for selectively signaling the telephone stations on the various subscriber lines. In order to provide toll service to the subscribers, provisions are also made for trunking calls to and from one or more distant exchanges. One improved all-relay telephone exchange of this type is disclosed and claimed in the copending application Serial No. 86,046 (Norman H. Saunders), filed June 19, 1936.

In brief, in the system as disclosed in the above-mentioned Saunders application, the subscriber and trunk lines extend to the finder and connector switches of each of a plurality of all-relay finder-connector links, common equipment including a relay type link distributor or allotter being provided for assigning idle ones of the links to successive calling lines in a predetermined order. The finder switches of the various links are semi-directive in character; that is, it is necessary to hunt for the calling line in a previously marked group of lines during the operation of a link to seize the calling line. Although this arrangement is entirely satisfactory from an operating standpoint, a substantial interval of time is consumed by the finder switch in hunting the calling line in the previously marked group of lines. Provisions are also made in the system of the Saunders application for testing a selected line to determine the idle or busy condition thereof, for applying busy tone current to a calling line in the event the selected called line is busy, and for applying coded ringing current to a called multi-party subscriber line in the event the selected called line is idle in order to signal a particular telephone station connected thereto.

It is an object of the present invention to provide, in a telephone system of the character noted, an improved line finder switch of the all-relay type which requires a minimum number of relays both in the switch itself and in the associated common equipment.

It is another object of the invention to provide, in a telephone system of the character noted, an improved line finder switch of the all-relay type which is fully directive in character.

Another object of the invention is to provide in a telephone system including a plurality of finder switches, improved allotter or distributor equipment associated with the finder switches for assigning in a predetermined order idle ones of the finder switches to the use of calling lines.

A further object of the invention is to provide allotter or distributor equipment associated with the finder switches of a telephone system which is operable to assign an idle one of the finder switches to the use of the next calling line immediately after a previously assigned one of the finder switches selects a calling line and to prevent the assignment of the previously assigned finder switch as long as the selected calling line is busy, and an improved arrangement responsive to a fault in one of the finder switches for causing operation of the allotter or distributor equipment to prevent the assignment of the one finder switch.

Another object of the invention is to provide in a telephone system, a numerical switch having access to a plurality of trunk and subscriber lines, and including improved apparatus selectively controlled in accordance with different relations between the line selecting digits for causing the operation of the numerical switch to provide trunk and subscriber line selectiton.

A further object of the invention is to provide in a numerical switch having access to a group of lines including subscriber and trunk lines an improved arrangement for causing operation of the switch to select a particular one of the subscriber lines or for causing operation of the switch to select a previously selected idle one of the trunk lines, and improved apparatus responsive to the selection of the one trunk line for immediately selecting another idle one of the trunk lines for use.

The features of the present invention are illustrated as being incorporated in a telephone exchange having an ultimate capacity of one hundred lines. The lines are arranged in a plurality of groups of ten lines each of which is individually divided into two subgroups of five lines each, certain of the lines being two-way inter-office trunk lines, others of the lines being private exchange or P. B. X trunk lines, and the remainder of the lines being subscriber lines. The various lines individually terminate in line circuits which are connected in the same manner regardless of whether a line is a trunk or a subscriber line. The telephone exchange also includes a plurality of finder-connector links which individually have access to the lines, and allotter or distributor apparatus for assigning, in a predetermined order, idle ones of the links to the use of the calling lines.

In accordance with one feature of the invention, each of the finder switches includes a plurality of group relays, a group of unit relays, and a subgroup relay, each of the group relays being operative to select a corresponding group of lines, and each of the unit relays being operative to select a corresponding line from each of the subgroups, depending upon the operated or non-operated condition of the subgroup relay. More specifically, each group of lines is divided into two subgroups respectively comprising odd and even numbered lines and the arrangement is that, when a call is initiated on an odd line, the corresponding group and unit relays operate, without operating the subgroup relay, in the finder switch of the assigned link to select the odd calling line. On the other hand, when a call is initiated on an even line, the corresponding group and unit relays and the subgroup relay operate in the finder switch of the assigned link to select the even calling line. This arrangement reduces the number of unit relays required in each finder switch by approximately one-half and results in a considerable reduction in the manufacturing cost of the finder switches.

In accordance with a further feature of the invention, the group relay and the unit relay in a finder switch of an assigned link are arranged to operate substantially simultaneously to select a line in one of the subgroups; and the group relay, the unit relay and the subgroup relay in the finder switch of an assigned link are arranged to operate substantially simultaneously to select a line in the other of the subgroups. This is accomplished by providing common equipment for controlling the operation of a control relay provided in each of the finder switches. More particularly, the common equipment comprises a group of first auxiliary relays individually corresponding to a particular group of lines and to a particular group relay in each finder switch, a group of second auxiliary relays individually corresponding to a particular line in each subgroup of lines and to a particular unit relay in each finder switch, and a third auxiliary relay corresponding to one of the subgroups in each group of lines and to the subgroup relay in each finder switch. With this arrangement and when a call is initiated on a particular line in one of the subgroups, the corresponding first and second auxiliary relays in the common equipment are operated and cause the corresponding group and unit relays in the finder switch of the assigned link to be conditioned to be operated. Also, the second auxiliary relay in the common equipment causes the operation of the control relay provided in the finder switch of the assigned link, which latter relay causes the previously conditioned group and unit relays in the finder switch of the assigned link to operate substantially simultaneously, thereby to select the calling line. When a call is initiated on a line in the other of the subgroups, the corresponding first and second auxiliary relays and the third auxiliary relay in the common equipment are operated. The first and second auxiliary relays in the common equipment condition the corresponding group and unit relays in the finder switch of the assigned link to be operated, and the third auxiliary relay in the common equipment conditions the subgroup relay in the finder switch of the assigned link to be operated. Also, the second auxiliary relay in the common equipment causes the operation of the control relay of the finder switch of the assigned link, which latter relay causes the previously conditioned group, unit and subgroup relays in the finder switch to select the calling line. This arrangement renders the finder switch fully directive and reduces the time required in extending a connection fom a calling line to an idle link.

For the purpose of assigning, in a predetermined order, idle ones of the finder switches to the use of calling lines, there is provided, in association with the several links, allotter or distributor equipment including a group of allotter relays individually corresponding to the links. In accordance with a further feature of the invention, each of the allotter relays is provided with operating and holding circuits for energizing the same, and circuits controlled by the operation of the allotter relay also being provided for assigning idle ones of the finder switches to the use of the lines having a calling condition thereon, and for preventing the assignment of the corresponding finder switch to the use of the lines having a calling condition thereon. More particularly, the arrangement is such that when one of the finder switches operates to select a line having a calling condition thereon, the operating circuit of the corresponding allotter relay is completed. Upon operating, the allotter relay completes its holding circuit, assigns an idle one of the finder switches to the use of the next line having a calling condition thereon, and prevents the assignment of the corresponding finder switch to the use of lines having a calling condition thereon. Idle ones of the finder switches are operated successively until the last finder switch in the group is taken for use by a calling line. At this time the holding circuits of all of the allotter relays are interrupted and those allotter relays corresponding to idle finder switches restore to recycle the idle finder switches for use by the lines having a calling condition thereon.

In accordance with a still further feature of the invention, an arrangement is provided in association with each of the allotter relays for operating the same in response to the presence of a fault in the corresponding finder switch, in order to prevent the assignment of the corresponding finder switch to the use of one of the lines having a calling condition thereon. More specifically, each of the allotter relays is provided with an additional operating circuit for energizing the same, which is controlled by a fault detector comprising a fuse link individual to the corresponding finder switch. When a fault appears in one of the finder switches, the fuse link individual thereto is operated or blown, causing the additional operating circuit of the corresponding allotter relay to be completed. Upon operating, the corresponding allotter relay prevents the assignment of the finder switch having a fault therein to the use of one of the lines having a calling condition thereon.

In accordance with another feature of the invention, each numerical or connector switch of each link is provided with apparatus, including a group of impulse counting relays for causing operation of the numerical switch to provide trunk and subscriber line selection in an improved manner. More particularly, the apparatus is responsive to a predetermined digit and a predetermined digit following the first-mentioned digit for causing the operation of the switch to select a particular subscriber line, and is responsive to the first-mentioned digit and a different predetermined digit following the first-mentioned digit for causing the operation of the switch to select an idle one of a certain group of trunk lines.

In accordance with a still further object of the invention, an improved arrangement is provided in conjunction with the last-mentioned group of trunk lines for assigning idle ones of the trunk lines to be selected by the numerical switches in a predetermined order. This arrangement is such that an idle one of the trunk lines is assigned for the use of the numerical switches immediately following the seizure of a previously selected one of the trunk lines by one of the numerical switches.

Further features of the invention pertain to a particular arrangement of the circuit elements whereby the above-outlined and additional operating features are attained.

The novel features believed to be characteristic of the invention are set forth in the appended claims. The invention, both as to its organization and method of operation, together with further objects and advantages thereof, will best be understood by reference to the specification, taken in connection with the accompanying drawings, in which Figure 12 illustrates the general arrangement of a system embodying one form of the present invention; Fig. 9 illustrates the mode of combining the remaining figures of the drawings to form a unified system; and Figs. 1 to 8, inclusive, 10 and 11, illustrate the details of a system having incorporated therein the features of the invention as briefly outlined above.

Referring now more particularly to Fig. 12 of the drawings the telephone system there illustrated comprises a small community automatic exchange 10, a second automatic exchange 185, and a third automatic exchange 186. The exchanges 185 and 186, respectively, are connected to the exchange 10 by first and second groups, respectively, of two-way inter-office trunk lines. One of the first group of inter-office trunk lines is indicated at 21 as terminating at a repeater 187; and one of the second group of inter-office trunk lines is indicated at 31 as terminating at a repeater 188, the repeaters 187 and 188 forming parts of the apparatus located at the exchange 10. Also extending to the exchange 10 are two groups of private branch exchange or P. B. X trunk lines, not shown, which are accessible to the finder and connector switches of the links included in the exchange 10. Also extending to the exchange 10 are a plurality of subscriber lines, two of which are indicated at 20 and 30. Each of the enumerated subscriber lines is illustrated as being of the multi-party type having two or more telephone stations associated therewith. Thus, two telephone stations, 1B and 2B are diagrammatically shown as being connected to the line 20, and two additional stations, 1D and 2D, are diagrammatically shown as being connected to the line 30. Each of the substations connected to the various subscriber lines may comprise the usual hand set having embodied therein a conventional dial-controlled impulsing device. Each of the lines extending to the exchange 10 terminates in a line circuit through which it is rendered accessible to the finder and connector switches of the links included in the exchange. Thus, the line 20 terminates at a line circuit 20', through which it is connected to the contact springs of a finder switch 200 and to the contact springs of the connector switch 500 which two switches are connected together by link lines to form a finder-connector link. Similarly, the line 30 terminates at a line circuit 30'; and the illustrated two-way trunk lines 21 and 31 interconnecting the exchange 10 and the exchanges 185 and 186, respectively, terminate at line circuits 21' and 31', respectively.

As many as ten telephone stations may be connected to each multi-party subscriber line, these telephone stations being arranged in two groups comprising five telephone stations each. The signals or ringers of one of the groups of telephone stations are connected between one side of the subscriber line and ground, while the ringers of the other group of telephone stations are connected between the other side of the subscriber line and ground, thereby providing an arrangement utilizing divided ringing.

As indicated above, the exchange 10 is designed to serve a relatively small number of lines comprising two groups of inter-office trunk lines, two groups of P. B. X trunk lines, and a plurality of subscriber lines, these lines being arranged in ten groups of ten lines each. Accordingly, all of the trunk and subscriber lines are arranged to be served by any one of a plurality of finder-connector links included in the exchange 10. Obviously, the number of links required for satisfactory service will depend upon the volume of telephone traffic, but, taking into account the character of the exchange, ten links are considered adequate for reasonably good service. In order to assign the links to successive calling lines in a predetermined order, so that a link is always available for the use of a calling line, excepting, of course, those instances when all of the links are simultaneously busy, there is provided in association therewith common equipment indicated at 691 which includes a link distributor or allotter. The several links also have associated therewith common, ringing tone and timing apparatus which is diagrammatically shown at 800.

The operation of the system to extend a call initiated at any one of the telephone stations to another of the telephone stations is described briefly below, neglecting the details of the circuit arrangement. In extending a call initiated at one of the telephone stations to one of the telephone stations connected to a subscriber line included in the second, third, fourth, fifth, sixth or seventh group of ten lines, a corresponding tens digit, a corresponding units digit and a corresponding code ringing digit are dialed, in the order named, at the telephone station when the call is initiated. For example, when a subscriber at the telephone station 1B connected to the line 20 initiates a call, by lifting his receiver from its switch hook, which is to be extended to the telephone station 1D connected to the subscriber line 30, or the tenth line in the third group of ten lines, the line circuit 20' operates to cause the finder-connector link previously assigned by the link distributor or allotter in the common equipment 691 to the calling line, to be set into operation to seize the calling line. Assuming that the link 300 is assigned by the link distributor to set up the connection, the finder switch 200 of the link operates to select the calling line and to connect it through to the conductors of the link line incoming to the connector switch 500 of the link. When the calling line 20 is seized and extended by way of the finder switch 200 to the associated switch 500, it is marked as busy in all of the other connector switches of the links, and the control equipment of the seized link is automatically conditioned to respond to the impulses of the first digit transmitted from the impulsing device provided at the calling telephone station 1B. Since the subscriber lines are of the multi-party type, provisions are made for selectively signaling the desired called telephone station on any selected subscriber line. With the arrangement to be described more in detail hereafter, coded ringing is utilized to accomplish this end.

The connector switch 500 of the link 300 responds to the impulses of the tens digit 3 dialed at the calling telephone station by selecting the third group of ten lines which includes the called line 30. Thereafter, and in response to the dialing of the units digit 0, the called line 30 is selected from the selected group of ten lines. When the called line is selected, the control apparatus included in the link circuit functions to test this line for the purpose of determining the busy or idle condition thereof. If the called line is busy, busy tone current is applied to the link line and returned over the loop to the calling telephone station to indicate to the party at the calling telephone station that the desired connection cannot immediately be completed.

On the other hand, if the called line is idle at the time it is selected, the code selecting or ringing digit which is dialed at the calling telephone station, causes a selected coded ringing current to be applied to the side of the line to which the ringer of the telephone station 1D is connected, the code of the selected ringing current corresponding to the called telephone station 1D. While each of the ringers of the telephone stations included in the group of telephone stations with the telephone station 1D are operated, the character of the code ring indicates that the telephone station 1D is the telephone station being called. During the ringing operation, ring-back tone current is applied to the loop extending to the calling telephone station to indicate to the party at this station that the desired called telephone station is being signaled.

Finally, a connection between the calling and called telephone stations is completed when the call is answered at the called telephone station 1D. As pointed out with particularity hereinafter, the arrangement of the link circuit apparatus is such that a link utilized in setting up a desired connection is released only when the connection is cleared out at the calling telephone station.

In extending a call initiated at one of the telephone stations to one of the telephone stations connected to a subscriber line included in the first, eighth, ninth or tenth group of ten lines, a predetermined prefix digit, a corresponding tens digit, a corresponding units digit, and a corresponding code ringing digit are dialed, in the order named, at the telephone station initiating the call. For example, when a subscriber at the telephone station 1B initiates a call, by lifting his receiver from its switch hook, which is to be extended to a telephone station connected to a particular subscriber line included in the first group of ten lines, the line circuit 20' operates and causes the finder switch of a previously assigned finder-connector link to be operated to seize the calling line, as previously explained. When the predetermined prefix digit is dialed at the calling telephone station 1B, the seized link is conditioned to operate its connector switch to select the first, eighth, ninth or tenth groups of ten lines. Thereafter the connector switch responds to the tens digit 1 dialed at the calling telephone station by selecting the first group of ten lines. Thereafter the connector switch responds to the dialing of the units digit, corresponding to the particular subscriber line to which the called telephone station is connected, to select the called subscriber line from the selected group of ten lines. The operation of the system to test the selected line for the purpose of determining the busy or idle condition thereof and to apply busy tone current to the link line in the event that the selected line is busy is the same as that previously described. Also, the system operates, as described above, to cause a selected coded ringing current, corresponding to the called telephone station, to be applied to the side of the line to which the ringer of the called telephone station is connected upon dialing the code selecting digit at the calling telephone station 1B. A connection between the calling telephone station 1B and the called telephone station connected to the particular line in the first group of ten lines is completed when the call is answered at the called telephone station.

The switching apparatus located in the exchange 10 may also be utilized in setting up a connection between two telephone stations connected to the same subscriber line, the sole function of the apparatus in this regard being that of selecting and applying ringing current to the calling line of the proper code to signal a party at the called telephone station. Carrying out this function necessitates the seizure of the calling line by an idle link, in the manner described above. Thereafter, and following the dialing of the digits of the directory number of the called telephone station at the calling telephone station, the calling party replaces his receiver upon its switch hook. When the calling party hangs up, the finder switch of the operated link is released and ringing current of the selected code corresponding to the called telephone station is applied to the calling line. When the call is answered, the operated link is released and the line circuit of the line in service is operated to busy the line, thereby to prevent seizure of the line by the connector switch of another link when another telephone station initiates a call to be extended to one of the telephone stations on the line. A reasonable time after the calling party hangs up he removes the receiver from its switch hook to converse with the party at the called telephone station. Finally, the line circuit of the line in use is released when the connection is cleared out at the calling and called telephone stations.

As heretofore pointed out, the inter-office trunk lines are arranged in two groups. More specifically, the first group is included in the second group of ten lines, and the second group is included in the third group of ten lines. In the operation of the link to select one of the first group of inter-office trunk lines including the line 21 interconnecting the exchange 10 and the exchange 185, only one predetermined digit "X" comprising a predetermined number of impulses is dialed at the calling telephone station. The connector switch of the seized link responds to the impulses of this one digit to select a previously assigned idle one of the first group of trunk lines. More specifically, these inter-office trunk lines have associated therewith apparatus for setting up idle ones of the lines for selection by the connector switches, which apparatus functions to assign an idle line for use immediately after a previously assigned line is taken for use. Hence, at the conclusion of the predetermined trunk selecting digit dialed at a calling telephone station, the connector switch of the seized link immediately operates to select the previously assigned idle trunk line. When the trunk line is selected, the calling line is switched through by way of the selected trunk line and its associated repeater circuit to the terminating apparatus located in the exchange 185. In this connection, it is pointed out that two sets of link line conductors are provided in the link circuit of each link, one set of which is devoid of all voice frequency coupling elements such, for example, as condensers or repeating coils, and is utilized in extending a connection by way of one of the trunk lines. Following the extension of the connection to the trunk line terminating apparatus located in the exchange 185, the connection may further be extended to a desired called telephone station such, for example, as the telephone station A, by dialing the regular directory number corresponding to the line to which the telephone station A is connected. The manner in which the connection is released following the establishment of a connection to the telephone station A depends upon the nature of the repeater circuit associated with the trunk line which is used in setting up the connection.

Since the trunk lines interconnecting the exchanges 10 and 185 are of the two-way type, it will be understood that any one of these lines of the switching apparatus included in the exchange 10 may be utilized in the completion of calls originating or extended by way of the exchange 185, and which are to be extended to one of the subscriber lines terminating at the exchange 10. The mode of operation of the equipment in the exchange 10 following the extension of a call thereto by way of one of the lines in the first group of trunk lines is substantially similar to that set forth with reference to the connection established between the telephone stations 1B and 1D.

In the operation of the link to select one of the second group of inter-office trunk lines including the line 31 interconnecting the exchange 10 and the exchange 186, only one different predetermined digit "X" comprising a predetermined different number of impulses is dialed at the calling telephone station. The operation and arrangement of this apparatus for selecting an idle one of the trunk lines in the second group of inter-office trunk lines are otherwise the same as that of the apparatus for selecting an idle one of the trunk lines in the first group of inter-office trunk lines, as described above.

As heretofore pointed out, the P. B. X trunk lines are arranged in two groups. The first group is included in the ninth group of ten lines, and the second group is included in the tenth group of ten lines. To select an idle one of the first group of P. B. X trunk lines, the number "P, X, Y, R" is dialed at the calling telephone station, the digits P, X and Y being different in character and the digit R being any desired ringing digit. More specifically, the number 8911 is dialed at the calling telephone station. When the prefix digit 8 is dialed, the seized link is conditioned to operate its connector switch to select the first, eighth, ninth or tenth group of ten lines. Thereafter the connector switch responds to the tens digit 9 to select the ninth group of ten lines. Thereafter the connector switch responds to the units digit 1 to select a previously assigned idle one of the first group of P. B. X trunk lines. More specifically, the first group of P. B. X trunk lines have associated therewith apparatus for setting up idle ones of the lines to be selected, which functions to assign an idle trunk line for use immediately after a previously assigned trunk line is taken for use. Dialing of the ringing digit 1 causes coded ringing current corresponding to the code ringing digit 1 to be applied to the selected P. B. X trunk line in order to signal the operator at the private branch exchange connected thereto. A connection between the calling telephone station and the operator's station at the private branch exchange is completed when the call is answered at the operator's station.

As indicated above, only a portion of the lines of the ninth group are P. B. X trunk lines, the remaining lines of this group being subscriber lines. The connector switch arrangement is such that when the digits P, X, and X or Z are dialed into one of the connector switches one of the subscriber's lines of the ninth line group is selected. For example, if the number 899 or the number 896 is dialed at a calling telephone station the connector switch of the assigned link responds by selecting the particular subscriber line of the ninth line group corresponding to the units digit 9 or 6.

In order to select an idle one of the second group of P. B. X trunk lines the number 8011 is dialed at the calling telephone station. The operation and arrangement of this apparatus for selecting an idle one of the second group of P. B. X trunk lines are otherwise the same as that of the apparatus for selecting an idle one of the first group of P. B. X trunk lines described above.

Considering now in greater detail the apparatus embodied in the exchange 10 and involved in the above-described sequence of operations, and referring to Figs. 1 to 8, inclusive, 10 and 11 of the drawings, there are illustrated the elements of the line circuits 21', 20', 31', and 30' terminating the lines 21, 20, 31 and 30, respectively, the elements of the finder-connector link 300, and the elements of the distributor and common equipment 691. There are also diagrammatically illustrated those portions of the ringing, tone and timing apparatus 800 which are essential to an understanding of the operation of the system. The line circuits individually terminating the subscriber and trunk lines are of more or less conventional arrangement. More particularly, the line circuit 20' terminating the subscriber line 20, comprises a line relay R125, a cut-off relay R120, and a line lock-out relay R115 connected and arranged to operate in the usual manner. The corresponding relays of the line circuit 30' terminating the subscriber line 30 are indicated at R155, R150, and R145, respectively.

The line circuits individually terminating the respective trunk lines are identical in character and circuit arrangement. More particularly, the line circuit 21' terminating the inter-office trunk line 21 comprises a line relay R110, a cut-off relay R105, and a line lock-out relay R100. The corresponding relays of the line circuit 31' terminating the inter-office trunk line 31 are indicated at R140, R135 and R130.

Each of the finder switches is of the fully directive all relay type, group and unit relays being provided for performing the line selecting functions. The lines terminating at each finder switch are arranged in groups of ten lines and the lines of each group terminate at the contact springs of one group or gang relay. More particularly, the finder switch 200 comprises ten group or gang relays corresponding to and including the two relays R270 and R280 individually having contact springs for terminating the conductors of ten lines. While the group relays may be of any desired commercial type having the required number of contact springs, preferably these relays are of the improved form disclosed and claimed in the copending application Serial No. 109,813, Herbert F. Obergfell, filed November 9, 1936. The lines of each group are divided into two equal subgroups respectively comprising the odd numbered lines and the even numbered lines, and, through the provision of a subgroup relay in each finder switch, a group of five unit relays is sufficient to permit the selection of any desired one of a selected group of ten lines. Thus, the finder switch 200 comprises a subgroup relay R225, and five unit relays R200, R205, R210, R215 and R220, each of which unit relays is operative to select either of two lines in a selected group of ten lines depending upon the operated or non-operated condition of the subgroup relay R225. The finder switch 200 also includes a pair of switching or control relays R230 and R240 which are arranged to be controlled by way of the common equipment 691 illustrated in Fig. 6, and are operative to initiate the operation of the finder switch to seize a calling line.

Figure 6:
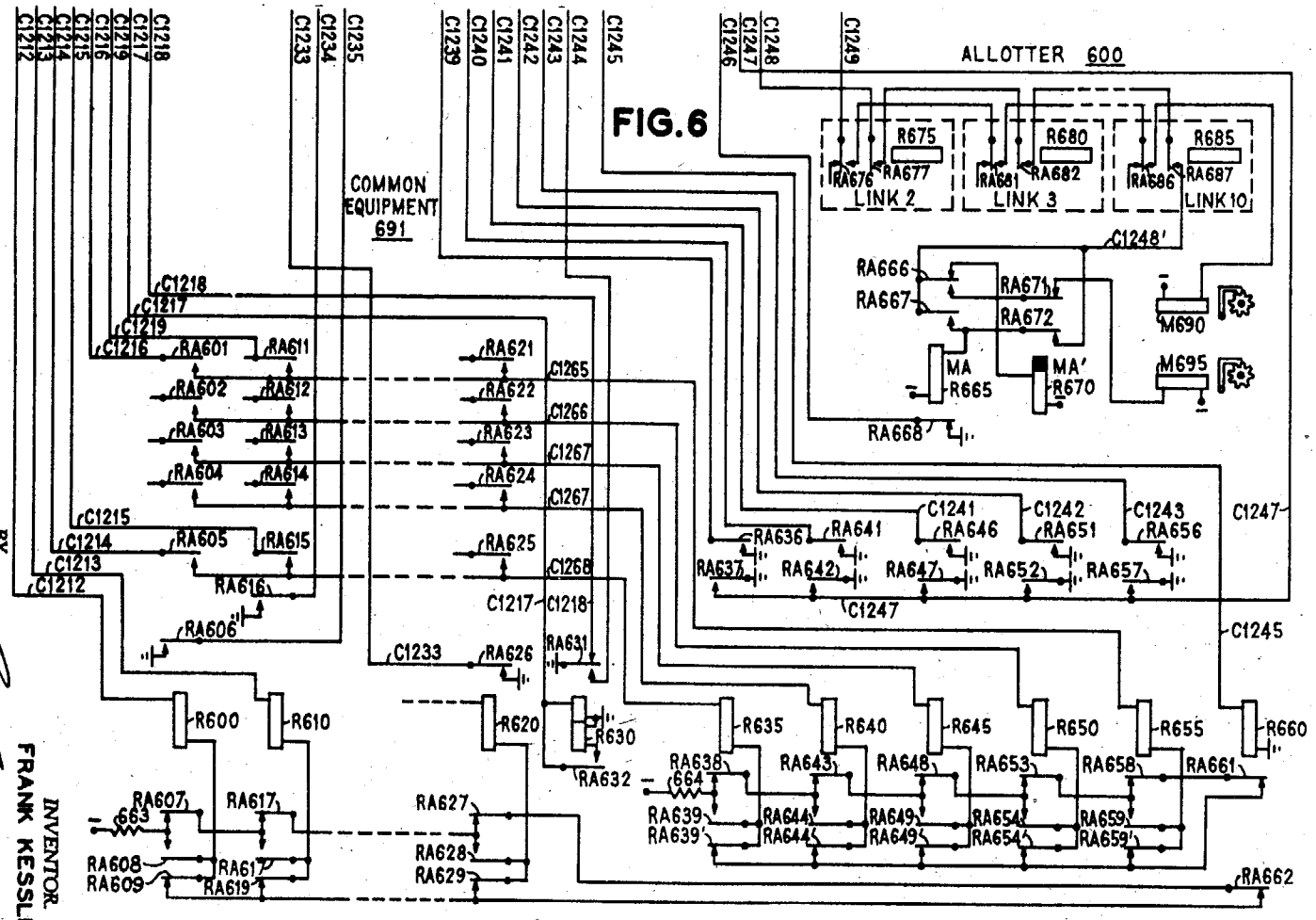

The common equipment 691 shown in Fig. 6 includes a plurality of first auxiliary relays which are arranged to be energized over start circuits controlled by the line circuits associated with the respective lines terminating at the exchange 10. These relays are selectively operative in response to the selective completion of the start circuits and individually function to condition for operation a particular group relay embodied in the finder switch of an assigned link. More particularly, ten first auxiliary relays including the three relays R600, R610 and R620 are provided, which individually correspond to the gang relays embodied in the finder switch of each link. A group of five second auxiliary relays R635, R640, R645, R650 and R655 are similarly provided which individually correspond to the unit relays embodied in the finder switch of each link and are operative to condition the corresponding unit relays in the finder switch of an assigned link for operation. The energization of the subgroup relay in the finder switch of an assigned link is dependent upon the operated or non-operated condition of a third auxiliary relay R630 provided in the common equipment, this latter relay also being arranged to be energized over those of the start circuits which are adapted to be completed in the line circuits terminating the lines included in predetermined ones of the line subgroups. Specifically, the arrangement of the apparatus is such that when a calling condition is created on one of the lines terminating at the exchange, start circuits are completed by the line relay associated with the calling line for causing the operation of the one of the first auxiliary relays R600, R610, etc., which corresponds to the group of lines including the calling line and for energizing the one of the second auxiliary relays R635, R640, etc., which is operative to select the particular calling line. If the calling line is in one subgroup of its particular group the third auxiliary relay R630 is not energized over the completed start circuits, but if the calling line is in the other subgroup the third auxiliary relay R630 is energized and operates to condition the subgroup relay embodied in the finder switch of the selected link for operation. In order to give the finder switch of any assigned link ample time to seize the calling line to which it is assigned and to connect the line through to the connector switch of the link before the common equipment 691 is reconditioned to respond to another call, a relay R660 is provided, which relay is operative immediately a link starts to seize a calling line and functions to open the operating circuits for all of the auxiliary relays in the common equipment 691.

Figure 2:
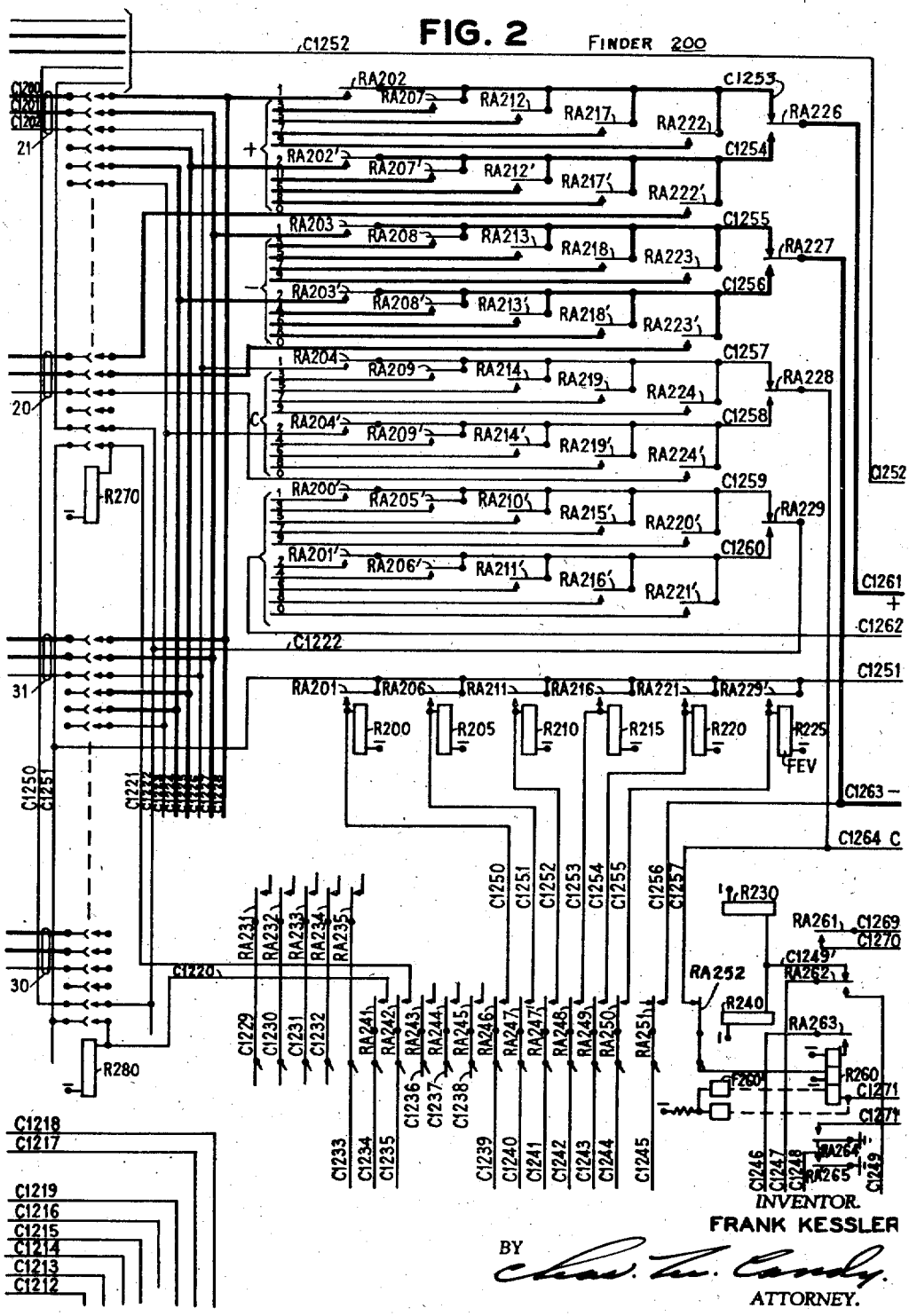
Figure 3:
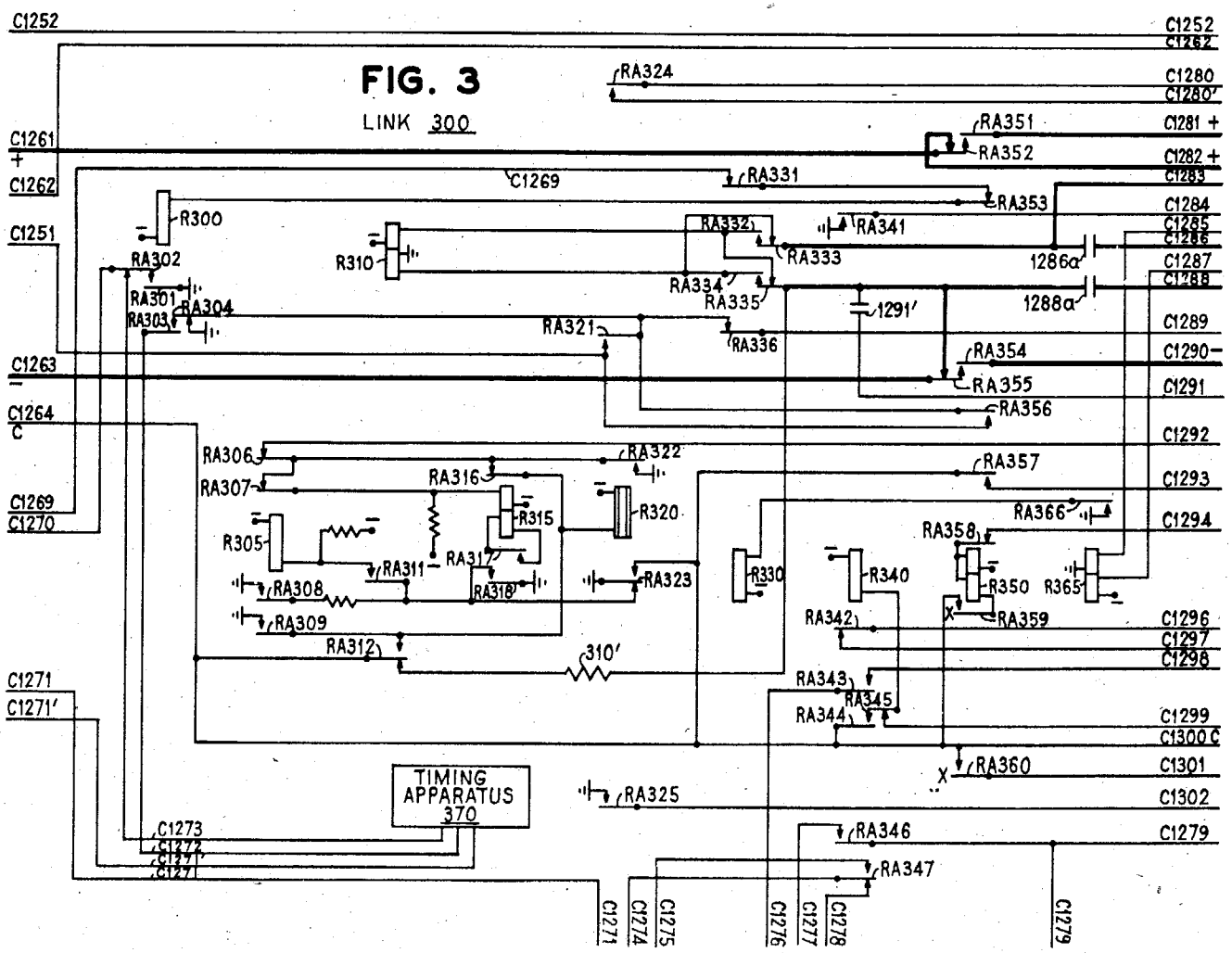
Figure 4:
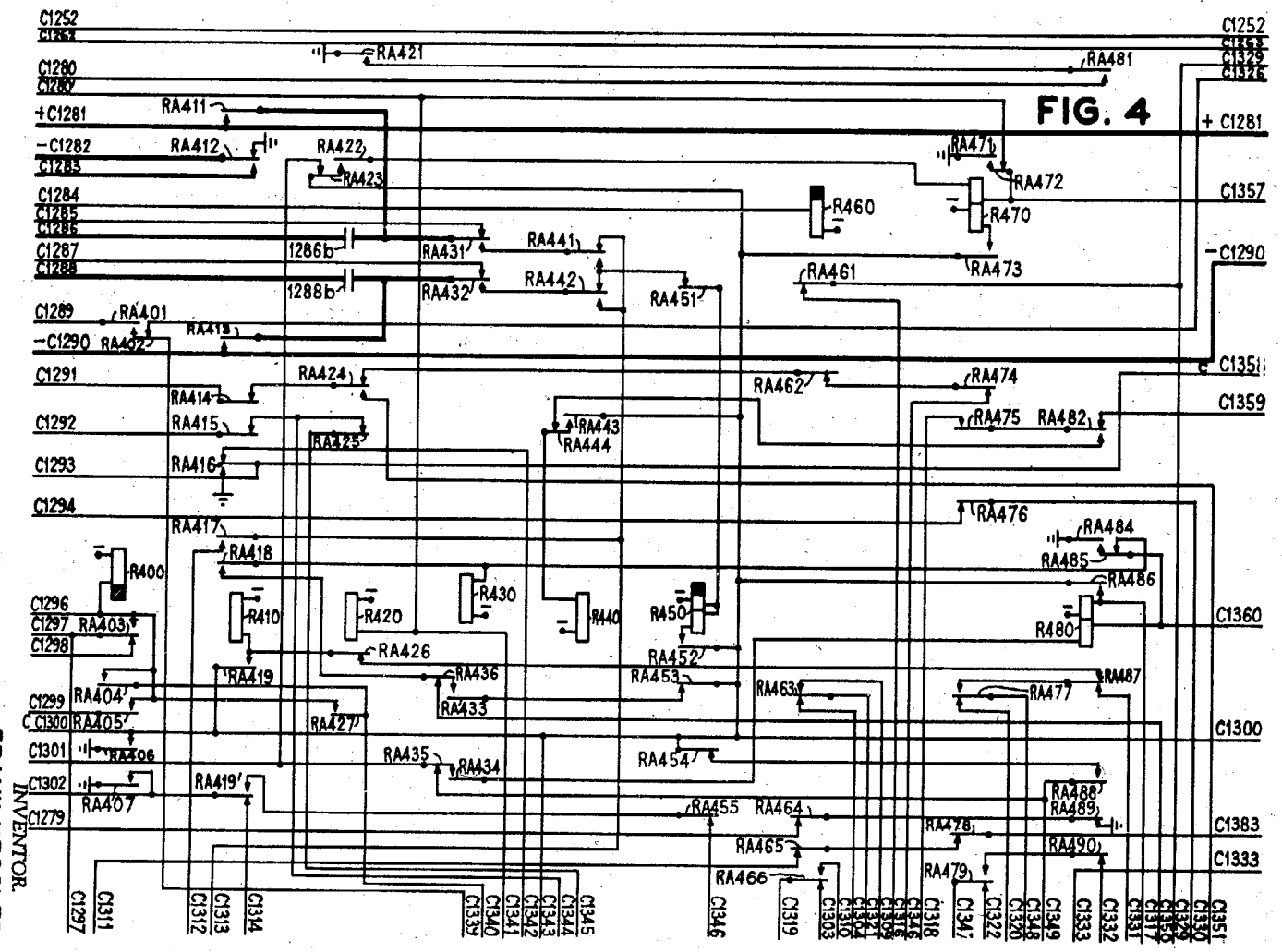

The link allotter or distributor 600 is illustrated in Figs. 2 and 6 as comprising a group of ten allotter relays R260, R675, R680, etc., which individually correspond to the ten links corresponding to and including the link 300, two control relays R665 and R670, a busy meter relay M695 and an overflow meter relay M690. Each of the allotter relays corresponds to the allotter relay R260 and is operative to assign an idle one of the links to the use of the next calling line immediately after a previously assigned link seizes a calling line and to prevent the assignment of the corresponding link to the use of a calling line. The allotter relays are operated successively to assign the links to the use of calling lines; and after the tenth allotter relay of the group operates, the control relays R665 and R670 are operated to recycle the allotter relays in order to provide for the reassignment of idle ones of the links and to operate the busy meter relay M695 if all of the links are busy at this time. If all of the links are busy, a call initiated at one of the telephone stations is not completed and the overflow meter relay M690 is caused to operate.

Alarm apparatus 860 associated with a plurality of fault detectors individual to the links is provided in the exchange for the purpose of signaling a supervisory operator in one of the distant exchanges in the event a fault appears in any one of the links. The alarm apparatus 860 comprises a start relay R880 operative in response to an urgent fault in the link, a start relay R890 operative in response to a non-urgent fault in the link, a local alarm or buzzer 861, and a plurality of control relays R863, R866, R870 and R875. Each of the fault detectors comprises a device operative in response to the presence of a fault in the finder switch of the link, a device operative in response to the failure of the ring pick-up relay to operate in order to apply ringing current to a selected line, a device operative in response to the presence of a hot coil in certain of the relays associated with the link, and a device operative in response to an undercharged condition of certain of the batteries associated with the link. The first two devices mentioned above operate to cause the operation of the start relay R880, while the last two devices mentioned above operate to cause the operation of the start relay R890. The first-mentioned device includes a fuse link and is operative to cause operation of the allotter relay corresponding to the finder switch having a fault therein, thereby to prevent the allotter 600 from assigning the finder switch to the use of calling lines, in addition to causing operation of the start relay R880. Each of the start relays R880 and R890 is operative to initiate the operation of the alarm apparatus 860 to cause the operation of the above enumerated control relays, thereby to actuate the buzzer 861, to actuate an alarm in an alarm center and to condition the ringing apparatus 850 to apply a characteristic tone current to the line 1411 for the purpose of informing a supervisory operator as to the nature of the fault.

The link circuit proper is illustrated in Figs. 3, 4, 7 and 8 of the drawings. The link line conductors C1261 and C1263 are arranged to be included in the operating circuit of the line relay R310. The line relay R310 is of the usual impulse responsive type and in combination with the two additional relays R305 and R315 forms an impulse correcting network for repeating impulses transmitted thereto from a calling telephone station over an impulsing circuit to the slow-to-release control relay R800 and the impulse counting relays illustrated in Figs. 8 and 7, respectively. The link hold relay is indicated at R320. The relay R350 is the usual switching through relay which is energized only when the link is utilized in extending a connection by way of one of the inter-office trunk lines to one of the distant exchanges 185 or 186. The called party answer relay is indicated at R365, this relay being arranged to operate in the usual manner when a call is answered at a called substation, and functions to control the operation of a slave relay R330 which performs the battery reversing operation. For the purpose of preventing the link from being permanently tied up through seizure by a defective line or a line having a calling condition present thereon for an unreasonable time interval, there is provided a link release relay R300 and timing apparatus diagrammatically illustrated at 370. This timing apparatus may be of any desired construction which includes means for applying ground pulses to the conductor C1273 at spaced intervals, which normally retains ground on the conductor C1272, and which removed ground potential from the conductor C1272 at intervals spaced from the intervals during which ground potential is applied to C1273. If desired, this apparatus may comprise a commutator driven by a synchronous motor through a gear reduction box and including commutator segments suitably arranged to control the application of ground potential to the two leads C1272 and C1273 in the manner described.

Figure 7:
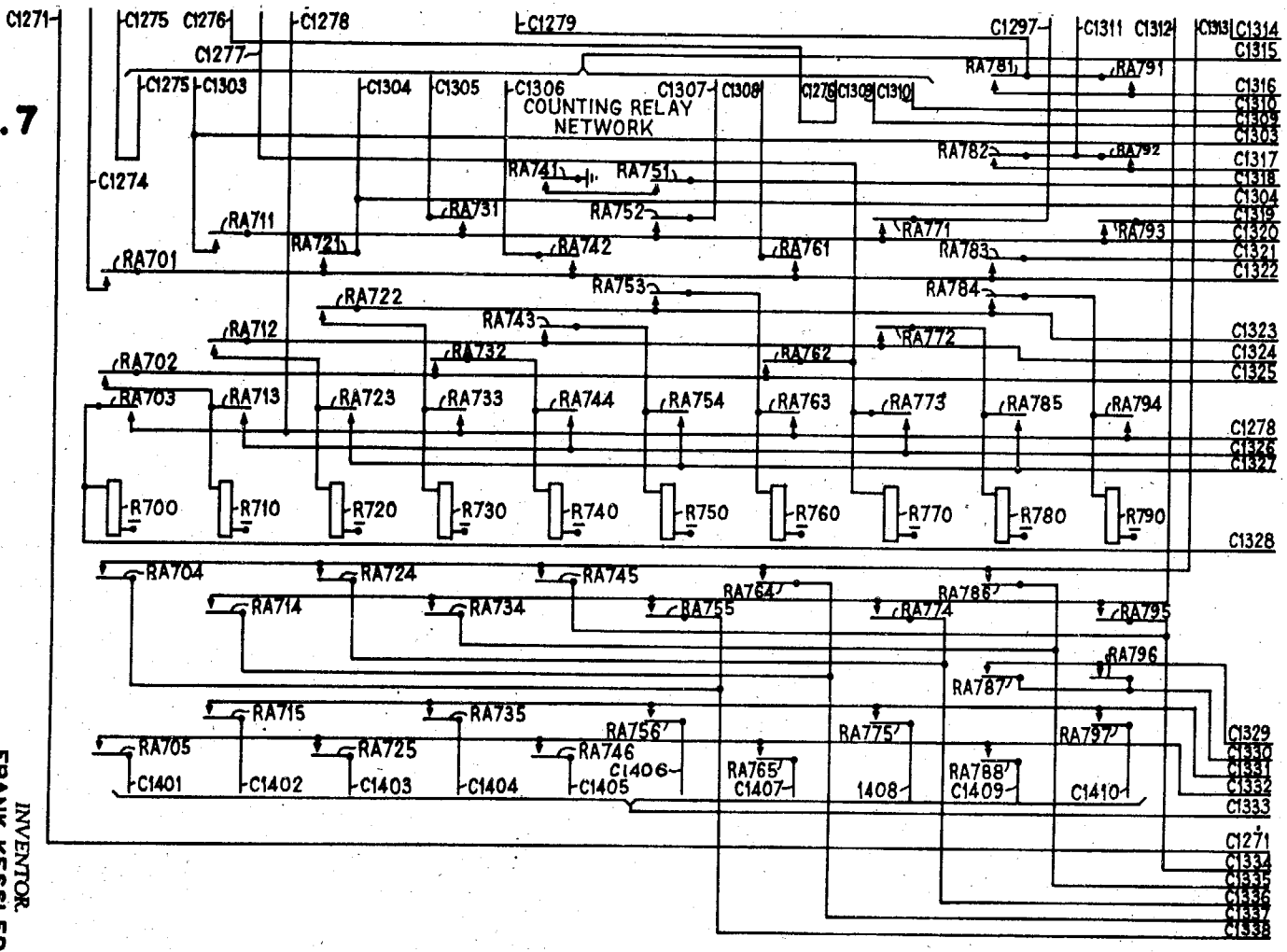
Figure 8:
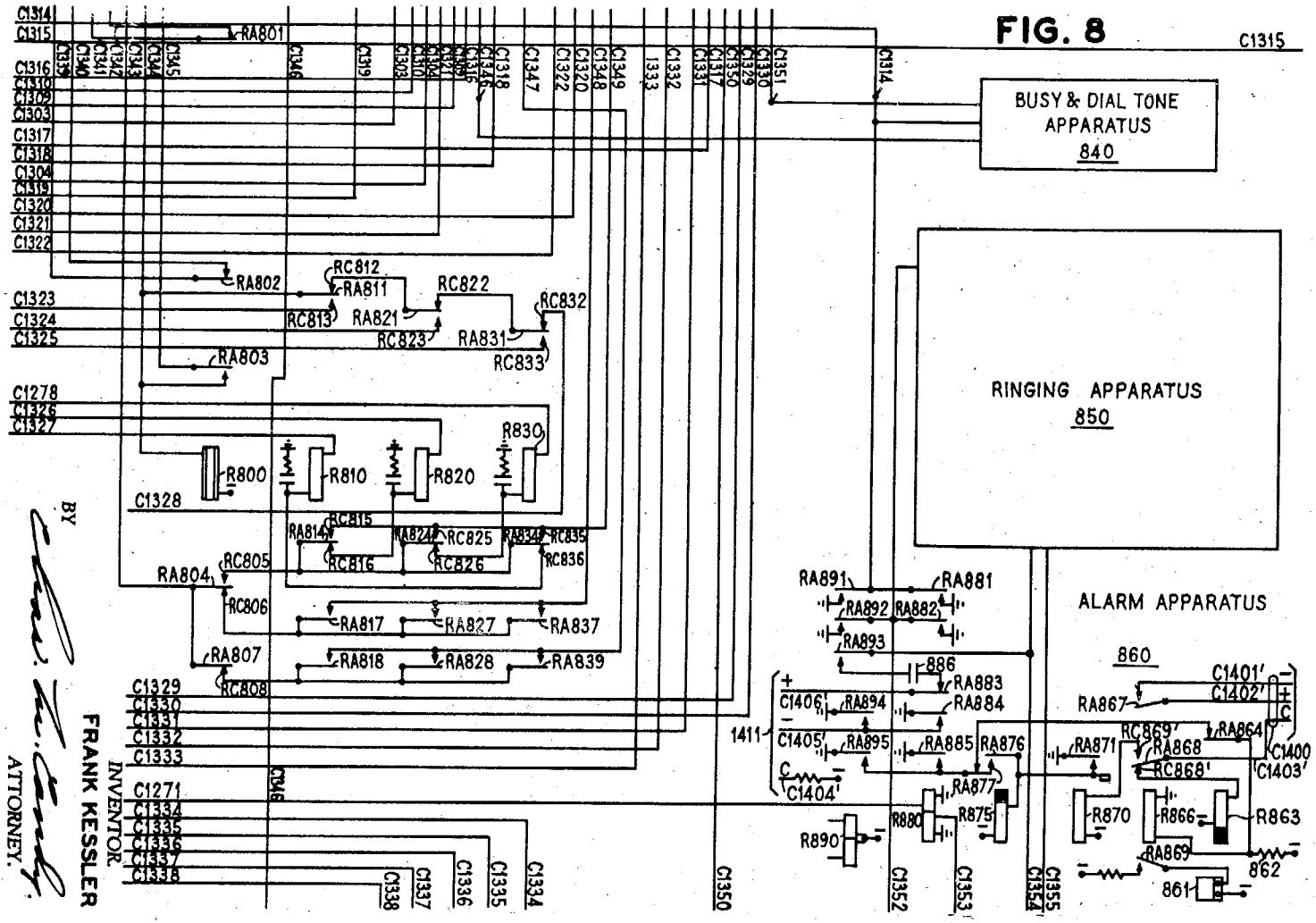

The counting relay network illustrated in Figs. 7 and 8 includes ten impulse counting relays R700 to R790, inclusive, which relays are sequentially operative in response to the impulses of each of a plurality of series of impulses transmitted to the connector switch 500 and function to control the selection of a desired called line and to control the selection of the code of the ringing current to be projected over the called line. Each of the counting relays is arranged to be locked energized in series with a corresponding one of the three control relays R810, R820 and R830 and to be deenergized in response to the operation of its succeeding counting relay in the manner described in detail hereinafter.

The ringing tone and timing equipment diagrammatically illustrated at 800 comprises ringing apparatus 850 and a code interrupter 1000. This apparatus is arranged in a conventional manner, the ringing apparatus 850 including a ringing generator from which ringing current is derived, and the code interrupter apparatus 1000 being connected alternately to impress pulsating battery potential and ground potential on each of the five interrupter leads C1334 to C1338, inclusive, for coded intervals which are different for each of the leads and comprise combinations of short and long pulsating battery impulses. The switching relay R410 functions to connect the link line conductors C1361 and C1363, incoming to the link circuit, by way of voice frequency coupling apparatus to the link line conductors C1281 and C1290, outgoing from the link circuit, to cause operation of a ring pick-up relay R430 and to initiate the operation of the code interrupter apparatus 1000. The switching relay R410 is controlled by the control relays R810, R820 and R830, which latter relays are controlled by the counting relays R700, R710, etc., in their response to the impulses of a code selecting digit dialed at a calling telephone station. The counting relays also select one of the interrupter leads to apply coded ringing current to one side of the selected line, and control the operation of a generator reversing relay R440 which functions to select the side of the selected line to which the coded ringing current is to be applied. In order to terminate the ringing operation when a call is answered at a called telephone station there is provided a ring cut-off relay R450 which is operative to terminate a ringing operation by causing the deenergization of the ring pick-up relay R430.

The reverting call relay R400 cooperates with certain of the other relays to hold the connector switch 500 of the link 300 operated during the period when ringing current is being applied to a calling line on a reverting call. Also, the reverting call relay R400 operates when a predetermined prefix digit is dialed at a calling telephone station to control the operation of the prefix digit relay R340, which latter relay controls the prefix digit slave relay R460. These latter two relays function to condition the connector switch 500 to select a line in the first, eighth, ninth or tenth groups of ten lines, as previously explained. The busy relay R420 is provided for the purpose of causing busy tone current derived from the busy and dial tone apparatus 840 to be applied to a calling subscriber line when a selected called line is found busy.

In order to rearrange the circuit connections so that the counting relays are rendered effective to perform different duties during the successive series of impulses transmitted thereto, two transfer relays R470 and R480 are provided, in addition to the prefix digit relay R340 and the prefix digit slave relay R460. More particularly, the relays R340 and R460 are arranged to operate at the end of a first series of impulses corresponding to a predetermined prefix digit to connect the counting relays so that predetermined ones of the group relays in the connector switch of the link may be selected for energization; the relay R470 is arranged to operate at the end of the second series of impulses corresponding to a tens digit to condition the counting relays to select one of the unit relays in the connector switch of the link for energization and to condition the subgroup relay in the connection switch for energization; and the relay R480 is operative at the end of the third series of impulses corresponding to a units digit to condition the counting relays to select the particular code of the ringing current to be applied to the selected called subscriber line.

Figure 5:
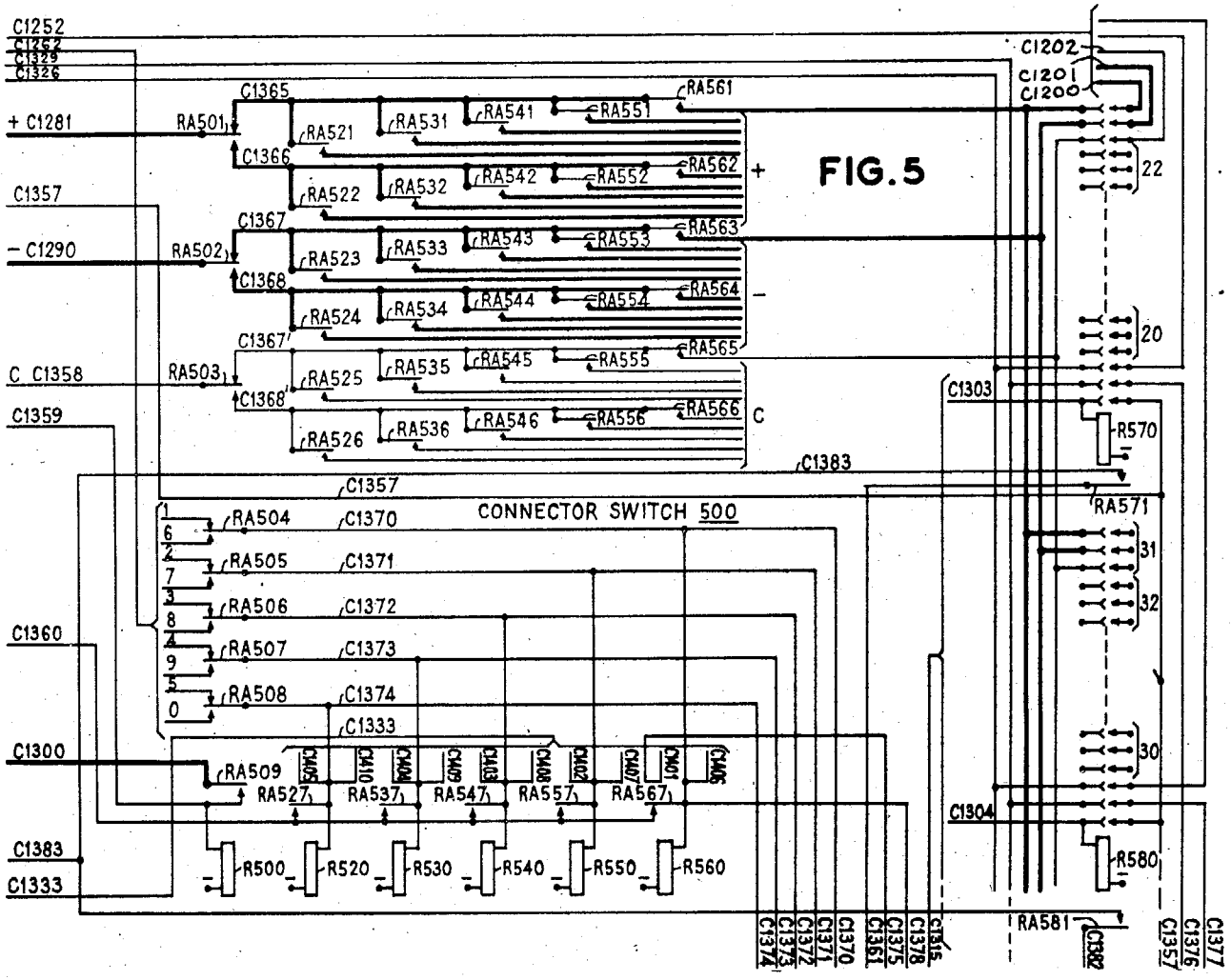
Figure 11:
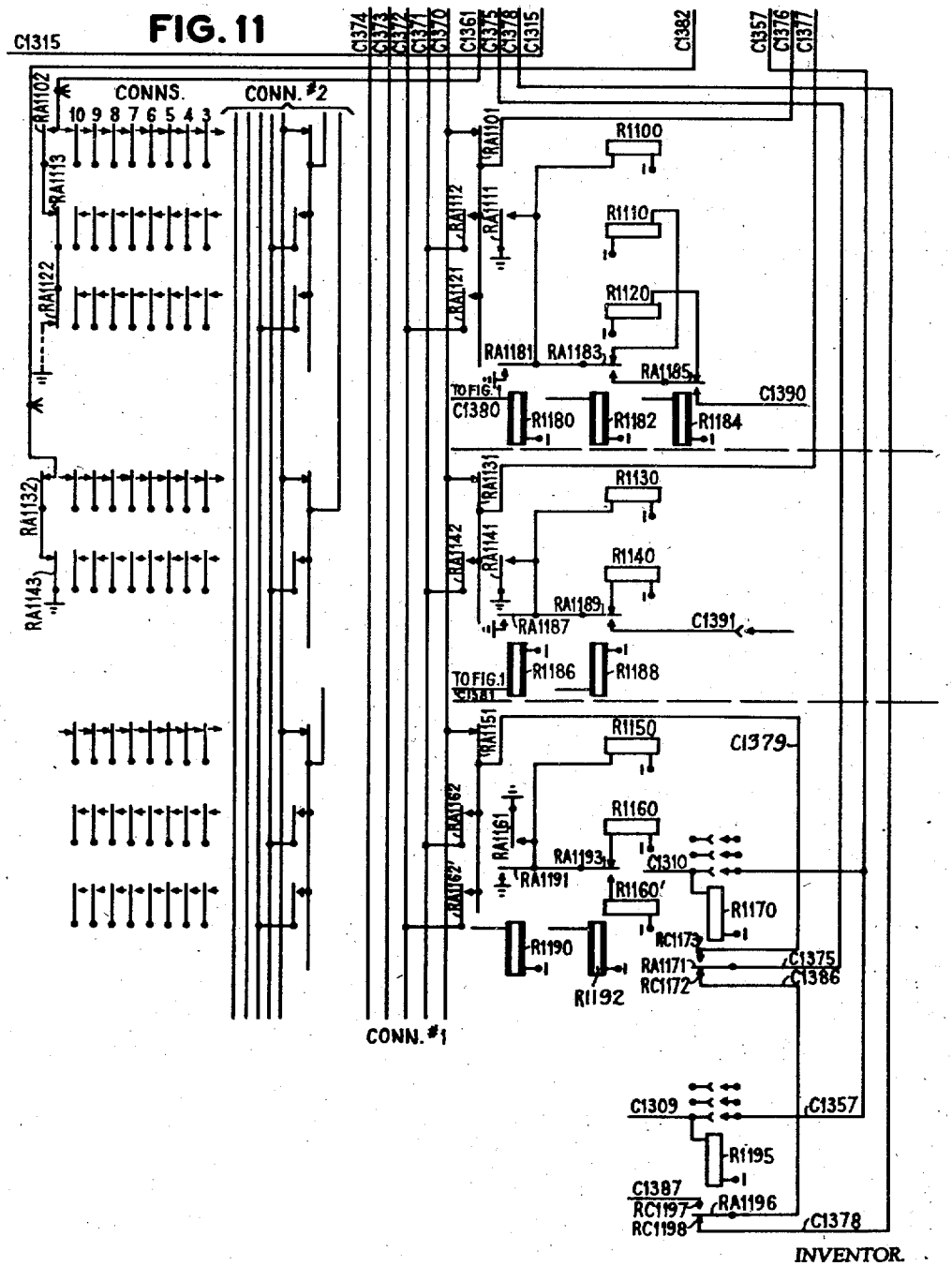

The connector switch 500 of the link 300, including the apparatus for preassigning idle ones of the interoffice and P. B. X trunk lines to be selected, is illustrated in Figs. 5 and 11. The connector switch per se is similar to the finder switch in that ten group or gang relays each terminating the conductors of ten lines, five unit relays, and a subgroup relay are provided for performing the line selecting functions. Specifically, the connector switch illustrated comprises ten gang relays corresponding to and including the two relays R570 and R580 illustrated, five unit relays R520, R530, R540, R550 and R560, and a subgroup relay R500. Here again, the lines terminating at the contact springs of each group relay are divided into two subgroups and each unit relay is operative to select either of two lines, individually included in different subgroups, depending upon the operated or non-operated condition of the subgroup relay R500. Preferably, each of the group relays R570, R580, etc., like each of the group relays of the finder switch 200, is of the form disclosed and claimed in the copending application, Serial No. 109,813, Herbert F. Obergfell, filed November 9, 1936.

The apparatus for preassigning idle ones of the inter-office trunk lines in the second group of ten lines is common to all of the links and includes a group of trunk select relays R1100, R1110 and R1120, which individually correspond to the first, second and third inter-office trunk lines terminating at the contact springs of the second group relay R570, and a group of control relays R1180, R1182 and R1184, which individually correspond to the inter-office trunks numbered from one to three in the second group of ten lines. As pointed out in greater detail hereinafter, the two groups of relays cooperate in a manner such that an idle inter-office trunk line in the second ten line group is preselected and ready for the use of any one of the links so long as any of the trunk lines in this group is idle, and when all of the trunk lines become busy the link circuit apparatus of a link attempting to select one of the lines returns busy tone over the loop extending to the calling subscriber.

The arrangement and operation of the apparatus for preassigning idle ones of the inter-office trunk lines in the third group of ten lines are substantially the same as that of the apparatus for preassigning idle ones of the inter-office trunk lines in the second group of ten lines, as described above. This apparatus comprises a corresponding group of trunk selecting relays R1130 and R1140, and a corresponding group of control relays R1186 and R1188.

The arrangement and operation of the apparatus for preassigning idle ones of the P. B. X trunk lines in the tenth group of ten lines are similar to that of the apparatus for preassigning idle inter-office trunk lines described above.

This apparatus comprises a group of trunk selecting relays R1150, R1160 and R1160' and a group of control relays R1190 and R1198 corresponding to the relays R1150 and R1160. Also, apparatus (not shown) substantially the same as that described for preassigning idle ones of the P. B. X trunk lines in the tenth group of ten lines is provided for preassigning idle ones of the P. B. X trunk lines in the ninth group of ten lines.

*Operation of the finder switch to extend a call initiated at a telephone station connected to an odd-numbered line to an idle link*

A call is initiated at a telephone station connected to an odd numbered line by removing the receiver of the telephone instrument from its associated switch hook, thereby completing a circuit between the telephone station and the line relay individual to the odd numbered line. For example, a call initiated at the telephone station A is extended to the finder switch 182 in the automatic exchange 185 and from the latter to the selector switch 183 therein. Upon dialing the proper digit at the telephone station A, the call is extended from the selector switch 183 through the two-way repeater 187 to the odd numbered inter-office trunk line 21, whereupon the line relay R110 individual to the line 21 is operated. The operating circuit of the line relay R110 extends from ground at R110 by way of the upper winding of R110, RA106 the conductor C1200 of the line 21, the repeater 187, the selector switch 183, the finder switch 182, the telephone instrument at the telephone station A, the finder switch 182, the selector switch 183, the repeater 187, the conductor C1201 of the line 21, RA107 and the lower winding of R110 to battery. Assuming that the link illustrated is the link assigned by the allotter to the use of the calling line, the line relay R110, upon operating completes at RA112 an operating circuit for the auxiliary group relay R600, this circuit extending from ground at RA112 by way of RA102, C1212, the winding of R600, RA609, RA662, RA627, etc., RA617, RA607 and the resistor 663 to battery. The line relay R110 also completes at RA113 an operating circuit for the auxiliary unit relay R635, this circuit extending from ground at RA631 by way of C1218, RA113, RA103, C1214, RA605, C1268, the winding of relay R635, RA639', RA661, RA658, RA653, RA648, RA643, RA638 and the resistor 664 to battery.

Upon operating, the relay R600 completes at RA608 an obvious holding circuit for itself and prepares at RA606 a circuit for operating the gang relay R270 in the finder switch 200. Upon operating, the relay R635 completes at RA639 an obvious holding circuit for itself, completes at RA637 a circuit for energizing the control relays R230 and R240 in parallel, and prepares at RA636 a circuit for energizing the unit relay R200 in the finder switch 200. The operating circuit of the control relays R230 and R240 extends from ground at RA637 by way of C1247, RA262, C1249', and the windings of R230 and R240 in parallel to battery.

Upon operating, the relay R240 completes at RA242 the operating circuit of the gang relay R270 and completes at RA246 the operating circuit of the unit relay R200, the operating circuit of the gang relay R270 extending from ground at RA606 by way of C1235, RA242, C1221 and the winding of R270 to battery, and the operating circuit of the unit relay R200 extending from ground at RA636 by way of C1239, RA246, C1250 and the winding of R200 to battery. The relay R240 also completes at RA251 a circuit for energizing the relay R660, this circuit extending from ground at R660 by way of the winding of R660, C1245, RA251, C1256, the link conductor C1263 of the link 300, RA355, RA335 and the upper winding of the line relay R310 to battery. Upon operating, the relay R660 interrupts at RA662 a point in the operating circuits of the auxiliary group relays R600, R610, etc., and interrupts at RA661 a point in the operating circuits of the auxiliary unit relays R635, R640, etc., thereby busying the allotter 600 so that it is non-responsive to other calls.

The gang relay R270 operates to close its contact springs connected to the lines numbered from 20 to 29 and the unit relay R200 operates to connect the calling line 21 to the link circuit of the assigned link 300. When the line 21 is connected to the link 300, the line relay R310 is operated, this circuit extending from ground at RA412 by way of the link conductor C1282, RA352, the link conductor C1261, RA226, C1253, RA202, the contact springs of the gang relay R270, the conductor C1200 of the line 21, the repeater 187, the selector switch 183, the finder switch 182, the telephone instrument at the telephone station A, the finder switch 182, the selector switch 183, the repeater 187, the conductor C1201 of the line 21, the contact springs of the gang relay R270, RA203, C1255, RA227, the link conductor C1263, RA355, RA335 and the upper winding of R310 to battery.

Upon operating, the line relay R310 completes at RA311 a circuit for operating the link impulsing relay R305, this circuit extending from ground at RA323 by way of RA311, and the winding of R305 to battery; interrupts at RA312 a point in the circuit extending from battery by way of the upper winding of R310, RA335, the resistor 310' and RA312 to the link control conductor C1264; and prepares at RA312 a point in the circuit for applying ground to the control conductor C1264.

Upon operating, the link impulsing relay R305 completes at RA309 an obvious circuit for operating the hold relay R320, which is of the slow-to-release type, and an obvious circuit for applying ground to the control conductor C1264, thereby to mark the link 300 as busy in the allotter. When the control conductor C1264 is grounded, the lock-out relay R100 and the cut-off relay R105, individual to the line 21, are operated, the circuit for energizing these relays extending from the grounded control conductor C1264 by way of RA228, C1257, RA204, the contact springs of the gang relay R270, the control conductor C1202 of the line 21, the winding of R105 and the winding of R100 to battery. Upon operating, the cut-off relay R105 interrupts at RA106 and RA107 the operating circuit of the line relay R110. The line relay R110 then restores and interrupts at RA112 the holding circuit of the relay R600 and interrupts at RA113 the holding circuit of the relay R635, and the latter relays restore. The lock-out relay R100 operates and interrupts at RA102 a further point in the holding circuit of the relay R600 and interrupts at RA103 a further point in the holding circuit of the relay R635. The presence of ground potential on the control conductor C1202 of the calling line serves to busy this line in the other automatic switches having access thereto.

Upon operating, the hold relay R320 completes at RA322 a holding circuit for itself, this circuit extending from ground at RA322 by way of RA316 and the winding of R320 to battery; applies at RA323 multiple ground to the control conductor C1264 in order to retain the cut-off relay R105 and the lock-out relay R100 individual to the line 21 operated during impulsing periods; and completes at RA321 holding circuits for the operated gang relay R270 and the operated finder unit relay R200. The holding circuit of the operated gang relay R270 extends from ground at RA304 by way of RA321, C1251, the contact springs of R270 and the winding of R270 to battery, while the holding circuit of the operated unit relay R200 extends from ground at RA304 by way of RA321, C1251, RA201 and the winding of R200 to battery.

The hold relay R320 also completes at RA325 a circuit for operating the start relay of the dial and busy tone apparatus 840, this circuit extending from ground at RA325 by way of C1302, RA419', the start lead C1314 and the winding of the start relay, not shown, in the dial and busy tone apparatus 840 to battery. The dial and busy tone apparatus 840 then operates to apply dial tone to the link 300, this circuit extending from pulsating battery in the dial and busy tone apparatus 840 by way of the dial tone conductor C1346, RA474, RA462, RA424, RA414, the link conductor C1291, the condenser C1291' and RA355 to the link conductor C1263, through the telephone instrument at the telephone station A connected to the link conductors C1263 and C1261 by way of the finder switch 200, the line 21, the repeater 187, the selector switch 183 and the finder switch 182, and from the link conductor C1261 by way of RA352, the link conductor C1282 and RA412 to ground. The party initiating the call at the telephone station A then receives dial tone indicating that a link has been seized and that he may operate the dialing mechanism associated with the telephone instrument to extend the call from the link to the called line.

In a similar manner, when calls are initiated at telephone stations connected to the odd-numbered lines 23, 25, 27 and 29, respectively, the relay R600 and one of the relays R640, R645, R650 and R655, respectively, are operated in the auxiliary or common equipment. The relay R600 operates the gang relay R270, and the relays R640, R645, R650 and R655 operate the unit relays R205, R210, R215 and R220, respectively, in the finder switch 200 to connect the lines 23, 25, 27 and 29, respectively, to the link 300.

Similarly, when calls are initiated at telephone stations connected to the odd-numbered lines 31, 33, 35, 37 and 39, respectively, the relay R610 and one of the relays R635, R640, R645, R650 and R655, respectively, are operated in the auxiliary or common equipment. The relay R610 operates the gang relay R280 and the relays R635, R640, R645, R650 and R655 operate the unit relays R200, R205, R210, R215 and R220, respectively, in the finder switch 200, to connect the lines 31, 33, 35, 37 and 39, respectively, to the link 300.

*Operation of the finder switch to extend a call initiated at a telephone station connected to an even-numbered line to an idle link*

A call is initiated at a telephone station connected to an even-numbered line by removing the receiver of the telephone instrument from its associated switch hook, thereby completing a circuit between the telephone station and the line relay individual to the even-numbered line. For example, when a call is initiated at the telephone station 1B connected to the line 20, the line relay R125, individual to the line 20, is operated, the operating circuit of the line relay R125 extending from ground at R125 by way of the upper winding of R125, RA121, the conductor C1203 of the line 20, the telephone instrument at the telephone station 1B, the conductor C1204 of the line 20, RA122 and the lower winding of R125 to battery. Upon operating, the line relay R125 completes at RA127 an operating circuit for the relay R600 in the common equipment, this circuit extending from ground at RA127 by way of RA117, C1212, the winding of R600, RA609, RA662, RA627, etc., RA617, RA607 and the resistor 663 to battery. The line relay R125 also prepares at RA128 a circuit for serially energizing the relays R630 and R655 in the common equipment.

Upon operating, the relay R600 completes at RA608 an obvious holding circuit for itself, and completes at RA601 the series operating circuit of the relays R630 and R655, this circuit extending from ground at R630 by way of the upper winding of R630, C1217, RA128, RA118, C1216, RA601, C1265, the winding of R655, RA659', RA661, RA658, RA653, RA648, RA643, RA638 and the resistor 664 to battery. Also, the relay R600 prepares at RA606 the circuit for energizing the gang relay R270.

Although the relays R630 and R655 are energized in series, the relay R655 does not operate at this time due to the relatively high resistance of the upper winding of the relay R630 connected in series therewith. However, the relay R630 operates and prepares at RA631 a circuit for energizing the group unit or subgroup relay R225 in the finder switch 200, and connects its relatively low resistance lower winding in parallel with its upper winding to cause the relay R655 to be operated in series with the relay R630.

Upon operating, the relay R655 completes at RA659 an obvious holding circuit for itself, completes at RA657 a circuit for energizing the control relays R230 and R240 in parallel and prepares at RA656 a circuit for energizing the unit relay R220 in the finder switch 200. The operating circuit of the relays R230 and R240 extends from ground at RA657 by way of C1247, RA262, C1249' and the winding of R230 and R240 in parallel to battery.

Upon operating, the relay R240 completes at RA242 the operating circuit of the gang relay R270, completes at RA250 the operating circuit of the group unit relay R225, and completes at RA249 the operating circuit of the unit relay R220; the operating circuit of the gang relay R270 extending from ground at RA606 by way of C1235, RA242, C1221 and the winding of R270 to battery; the operating circuit of the group unit relay R225 extending from ground at RA631 by way of C1244, RA250, C1255 and the winding of R225 to battery; and the operating circuit of the unit relay R220 extending from ground at RA656 by way of C1343, RA249, C1254 and the winding of R220 to battery. The relay R240 also completes at RA251 a circuit for energizing R660, this circuit extending from ground at R660, by way of the winding of R660, C1245, RA251, C1256, the link conductor C1263 of the link 300, RA355, RA335, and the upper winding of the line relay R310 to battery. Upon operating, the relay R660 interrupts at RA662 a point in the operating circuits of R600, R610, etc., and interrupts at RA661 a point in the series operating circuit of R630 and one of the relays R635, R640, etc., thereby to busy the allotter 600 to other calls.

The gang relay R270 operates to close its contact springs to connect the lines between 20 and 29 through to the armature springs of the unit relays; the group unit relay R225 operates to disconnect its armatures RA226, RA227, RA228, RA229, from the conductor C1253, C1255, C1257, C1259, respectively, and to connect these armatures to the conductors C1254, C1256, C1258 and C1260, respectively; and the unit relay R220 operates to connect the line 20 to the link circuit of the link 300. When the line 20 is connected through to the link circuit, the line relay R310 is operated, this circuit extending from ground at RA412 by way of the link conductor C1262, RA352, the link conductor C1261, RA226, C1254, RA222', the contact springs of the gang relay R270, the conductor C1203 of the line 20, the telephone instrument at the telephone station 1B, the conductor C1204 of the line 20, the contact springs of the gang relay R270, RA223', C1256, RA227, the link conductor C1263, RA355, RA335 and the upper winding of R310 to battery.

Upon operating, the line relay R310 completes at RA[illegible] the above-traced circuit for operating the link impulsing relay R305, interrupts at RA312 a point in the priming circuit for R310, and prepares at RA312 a point in the path for applying ground to the control conductor C1264.

Upon operating, the link impulsing relay R305 completes at RA309 an obvious circuit for energizing the hold relay R320 and for applying ground to the control conductor C1264, thereby to mark the link 300 as busy in the allotter and to mark the calling line as busy. When the control conductor C1264 is ground, the lock-out relay R115 and the cut-off relay R120, individual to the line 20, are operated, the circuit for energiing these relays extending from the grounded control conductor C1264 by way of RA228, C1258, RA224', the contact springs of the gang relay R270, the control conductor C1205 of the line 20, the winding of R120 and the winding of R115 to battery. Upon operating, the cut-off relay R120 interrupts at RA121 and RA122 the operating circuit of the line relay R125. The line relay R125 then restores and interrupts at RA127 the holding circuit of the relay R600 and interrupts at RA128 the series holding circuit of the relays R630 and R655, causing the latter relays to restore. The lock-out relay R115 operates and interrupts at RA117 a further point in the holding circuit of the relay R600 and interrupts at RA118 a further point in the series holding circuit of the relays R630 and R655.

Upon operating, the hold relay R320 completes at RA322 a holding circuit for itself, completes at RA323 a path for applying multiple ground to the control conductor C1264 in order to retain the cut-off relay R120 and the lock-out relay R115, individual to the line 20, operated during impulsing periods, and completes at RA321 holding circuits for the operated gang relay R270, the operated group unit relay R225 and the operated unit relay R220 in the finder switch 200. The holding circuit of the operated gang relay R270 extends from ground at RA304 by way of RA321, C1251, the contact springs of R270 and the winding of R270 to battery. The holding circuit of the operated group unit relay R225 extends from the grounded conductor C1251 by way of RA229' and the winding of R225 to battery, while the holding circuit of the operated unit relay R220 extends from the grounded conductor C1251 by way of RA221 and the winding of R220 to battery.

The hold relay R320 also completes at RA325 a circuit for energizing the start relay, not shown, of the dial and busy tone apparatus 840, thereby to initiate the operation of this apparatus to return dial tone to the telephone instrument at the telephone station 1B as previously explained. The party initiating the call at the telephone station 1B upon receiving dial tone is informed that a link has been seized and that he may operate the dialing mechanism associated with the telephone instrument to extend the call from the link to the called line.

In a similar manner, when calls are initiated at telephone stations connected to the even-numbered lines 22, 24, 26 and 28, respectively, the relay R600, the relay R630 and one of the relays R635, R640, R645 and R650, respectively, are operated in the common equipment. The relay R600 causes the operation of the gang relay R270; the relay R630 causes the operation of the group unit relay R225; and the relays R635, R640, R645 and R650 cause the operation of the unit relays R200, R205, R210, R215, respectively, in the finder switch 200 in order to connect the lines 22, 24, 26 and 28, respectively, to the link 300.

Similarly, when calls are initiated at telephone stations connected to the even-numbered lines 32, 34, 36, 38 and 30, respectively, the relay R610, the relay R630 and one of the relays R635, R640, R645, R650 and R655, respectively, are operated in the allotter 600. The relay R610 causes the operation of the gang relay R280; the relay R630 causes the operation of the group unit relay R225; and the relays R635, R640, R645, R650 and R655 cause the operation of the unit relays R200, R205, R210, R215 and R220, respectively, in the finder switch 200 in order to connect the lines 32, 34, 36, 38 and 30 respectively, to the link 300.

*Operation of the allotter and timing apparatus*

After the finder switch 200 operates to extend a call from one of the telephone stations A, 1B, etc., to the link 300, thereby rendering this link busy, the allotter 300 operates to prepare the next idle link to be taken for use when the next call is initiated at one of the telephone stations A, 1B, etc. When the link 300 is seized, ground is placed upon the control conductor C1264 in order to render the link busy as previously explained. Upon operation of the cut-off and the lock-out relays individual to the line connected by the finder switch 200 to the link 300, the holding circuit of the operated one of the relays R600, R610, etc., and the holding circuit of the operated one of the relays R635, R640, etc., are interrupted in order to release the common equipment in the manner described above. When the operated one of the delays R635, R640, etc., restores it interrupts at RA637, RA642, etc., respectively, the operating circuit for the control relays R230 and R240 in parallel. Upon restoring, the relay R240 completes at RA252 the operating circuit of the allotter relay R260, individual to the finder switch 200, this circuit extending from the grounded control conductor C1264 by way of C1257, RA252, and the intermediate winding of R260 to battery. Upon operating, the relay R260 completes at RA 263 a holding circuit for itself extending from ground at RA668 by way of C1246, RA263, and the upper winding of R260 to battery, and transfers its armature RA262 connected to the conductor C1247 extending to the common equipment from the conductor C1249' extending to the control relays R230 and R240, individual to the finder switch 200, to the conductor C1249 extending to corresponding control relays individual to the finder switch embodied in the idle second link. The relay R260 also grounds at RA264 the start lead C1271' of the timing apparatus 370 in order to set the timing apparatus 370 into operation, prepares at RA261 the circuit for operating the timing relay R300, and prepares at RA265 a chain circuit for operating the busy meter relay M695. The relay R260 is also provided with a lower winding, one terminal of which is connected to the conductor C1271 extending by way of the upper winding of the relay R880 to ground in the alarm apparatus 860 and the other terminal of which is connected to a fuse device F260', individual to the finder switch 200 and the link 300 and extending to battery. In the event a fault appears in the link 300 capable of operating or blowing the fuse device F260', the relay R260 is operated, thereby rendering the finder switch 200 and the link 300 busy, the circuit for energizing R260 extending from battery by way of the fuse device F260', the lower winding of the relay R260, C1271, the upper winding of the relay R880 to ground in the alarm apparatus 860. Also, each of the allotter relays R675, R680, etc., associated with the other links and corresponding to the relay R260 for the link 300 is provided with a lower winding connected between the conductor C1271 and a fuse device, individual to the link and extending to battery, in order to render the corresponding link busy in case a fault occurs therein.

The next call initiated at one of the telephone stations A, 1B, etc., is extended to the idle second link which has been previously prepared by the allotter 600. When the second link is rendered busy, the relay R675, individual thereto, is operated. Upon operating, the relay R675 completes a holding circuit for itself extending by way of the conductor in the second link corresponding to the conductor C1264 in the link 300 to ground, and transfers its armature RA676 connected to the conductor C1249 to the corresponding conductor extending to the third link, thereby preparing the idle third link to be seized by the next call initiated at one of the stations A, 1B, etc. Calls initiated at the telephone stations A, 1B, etc., are extended to the idle links 1, 2, etc., successively, until a call is extended to the tenth link, at which time the relay R685, individual thereto, operates and completes at RA686 the chain circuit for operating the overflow meter relay M690 in the event that a call is initiated at one of the telephone stations A, 1B, etc., while all of the links are busy, this circuit extending from ground at RA637, RA642, etc., by way of C1247, RA262, C1249, RA676, RA681, etc., RA686 and the winding of M 690 to battery. The overflow meter is actuated to register the fact that a call initiated at one of the telephone stations A, 1B, etc., has not been extended to a link due to the fact that all of the links were busy at that time. The relay R685, individual to the tenth link, also completes at RA687 the chain ground circuit for operating the busy meter relay M695 and for recycling the allotter 600 to set up idle links successively. This circuit extends from ground at RA265 by way of C1248, RA677, RA682, etc., RA687, C1248', RA666, and the winding of the slow-to-operate relay R670 to battery. The relay R670 operates and interrupts at RA671 the above-traced circuit for energizing the busy meter relay M695, and completes at RA672 a circuit for energizing the relay R665 over the above-traced chain circuit. The relay R655 completes at RA667 a holding circuit for itself, this circuit extending over the above-traced chain circuit, interrupts at RA666 the operating circuit of the relay R670, prepares at RA666 a point in the operating circuit of the busy meter relay M695, and interrupts at RA668 the holding circuits including the upper windings of the allotter relays R260, R675, R680, etc., R685, individual to the links 1, 2, 3, etc., 10, respectively.

If the first link is busy, the relay R260, individual thereto, does not restore but remains energized over a circuit extending by way of the grounded conductor C1264, C1257, RA252, and the intermediate winding of R260 to battery. In a similar manner, if the second, third, etc., and tenth links are busy, the relays R675, R680, etc., and R685, respectively, remain operated. Accordingly, if all of the links are busy, the chain circuit extending from ground at RA265 by way of C1248, RA677, RA682, etc., and RA687 is completed to the conductor C1248'. This circuit is extended from the conductor C1248' by way of RA667 and the winding of the relay R665 to battery, thereby retaining the relay R665 operated.

The relay R670 restores and completes at RA671 the operating circuit of the busy meter relay M695 extending from battery at M695 by way of the winding of M695, RA671, RA666 and C1248', through the chain circuit to ground at RA265. The busy meter is actuated to register the fact that all of the links were busy at that time.

When the holding circuits including the upper windings of the relays R260, R675, R680, etc., and R685, individual to the links 1, 2, 3, etc., 10, respectively, are interrupted at the armature RA668 of the relay R665, the relays of this group, which are individual to idle links, restore. For example, if the first link is idle at this time, battery at the line relay R310 appears upon the control conductor C1264, and each terminal of the intermediate winding of R260 is connected to battery. Thus, the relay R260 restores and interrupts at RA265 the chain circuit extending to the conductor C1248', thereby interrupting the holding circuit of the relay R665 to cause the latter relay to restore. Upon restoring, the relay R665 interrupts at RA666 the operating circuit of the busy meter relay M695. Also, when the relay R260 restores, it transfers its armature RA262 from the conductor C1249 to the conductor C1249', thereby interrupting the above-traced chain circuit extending through the winding of the overflow meter relay M690 to battery, and preparing the operating circuit of the control relays R230 and R240, individual to the first link 300. Thus, the next call initiated at one of the telephone stations A, 1B, etc., is extended to the first link 300 by the common equipment.

In a similar manner, when the relays R675, R680, etc., and R685, individual to links 2, 3, etc., and 10, respectively, restore, they individually interrupt the chain circuit, extending from ground at RA265 to the conductor C1248' and individually interrupt the chain circuit extending from the conductor C1247 to the overflow meter relay M690.

When the holding circuits including the upper windings of the relays R260, R675, R680, etc., and R685, individual to links 1, 2, 3, etc., and 10, respectively, are interrupted, the relay R260 will not restore if the first link is busy, while the relay R675 will restore if the second link is idle. As previously explained, when the relay R675 restores, it interrupts at RA677 the chain circuit extending from ground at RA265 to the conductor C1248', and transfers its armature RA676 from the conductor in the chain circuit extending to the overflow meter relay M690 to the conductor extending to the control relays individual to the second link and corresponding to the control relays R230 and R240 of the first link 300. Thus, under these conditions, the next call initiated at one of the telephone stations A, 1B, etc., will be extended to the second link. From the foregoing, it is apparent that the allotter relays operate to prepare an idle one of the links between 1 and 10 for the next call initiated immediately an idle previously selected link is taken for use.

As previously explained, when the link 300 is seized, the allotter relay R260 is operated and completes at RA264 a start circuit for initiating the operation of the timing apparatus 370. The timing apparatus 370 is then set into operation to apply ground to the pulse lead C1273 and the conductor C1272. When a ground pulse is applied to C1273, the link release relay R300 is energized over a circuit extending from the grounded conductor C1273 by way of RA302, C1270, RA261, C1269, RA331, RA353 and the winding of R300 to battery. Upon operating, the link release relay R300 completes at RA301 a holding circuit for itself, this circuit extending from ground at RA301 by way of RA302, C1270, RA261, C1269, RA331, RA353 and the winding of R300 to battery. At RA303, the relay R300 substitutes ground as applied to the grounded conductor C1272 by the timing apparatus for the ground at RA304, upon the conductor C1251. The conductor C1251 at this time is grounded in the timing apparatus 370, the ground extension path extending from the timing apparatus 370 by way of the conductor C1272, RA303, RA304, RA321, to the conductor C1251. Ground on C1251 serves to retain the operated one of the gang relays R270, R280, etc., and the operated one of the unit relays R200, R205, etc., in the finder switch 200 in operated positions under the control of the timing apparatus 370. A predetermined time interval after ground is placed upon the conductor C1272, ground is removed therefrom in the timing apparatus 370, thereby interrupting the holding circuits of the operated one of the gang relays R270, R280, etc., and the operated one of the unit relays R200, R205, etc., in the finder switch 200, unless the call has been extended prior to this time from the link 300 to an inter-office trunk line or completed to a called line, as will be explained subsequently. The operated gang and unit relays then restore to release the finder switch 200. When the finder switch 200 restores, the series operating circuit of the cut-off relay and the lock-out relay, individual to the line initiating the call, is interrupted. The cut-off relay immediately restores, causing the line relay, individual to the line initiating the call, to operate and complete a holding circuit for the lock-out relay, thereby to prevent the line initiating the call from being assigned another link by the common equipment. The line and lock-out relays individual to the calling line cooperate to retain ground on the control conductor of the line, thereby to busy the line to incoming calls. Before the calling line may be assigned another link, it is necessary that the receiver of the telephone instrument at the telephone station connected to this line be replaced upon its associated switch hook in order to release the line relay, thereby to release the lock-out relay. Also, when the finder switch 200 is released, the calling subscriber's loop circuit as traced above is interrupted causing the line relay R310 to restore. When R310 restores, the impulsing relay R305 and the hold relay R320 are caused to restore, thereby releasing the link 300.

Further to illustrate the operation of the link release apparatus, assume that a call initiated at the telephone station 1B has been extended by way of the line 20 to the link 300 and that the dialing mechanism associated with the telephone instrument at the calling station 1B is not thereafter actuated to extend the call from the link to an inter-office trunk line or to a called line. After a predetermined time interval the relay R225 provided in the finder switch 200 restores, as previously explained, and interrupts at RA224', RA228, and the contact springs of R270 points in the ground circuit extending between the control conductor C1205 of the line 20 and the grounded control conductor C1264. The cut-off relay R120 immediately restores and completes at RA121 and RA122 the operating circuit of the line relay R125. The lock-out relay R115, being of the slow-to-release type, does not immediately restore. Upon operating, the line relay R125 completes at RA127 a holding circuit for the lock-out relay R115, this circuit extending from ground at RA127 by way of RA117 and the winding of R115 to battery. The line relay R125 also places ground at RA126 upon the control conductor C1205 of the line 20, thereby marking the line 20 as busy in the connector switches to which it extends. The lock-out relay R115 remains operated to interrupt at RA117 and RA118 the start circuits extending to the relays R600, R655 and R630, respectively, in the common equipment, thereby to prevent the line 20 from being assigned another idle link. The lock-out relay R115 remains operated until the receiver of the telephone instrument is replaced upon its associated switch hook at the telephone station 1B to interrupt the operating circuit of the line relay R125. The line relay R125 then restores and interrupts at RA127 the holding circuit of the lock-out relay R115 and removes ground at RA126 from the control conductor C1205 of the line 20. The lock-out relay R115 then restores. The line 20 may then seize an idle link when the receiver of the telephone instrument is removed from its associated switch hook at the telephone station 1B, as previously explained.

Thus, a party initiating a call has a predetermined time interval after a link has been seized within which to complete the call from the link to a called telephone station or to an inter-office trunk line. If the call is extended from the link to a called telephone station or to an inter-office trunk line within this time interval and before ground in the timing apparatus 370 is removed from the conductor C1272, the link is not released as the operating circuit of the link release relay R300 is interrupted at the armature RA331 of the called party slave relay R330 when the called party answers the call, and interrupted at the armature RA353 of the switching through relay R350 when the call is extended to an inter-office trunk line. When the operating circuit of the link release relay R300 is interrupted, R300 restores and substitutes ground at RA304 for the ground applied to C1272, upon the conductor C1251, thereby rendering the removal of ground from the conductor C1272 in the timing apparatus 370 ineffectual to release the link 300, and rendering the release of the finder switch 200 and the link 300 under the control of the hold relay R320.

*Operation of the counting relay network during impulsing*

When the connection from a calling telephone station has been extended to a link circuit, the line relay embodied in the link is conditioned to respond to impulses transmitted from the dialing mechanism associated with the telephone instrument at the calling telephone station. For example, in the first link 300 the line relay R310 is operated after the link has been seized, this circuit extending from ground at RA412 by way of the link line conductor C1282, RA352, the link line conductor C1261, through the finder switch 200 and the telephone instrument at the calling telephone station, back through the finder switch 200, the link line conductor C1263, RA355, RA335 and the upper winding of R310 to battery. When the dialing mechanism associated with the telephone instrument at the calling telephone station is actuated, the above-traced operating circuit of the line relay, R310 is alternately interrupted and completed at the dialing mechanism a predetermined number of times, depending upon the digit dialed.

At the beginning of the first impulse dialed at the dialing mechanism associated with the telephone instrument, the operating circuit of the line relay R310 is interrupted, causing R310 to restore, to interrupt at RA312 the holding circuit of the hold relay R320. When R310 restores, it also completes a priming circuit for itself, this circuit extending from ground at RA323, by way of C1300, RA312, the resistor R310', RA335 and the upper winding of R310 to battery. The energization furnished R310 through the completion of the above-traced priming circuit does not cause the reoperation of R310, but renders this relay more sensitive to succeeding impulses transmitted thereto. When R310 restores it also interrupts at RA311 the operating circuit of the link impulsing relay R305. When R305 restores, the relay R315 is energized over a circuit extending from ground at RA322 by way of RA307 and the upper winding of R315 to battery. The relay R315 is slow to operate as it is provided with a lower winding which is short-circuited at RA317. When the relay R315 operates, it interrupts at RA316 the additional holding circuit of the hold relay R320, and interrupts at RA317 the short circuit through its lower winding, rendering itself fast to restore. When the relay R315 operates, it also prepares at RA318 a circuit for again energizing the link impulsing relay R305. Also, when the link impulsing relay R305 restores, a ground pulse extending from ground at RA322 is applied at RA306 to the impulsing lead C1292. The hold relay R320 is of the slow-to-release type and, hence, does not restore during the impulsing period. Upon restoring, R305 also interrupts at RA309 a point in the original operating circuit of the hold relay R320, and interrupts at RA308 a further point in its own holding circuit.

At the end of the first pulse from the dialing mechanism, the above-traced operating circuit for the line relay R310 is again completed. The relay R310 then operates and completes at RA311 a circuit extending from ground at RA318 for reoperating the line impulsing relay R305. The line relay R310 also interrupts at RA312 its priming circuit as traced above, and completes at RA312 the above-traced holding circuit for the hold relay R320. When the link impulsing relay R305 operates, it completes at RA308 its own holding circuit, interrupts at RA307 the operating circuit of the relay R315, and removes ground at RA306 from the impulsing lead C1292.

The cycle of operation of the relays R310, R305 and R315 above described is repeated in response to each additional impulse from the dialing mechanism associated with the telephone instrument at the calling telephone station.

The first ground pulse applied to the impulsing lead C1292 results in the completion of an operating circuit for the relay R800, this circuit extending from the grounded impulsing lead C1292 by way of RA415, C1344 and the winding of R800 to battery. The relay R800 is of the slow-to-release type and remains in operated condition during impulsing.

The first ground pulse transmitted over the impulse lead C1292 also results in the completion of an operating circuit for the first counting relay R700, in the counting relay network, this circuit extending from the grounded impulsing lead C1292 by way of RA415, C1344, RA811, RC812, RA821, RC822, RA831, RC832, C1328 and the winding of R700 to battery. The counting relay R700 operates and completes at RA703 a circuit for holding R700 operated and for short-circuiting the relay R830, this circuit extending from battery at R700 by way of the winding of R700, RA703, C1278, the winding of R830, RC826, RA824, RC805, RA804, C1343, C1300, and RA323 to ground. As this series circuit including the windings of the counting relay R700 and the relay R830 and extending to ground by way of C1300 is in multiple with the impulsing circuit including the winding of the counting relay R700 and extending to ground by way of the impulsing lead C1292, the relay R830 is short-circuited and is not operated at this time. When R805 reoperates at the end of the first pulse transmitted over the impulsing lead C1292, ground is removed from the impulsing lead C1292, thereby interrupting the short circuit around R830, permitting the relay R830 to be energized in series with the counting relay R700.

When the counting relay R700 operates it prepares at RA702 a point in the circuit for operating the counting relay R710. When the relay R830 operates, it interrupts at RA831 and the associated contact RC832 the original operating circuit extending from the impulsing lead C1292 by way of C1328 to the counting relay R700 and prepares at RA831 and the associated contact RC833 the operating circuit extending from the impulsing lead C1292 by way of C1325 to the counting relay R710. The relay R830 also interrupts at RA834 and the associated contact RC836 a point in the circuit for holding the relay R810 and any associated one of the counting relays energized in series.

The second ground pulse transmitted over the impulsing lead C1292 results in the completion of an operating circuit for the counting relay R710, this circuit extending from the grounded impulsing lead C1292 by way of RA415, C1344, RA811, RC812, RA821, RC822, RA831, RC833, C1325, RA702 and the winding of R710 to battery. The counting relay R710 now operates and completes at RA713 a circuit for holding R710 operated and for short-circuiting the relay R820, this circuit extending from battery at R710 by way of the winding of R710, RA713, C1326, the windings of R820, RC816, RA814, RC805, RA804, C1343, C1300 and RA323 to ground. As this series circuit including the windings of the counting relay R710 and the relay R820 and extending to ground by way of C1300 is in multiple with the impulsing circuit including the winding of the counting relay R710 and extending to ground by way of the impulsing lead C1292, the relay R820 is short-circuited and does not operate at this time. At the end of the second pulse transmitted over the impulsing lead C1292 ground is removed from the impulsing lead C1292, thereby interrupting the short circuit around R820, and the relay R820 is energized in series with the counting relay R710. When the counting relay R710 operates it prepares at RA712 a point in the operating circuit for the third counting relay R720. When the relay R820 operates it interrupts at RA821 and the associated contact RC822 the original operating circuit extending from the impulsing lead C1292 by way of C1325 to the counting relay R710 and prepares at RA821 and RC823 another point in the operating circuit for the counting relay R720. The relay R820 also interrupts at RA824 and RC826 a point in the circuit for holding the relays R830 and R700 energized in series, causing these two relays to restore.

The third ground pulse transmitted over the impulsing lead C1292 results in the completion of an operating circuit for the third counting relay R720, this circuit extending from the grounded impulsing lead C1292 by way of RA415, C1344, RA811, RC812, RA821, RC823, C1324, RA712 and the winding of R720 to battery. The counting relay R720 operates and completes at RA723 a circuit for holding R720 operated and for short-circuiting the relay R810, this circuit extending from battery at R720 by way of the winding of R720, RA723, C1327, the winding of R810, RC836, RA834, RC805, RA804, C1343, C1300 and RA323 to ground. As this series circuit including the windings of the counting relay R720 and the relay R810 and extending to ground by way of C1300 is in multiple with the impulsing circuit including the winding of the counting relay R720 and extending to ground by way of the impulsing lead C1292, the relay R810 is short-circuited and is not operated at this time. At the end of the third pulse transmitted over the impulsing lead C1292 ground is removed from the impulsing lead C1292, thereby interrupting the short circuit around R810, and the relay R810 is energized in series with the counting relay R720. When the counting relay R720 operates, it prepares at RA722 a point in the circuit for energizing the counting relay R730. When the relay R810 operates it interrupts at RA811 and the associated contact RC812 the original operating circuit for the counting relay R720 and prepares at RA811 and RC813 the operating circuit for the fourth counting relay R730. The relay R810 also interrupts at RA814 and the associated contact RC816 a point in the circuit for holding the relay R820 and the counting relay R710 energized in series, causing these two relays to restore.

When the fourth ground pulse is transmitted over the impulsing lead C1292 the operating circuit for the counting relay R730 is completed, this circuit extending from the grounded impulsing lead C1292 by way of RA415, C1344, RA811, RC813, C1323, RA722 and the winding of the counting relay R730 to battery. The counting relay R730 now operates and completes at RA733 a circuit for holding R730 operated and for short-circuiting the relay R830, this circuit extending from battery at R730 by way of the winding of R730, RA733, C1278, the winding of R830, RC826, RA824, RC805, RA804, C1343, C1300 and RA323 to ground. At the end of the fourth pulse transmitted over the impulsing lead C1292 the short circuit around the relay R830 is removed, and the relay R830 is energized in series with the counting relay R730. When the counting relay R730 operates it prepares at RA732 a point in the circuit for operating the counting relay R740. When the relay R830 operates it prepares at RA831 and RC833 a further point in the operating circuit for the fifth counting relay R740. The relay R830 also interrupts at RA834 and RC836 a point in the circuit for holding the relay R810 and the counting relay R720 operated in series, causing the two last-named relays to restore. When R810 restores it prepares at RA811 and RC812 further points in the operating circuit for the counting relay R740.

In a similar manner the counting relays R740 to R790, inclusive, are operated successively in response to successive ground pulses transmitted over the impulsing lead C1292. As each counting relay is operated it prepares a point in the circuit for operating the succeeding counting relay from the impulsing lead C1292 and completes the circuit for holding itself and one of the relays R810, R820 and R830 operated in series. As each of the relays R810, R820 and R830 operates, it prepares the circuit for operating the succeeding counting relay from the impulsing lead C1292 and interrupts the circuit for holding the preceding counting relay and one of the relays R810, R820 and R830 operated in series.

From the foregoing it will be apparent that at the end of the first, fourth, seventh and tenth ground pulses transmitted over the impulsing lead C1292, the relay R830 is held operated in series with the counting relays R700, R730, R760 and R790, respectively. At the end of the second, fifth and eighth ground pulses transmitted over the impulsing lead C1292, the relay R820 is held operated in series with the counting relays R710, R740 and R770, respectively. At the end of the third, sixth and ninth ground pulses transmitted over the impulsing lead C1292, the relay R810 is held operated in series with the counting relays R720, R750 and R780, respectively. Thus it will be apparent that, by utilizing only the three relays R810, R820 and R830, each of the ten counting relays R700 to R790, inclusive, may be successively held operated. It will be understood that the last one of the counting relays to be operated and held in an operated position depends upon the number of successive ground pulses transmitted over the impulsing lead C1292 during the impulsing period, which, in turn, is determined by the digit dialed at the calling telephone station.

*Selecting a particular 10-line group in the connector switch*

In order to extend the connection to a particular line terminated in the associated connector switch, it is first necessary to select the particular 10-line group including the desired line. This is accomplished by dialing a corresponding tens digit or by dialing a given prefix digit and then a corresponding tens digit at the calling telephone station.

In extending the connection to a particular line in the second 10-line group, the tens digit 2 is dialed so that, at the end of the impulsing period and when ground is removed from the impulsing lead C1292, the counting relay R710 in the counting relay network is held energized in series with the relay R820 in the manner set forth above. Shortly after ground is removed from the impulsing lead C1292 at the end of the digit, the slow-to-release relay R800 restores, and a circuit is completed for energizing the connector gang relay R570, individual to the second 10-line group, this circuit extending from ground at RA323 by way of the conductor C1300, C1343, RA804, RC806, RA827, C1348, RA477, C1320, RA711, the conductor C1303 in the cable C1315, and the winding of R570 to battery. The gang relay R570 operates and closes its contact springs to connect the lines numbered from 20 to 29 to the armature springs of the connector unit relays, and to complete the operating circuit for the busy relay R420. The operating circuit of the busy relay R420 extends from battery at R420 by way of the winding of R420, RA472, C1357, the contact springs of the gang relay R570, the conductor C1303 in the cable C1315, RA711, C1320, RA477, C1348, RA827, RC806, RA804, and C1343, to the grounded conductor C1300. Upon operating, the busy relay R420 completes at RA422 and RA423 a circuit for short-circuiting the upper winding of the tens relay R470, the short-circuiting path extending from ground as extended to the contact springs of the gang relay R570 by way of C1357, the upper winding of R470, RA422, and RA423 to the grounded conductor C1300. Shortly thereafter and when the counting relay R710 restores to interrupt the operating circuit for the gang relay R570, the above-traced short-circuiting path is interrupted permitting the upper winding of R470 to be energized in series with the gang relay R570 from battery at R570. The gang relay R570 remains operated and R470 is caused to operate. Upon operating, the tens relay R470 completes at RA471 and RA472 a holding circuit of the gang relay R570, this circuit extending from ground at RA471 by way of RA472, C1357, the contact springs of the gang relay R570 and the winding of R570 to battery. The tens relay R470 also completes at RA473 a holding circuit for itself, this circuit extending from battery at R470 by way of the lower winding of R470 and RA473 to the grounded conductor C1300; interrupts at RA474 the circuit extending from the dial tone lead C1346 of the busy and dial tone apparatus 840 to the link conductor C1291; prepares at RA475 a point in the circuit for energizing the group unit relay R500 in the connector switch 500; interrupts at RA476 a point in the circuit for energizing the switching-through relay R350; prepares at RA477 and RA479 points in the operating circuits of the connector unit relays R520, R530, etc., in the connector switch 500; and interrupts at RA472 the operating circuit of the busy relay R420, causing the last-mentioned relay to restore.

As indicated above, shortly before the tens relay R470 operates, the counting relay R710 and the relay R820, energized in series therewith, restore, these latter relays being held operated in series for a short time interval after the relay R800 restores to interrupt at RA804 and RC805 the normal holding circuit therefor, by the multiple ground connection through the condenser and resistor shown to the left of R820. The counting relay network is now conditioned to respond to the impulse of a units digit dialed at the calling substation in order to cause the connector switch of the link to select a particular line in the previously selected second 10-line group.

In extending the connection to a particular line in the third 10-line group, the tens digit 3 is dialed so that, at the end of the impulsing period when ground is removed from the impulsing lead C1292, the counting relay R720 in the counting relay network is held energized in series with the relay R810 in the manner set forth above. Shortly after ground is removed from the impulsing lead C1292, the slow-to-release relay R800 restores, and a circuit is completed for energizing the connector gang relay R580, individual to the third 10-line group, this circuit extending from ground at RA323 by way of the conductor C1300, C1343, RA807, RC808, RA818, C1347, RA479, C1322, RA721, the conductor C1304 in the cable C1315, and the winding of R580 to battery. The gang relay R580 now operates and closes its contact springs to connect the lines numbered from 30 to 39 to the armature springs of the connector unit relays and to complete a circuit for energizing the busy relay R420. The operating circuit of the busy relay R420 extends from battery at R420 by way of the winding of R420, RA472, C1357, the contact springs of the gang relay R580, the conductor C1304 in the cable C1315, RA721, C1322, RA479, C1347, RA818, RC808, RA807, and C1343, to the grounded conductor C1300. Upon operating, the busy relay R420 completes the above-traced path for short-circuiting the upper winding of the tens relay R470. The latter relay operates, when the counting relay R720 and the relay R810 operated in series therewith restore, as previously explained. Upon restoring, the relay R720 and R810 condition the counting relay network to respond to the impulses of a units digit dialed at the calling telephone station in order to cause the connector switch of the link to select a particular line in the previously selected third 10-line group.

In extending the call from the link 300 to a particular line in the fourth 10-line group, the tens digit 4 is dialed so that, at the end of the impulsing period when ground is removed from the impulsing lead C1292, the counting relay R730 in the counting relay network is held energized in series with R830. Shortly after ground is removed from the impulsing lead C1292, the slow-to release relay R800 restores and a circuit is completed for energizing the connector gang relay, individual to the fourth 10-line group, this circuit extending from ground at RA323 by way of the conductor C1300, C1343, RA804, RC806, RA837, C1348, RA477, C1320, RA731, the conductor C1305 in the cable C1315, and the winding of the gang relay individual to the fourth 10-line group, to battery. This gang relay operates and closes its contact springs to connect the lines numbered from 40 to 49 to the armature springs of the connector unit relays, and to complete a circuit for energizing the busy relay R420, this circuit being similar to that traced previously. When the busy relay R420 operates, the tens relay R470 is caused to operate as previously explained. As indicated above, shortly before the tens relay R470 operates, the counting relay R730 and the relay R830 energized in series therewith restore, to interrupt the original operating circuit of the gang relay individual to the fourth 10-line group, and to condition the counting relay network to respond to a units digit dialed at the calling telephone station.

In extending the connection to a particular line in the fifth 10-line group, the tens digit 5 is dialed at the calling station so that, at the end of the impulsing period when ground is removed from the impulsing lead C1292, the counting relay R740 in the counting relay network remains energized in series with the relay R820. Shortly after ground is removed from the impulsing lead C1292, the slow-to-release relay R800 restores, a circuit is completed for energizing the connector gang relay individual to the fifth 10-line group, this circuit extending from ground at RA323 by way of the conductor C1300, C1343, RA807, RC808, RA828, C1347, RA479, C1322, RA742, the conductor C1306 in the cable C1315, and the winding of the gang relay individual to the fifth 10-line group to battery. This gang relay operates and closes its contact springs to connect the lines numbered from 50 to 59 to the armature springs of the connector unit relays, and to complete the operating circuit for the busy relay R420 in a manner similar to that previously explained. When the busy relay R420 operates, the tens relay R470 is caused to operate as previously explained. As indicated above, shortly before the tens relay R470 operates, the counting relay R740 and the relay R820, energized in series therewith, restore, to interrupt the original operating circuit of the gang relay individual to the fifth 10-line group, and to condition the counting relay network to respond to a units digit dialed at the calling telephone station.

In extending the connection to a particular line in the sixth 10-line group, the tens digit 6 is dialed at the calling station so that, at the end of the impulsing period when ground is removed from the impulsing lead C1292, the counting relay R750 and the relay R810 remain operated. Shortly after ground is removed from the impulsing lead C1292, the slow-to-release relay R800 restores, to complete the operating circuit for the connector gang relay individual to the sixth 10-line group, this circuit extending from ground at RA323 by way of the conductor C1300, C1343, RA804, RC806, RA817, C1348, RA477, C1320, RA752, the conductor C1307 in the cable C1315, and the winding of the gang relay individual to the sixth 10-line group to battery. This gang relay operates and closes its contact springs to connect the lines numbered from 60 to 69 to the armature springs of the connector unit relays and to complete the operating circuit for the busy relay R420 in a manner similar to that previously explained. When the busy relay R420 operates, the tens relay R470 is caused to operate as previously explained. Shortly before the tens relay R470 operates, the counting relay R750 and the relay R810 restore to interrupt the original operating circuit of the gang relay individual to the sixth 10-line group, and to condition the counting relay network to respond to a units digit dialed at the calling station.

In extending the connection to a particular line in the seventh 10-line group, the tens digit 7 is dialed at the calling station so that, at the end of the digit when ground is removed from the impulsing lead C1292, the counting relay R760 and the relay R830 remain operated. Shortly after ground is removed from the impulsing lead C1292, the slow-to-release relay R800 restores to complete a circuit for energizing the connector gang relay, individual to the seventh 10-line group, this circuit extending from ground at RA323 by way of the conductor C1300, C1343, RA807, RC808, RA839, C1347, RA479, C1322, RA761, the conductor C1308 in the cable C1315, and the winding of the gang relay individual to the seventh 10-line group to battery. This gang relay operates and closes it contact springs to connect the lines numbered from 70 to 79 to the armature springs of the connector unit relays and to complete the operating circuit for the busy relay R420 in a manner similar to that previously explained. When the busy relay R420 operates, the tens relay R470 is caused to operate as previously explained. As indicated above, shortly before the tens relay R470 operates, the counting relay R760 and the relay R830 restore to interrupt the original operating circuit of the gang relay individual to the seventh 10-line group, and to condition the counting relay network to respond to a units digit dialed at the calling telephone station.

In extending a connection to a line in the eighth 10-line group, it is necessary to dial the prefix digit 8 and then dial the tens digit 8. At the end of the digit ground is removed from the impulsing lead C1292, causing the counting relay R770 in the counting relay network to be held energized in series with the relay R820. Shortly after ground is removed from the impulsing lead C1292, the slow-to-release relay R800 restores to complete a circuit for energizing the slow-to-release reverting call relay R400, this circuit extending from ground at RA323 by way of C1300, C1343, RA804, RC806, RA827, C1348, RA477, C1320, RA771, C1297, RA342, C1296 and the winding of R400 to battery.

Upon operating, the reverting call relay R400 completes at RA403 and RA405 a circuit for operating the prefix digit relay R340, this circuit extending from the grounded conductor C1297 by way of RA403, RA405, C1299, RA345 and the winding of R340 to battery. The reverting call relay R400 also places multiple ground at RA406 upon the hold conductor C1300 and completes at RA401, RA402 and RA404 a holding circuit for itself, this circuit extending from ground at RA304 by way of RA336, C1289, RA401, RA402, C1339, RA802, C1340, RA404, and the winding of R400 to battery.

The prefix digit relay R340 operates and completes at RA344 and RA345 a holding circuit for itself extending from the grounded conductor C1300 by way of RA344, RA345 and the winding of R340 to battery. Upon operating, the prefix digit relay R340 interrupts at RA342 the original operating circuit of the reverting call relay R400; interrupts at RA345 its own operating circuit; completes at RA341 a circuit extending by way of C1284 for energizing the prefix digit slave relay R460; prepares at RA343 a point in the circuit for energizing the gang relay individual to the eighth 10-line group in the connector switch 500; and completes at RA346 a circuit for holding the counting relay R770 operated until after the prefix digit slave relay R460 operates and for causing the relay R820, which is energized in series with the counting relay R770, immediately to restore. This last-mentioned circuit extends from ground at RA489 by way of RA464, C1279, RA346, C1277 and the winding of R770 to battery. Thus, the counting relay R770 is held in its operated position and the relay R820 is short-circuited and restores. This arrangement retains the counting relay R770 operated and causes the relay R820 to restore independently of the condition of the normal circuit, including the counting relay R770 and the relay R820 in series. The prefix digit slave relay R460, being of the slow-to-operate type, operates shortly thereafter to disconnect at RA462 the dial tone lead C1346 of the busy and dial tone apparatus 840 from the link conductor C1291, and to interrupt at RA464 the previously traced holding circuit for the counting relay R770, causing the last-mentioned relay to restore. The counting relay network is now conditioned to respond to the impulses of the tens digit to select the connector gang relay individual to the eighth 10-line group.

When the first impulse of the tens digit 8 is dialed the slow-to-release relay R800 is again energized over the impulsing circuit, and remains operated during the entire impulsing period. When the relay R800 operates, it interrupts at RA802 the previously traced holding circuit of the reverting call relay R400, causing the latter, which is of the slow-to-release type, to restore shortly thereafter. Upon restoring, the reverting call relay R400 interrupts at RA401, RA402 and RA404 further points in its holding circuit, removes multiple ground at RA406 from the hold conductor C1300, and prepares at RA403 a further point in the operating circuit of the gang relay individual to the eighth group of lines terminated in the connector switch 500.

At the end of the impulsing period, ground is removed from the impulsing lead C1292, causing the counting relay R770 in the counting relay network to be held energized in series with the relay R820. Shortly after ground is removed from the impulsing lead C1292, the slow-to-release relay R800 restores to complete the operating circuit for the connector gang relay individual to the eighth 10-line group, this circuit extending from ground at RA323 by way of the conductor C1300, C1343, RA804, RC806, RA827, C1348, RA477, C1320, RA771, C1297, RA403, C1298, RA343, the conductor C1276 in the cable C1315, and the winding of the gang relay individual to the eighth 10-line group to battery. This gang relay now operates and closes its contact springs to connect the lines numbered from 80 to 89 to the armature springs of the unit relays and to complete an operating circuit of the busy relay R420. The operating circuit of the busy relay R420 extends from battery at R420 by way of the winding of R420, RA472, C1357, the contact springs of the gang relay individual to the eighth 10-line group, the conductor C1276 in the cable C1315, RA343, C1298, RA403, C1297, RA771, C1320, RA477, C1348, RA827, RC806, RA804, C1343, to the grounded conductor C1300. When the busy relay R420 operates, the tens relay R470 is caused to operate as previously explained. As indicated above, shortly before the tens relay R470 operates, the counting relay R770 and the relay R820 restore to interrupt the original operating circuit of the operated connector gang relay and to condition the counting relay network to respond to the impulses of a units digit dialed at the calling telephone station.

In extending a connection from a calling line to a line in the ninth 10-line group, it is necessary to dial the prefix digit 8 and then dial the tens digit 9. When the prefix digit 8 is dialed, the reverting call relay R400, the prefix digit relay R340 and the prefix digit slave relay R460 are caused to operate in the manner previously explained. Upon operating, the prefix digit slave relay R460 prepares at RA463 a point in the operating circuit for the connector gang relay, individual to the ninth 10-line group.

The tens digit 9 is then dialed and at the end of this digit ground is removed from the impulsing lead C1292, causing the counting relay R780 to be held energized in series with the relay R810. Shortly after ground is removed from the impulsing lead C1292, the slow-to-release relay R800 restores to complete the operating circuit for the connector gang relay R1195 individual to the ninth 10-line group, this circuit extending from ground at RA323 by way of the conductor C1300, C1343, RA807, RC808, RA818, C1347, RA479, C1322, RA783, C1321, RA463, the conductor C1309 in the cable C1315, and the winding of the gang relay R1195 to battery. The gang switch R1195 now operates and closes its contact springs to connect the lines numbered from 90 to 99 to the armature springs of the connector unit relays and to complete the operating circuit for the busy relay R420 in a manner similar to that previously explained. When the busy relay R420 operates, the tens relay R470 is caused to operate as previously explained. As indicated above, shortly before the tens relay R470 operates, the counting relay R780 and the relay R810, operated in series therewith, restore to interrupt the original operating circuit of the gang relay R1195, and to condition the counting relay network to respond to the impulses of a units digit dialed at the calling telephone station.

In extending a connection from a calling line to a line in the tenth 10-line group, it is necessary to dial the prefix digit 8 and then dial the tens digit 0. When the prefix digit 8 is dialed, the reverting call relay R400, the prefix digit relay R340 and the prefix digit slave relay R460 are caused to operate, as previously explained. Upon operating, the prefix digit slave relay R460 prepares at RA466 a point in the circuit for energizing the connector gang relay R1170, individual to the tenth group of lines terminating in the connector switch 500.

The tens digit 0 is then dialed and at the end of the digit, ground is removed from the impulsing lead C1292, causing the counting relay R790 in the counting relay network to be held energized in series with the relay R830. Shortly after ground is removed from the impulsing lead C1292, the slow-to-release relay R800 restores to complete the operating circuit for the gang relay R1170 individual to the tenth 10-line group in the connector switch 500, this circuit extending from ground at RA323 by way of the conductor C1300, C1343, RA804, RC806, RA837, C1348, RA477, C1320, RA793, C1319, RA466, the conductor C1310 in the cable C1315 and the winding of the gang relay R1170 to battery. The gang relay R1170 now operates and closes its contact springs to connect the lines numbered from 00 to 09 to the armature springs of the connector unit relays and to complete the operating circuit for the busy relay R420 in the manner described above. When the busy relay R420 operates, the tens relay R470 is caused to operate as previously explained. As indicated above, shortly before the tens relay R470 operates, the counting relay R790 and the relay R830 restore to interrupt the original operating circuit of the gang relay R1170 and to condition the counting relay network to respond to the impulses of a units digit dialed at the calling telephone station.

In extending a connection from a calling line to a line in the first 10-line group, it is necessary to dial the prefix digit 8 and then dial the tens digit 1. When the prefix digit 8 is dialed, the reverting call relay R400, the prefix digit relay R340 and the prefix digit slave relay R460 are caused to operate in the manner explained previously. Upon operating, the prefix digit relay R340 prepares at RA347 a point in the operating circuit for the gang relay individual to the first group of lines terminating in the connector switch 500.

The tens digit 1 is then dialed and at the end of the digit when ground is removed from the impulsing lead C1292, the counting relay R700 is held energized in series with the relay R830. Shortly after ground is removed from the impulsing lead C1292, the slow-to-release relay R800 restores to complete the operating circuit for the gang relay individual to the first group of lines terminating in the connector switch 500, this circuit extending from ground at RA323 by way of the conductor C1300, C1343, RA807, RC808, RA839, C1347, RA479, C1322, RA701, C1274, RA347, the conductor C1275 in the cable C1315, and the winding of the gang relay, individual to the first line group, to battery. This gang relay now operates and closes its contact springs to connect the lines numbered from 10 to 19 to the armature springs of the connector unit relays and to complete the operating circuit for the busy relay R420 in a manner similar to that previously explained. When the busy relay R420 operates, the tens relay R470 is caused to operate as previously explained. As indicated above, shortly before the tens relay R470 operates, the counting relay R700 and the relay R830 restore to interrupt the operating circuit of the gang relay individual to the first 10-line group, and to condition the counting relay network to respond to the impulses of a units digit dialed at the calling telephone station.

As pointed out above, in extending a call to the first 10-line group in the connector switch 500, the prefix digit 8 is first dialed and then the tens digit 1 is dialed. Thus the digit 1 is never dialed as a first digit after one of the links has been seized. However, a first digit comprising a single impulse may be transmitted from the telephone instrument at the calling telephone station through the link 300 to the counting relay network inadvertently, due to a momentary interruption of the calling subscriber's loop circuit produced by actuation of the switch hook associated with the receiver of the telephone instrument. A digit of this form, comprising a single impulse, is likely to be followed immediately by a digit comprising a plurality of impulses and constituting the first digit dialed, and will result in an improper connection, unless the counting relay network is released somewhat faster than usual at the end of the single impulse. An arrangement comprising the armature RA347 of the prefix digit relay R340 and a pair of conductors C1274 and C1278 is provided in order to render the counting relay network fast to release when the first digit comprises a single impulse.

For example, assuming that the first digit comprises a single impulse produced by operation of the switch hook at the calling telephone station, the counting relay R700 in the counting relay network is energized in series with the relay R830 at the end of the ground pulse applied to C1292. Normally, the counting relay R700 would be held operated in series with the relay R830 a predetermined time interval, depending upon the characteristic of the holding circuit therefor comprising the resistor and condenser indicated to the left of the relay R830. However, in the present instance, the counting relay R700 completes at RA701 a circuit for short-circuiting the relay R830 and a circuit for holding the counting relay R700 operated, the first mentioned circuit extending from ground at RA323 by way of the conductor C1300, C1343, RA807, RC808, RA839, C1347, RA479, C1322, RA701, C1274, RA347, C1278, the winding of R830 and the resistor and condenser at R830 to ground, and the second mentioned circuit extending from the grounded conductor C1278 by way of RA703 and the winding of R700 to battery. The relay R830 immediately restores and interrupts at RA839 the above traced circuit for holding the counting relay R700 operated, causing the latter relay to restore. The counting relay network is thus promptly conditioned to receive the impulses of the first digit dialed at the calling telephone station.

*Selecting a particular line in a previously selected group of lines terminating in the connector switch*

In order to extend the connection to a particular line in a previously selected group of lines terminated in a connector switch, a corresponding units digit is dialed at the calling telephone station.

In extending the call to the first line in a previously selected 10-line group, the units digit 1 is dialed. At the end of the digit ground is removed from the impulsing lead C1292, causing the counting relay R700 in the counting relay network to be held energized in series with the relay R830 in the manner described above. Shortly after ground is removed from the impulsing lead C1292, the slow-to-release relay R800 restores to complete the operating circuit for the unit relay R560 corresponding to the first and sixth lines of the previously selected 10-line group, this circuit extending from ground at RA323 by way of the conductor C1300, C1343, RA807, RC808, RA839, C1347, RA479, RA490, C1332, RA705, the conductor C1401 in the cable C1333, C1375, RA1171, RC1172, C1386, RA1196, RC1198, C1378, and the winding of R560 to battery. The unit relay R560 now operates to complete at RA567 a circuit for energizing the ring pickup relay R430, this circuit extending from battery at R430 by way of the winding of R430, RA485, C1360, RA567, C1378, RC1198, RA1196, C1386, RC1172, RA1171, C1375, the conductor C1401 in the cable C1333, RA705, C1332, RA490, RA479, C1347, RA839, RC808, RA807, and C1343 to the grounded conductor C1300. Upon operating, the ring pickup relay R430 completes at RA434 and RA435 a circuit for short-circuiting the lower winding of the units relay R480, the short-circuiting path extending from ground as extended to RA567 by way of C1360, the lower winding of R480, RA434, RA435 and RA423 to the grounded conductor C1300. Shortly thereafter and when the counting relay R700 restores to interrupt the operating circuit for the connector unit relay R560, the above-traced short-circuiting path is interrupted permitting the lower winding of R480 to be energized in series with the unit relay R560 from battery at R560. The relay R560 remains operated and R480 is caused to operate. Upon operating, the units relay R480 completes at RA484 and RA485 a holding circuit for the unit relay R560, this circuit extending from ground at RA484 by way of RA485, C1360, RA567, and the winding of R560 to battery. The units relay R480 also completes at RA486 a holding circuit for itself, this circuit extending from battery at R480 by way of the upper winding of R480 and RA486 to the grounded conductor C1300. At RA481, the relay R480 completes a point in the holding circuit of the busy relay R420. The relay R480 also completes at RA482 a point in the operating circuit for the generator reversing relay R440; completes at RA487 a point in the circuit for energizing the switching relay R410; completes at RA488 a point in the circuit, traced hereinafter, for holding one of the counting relays R700, R710, etc., in the counting relay network, energized in series with one of the relays R810, R820, etc., after the code digit has been dialed; and interrupts at RA485 the operating circuit of the ring pickup relay R430, causing the last-mentioned relay to restore.

As indicated above, shortly before the units relay R480 operates, the counting relay R700 and the relay R830, operated in series therewith, restore to interrupt the operating circuit of the unit relay R560. The counting relay network is thus conditioned to respond to the impulses of a code selecting digit dialed at the calling telephone station.

Upon operating, the unit relay R560 in the connector switch 500 connects the first or the sixth line in the previously selected 10-line group to the link 300, depending upon the operated or non-operated condition of the subgroup or group unit relay R500, as will be explained more fully subsequently. In the present instance the group unit relay R500 is not operated and the first line in the previously selected 10-line group is connected back to the line conductors of link 300, the link conductor C1281 being connected by way of RA501, C1365, RA561 and the contact springs of the operated gang relay individual to the selected 10-line group to one side of the first line in the selected 10-line group, and the link conductor C1290 being connected by way of RA502, C1367, RA563 and the contact springs of the operated gang relay individual to the selected 10-line group to the other side of the first line in the selected 10-line group. The unit relay R560 also completes at RA565 a circuit for testing the busy or idle condition of the first line in the selected 10-line group. If the first line is busy, ground is present on the control or private conductor extending to the armature RA565. On the other hand, if the line is idle, battery potential is present on this control conductor.

Assuming that the first line in the selected 10-line group is busy, the busy relay R420 is energized when the unit relay R560 in the connector switch 500 operates, the circuit for energizing this relay extending from the grounded control conductor by way of RA565, C1367′, RA503, C1358, RA416, C1342, RA801, C1341 and the winding of R420 to battery. The busy relay R420 operates when energized over the above traced circuit and completes at RA421 a holding circuit for itself, this circuit extending from ground at RA421 by way of RA481, C1280, RA324, C1280′, and the winding of R420 to battery. The busy relay R420 also completes at RA424 a circuit for conducting busy tone current from the busy and dial tone apparatus 840 to the receiver at the calling telephone station, this circuit extending from pulsating battery in the dial and busy tone apparatus 840 by way of the busy tone lead C1351, RA424, RA414, the link conductor C1291, the condenser 1291′ and RA355 to the link conductor C1263. This busy tone current is further conducted over the link conductor C1263 and by way of the finder switch 200, one side of the calling line, the receiver of the telephone instrument at the calling telephone station, the other side of the calling line, the link conductor C1261, RA352, the link conductor C1282 and RA412 to ground. Upon receiving busy tone the party initiating the call is informed that the called line is busy.

When the party initiating the call hangs up, the previously traced operating circuit of the line relay R310 is interrupted. The line relay R310 restores and causes the hold relay R320 to restore. Upon restoring, the hold relay R320 removes ground at RA321 from the conductor C1251, and at RA323 from the hold conductor C1300 and the conductor C1264 connected thereto. When ground is removed from the conductor C1251, the holding circuits of the operated one of the gang relays R270, R280, etc., and the operated one of the unit relays R200, R205, etc., in the finder switch 200, are interrupted, causing these two relays to restore to release the finder switch 200 for further use. When ground is removed from the conductor C1264, the holding circuit of the cut-off and lock-out relays, individual to the calling line, are interrupted, and the latter relays restore, thereby conditioning the calling line for further use. When ground is removed from the conductor C1300, the holding circuits of the tens and units relays R470 and R480, respectively, are interrupted and these relays restore to interrupt, at RA471 and RA484, respectively, the holding circuits of the operated one of the gang relays R570, R580, etc., and the operated unit relay R560 in the connector switch 500. When the operated gang and unit relays restore, the connector switch 500 is released for further use. Thus, the link is released when the calling party at the calling telephone station replaces the receiver of the telephone instrument upon its associated switch hook.

Assuming that the first line in the selected 10-line group is idle, the busy relay R420 is not energized when the unit relay R560 operates, as battery potential is present on the control conductor of the called line which is connected to the armature RA565. At this time the counting relay network is conditioned to be responsive to the impulses of a code selecting digit dialed at the calling substation.

In extending a connection from a calling line to the second line in a previously selected 10-line group, the units digit 2 is dialed so that at the end of the digit when ground is removed from the impulsing lead C1292, the counting relay R710 is locked energized in series with the relay R820. Shortly after ground is removed from the impulsing lead C1292, the slow-to-release relay R800 restores to complete the operating circuit for the unit relay R550, corresponding to the second and seventh lines in the previously selected group of lines terminating in the connector switch 500, this circuit extending from ground at RA323 by way of the conductor C1300, C1343, RA804, RC806, RA827, C1348, RA477, RA487, C1331, RA715, the conductor C1402 in the cable C1333, and the winding of R550 to battery. Upon operating, the unit relay R550 completes the operating circuit for the ring pick-up relay R430. When R430 operates it completes the above traced short-circuiting path for the lower winding of the units relay R480, this path being interrupted to permit the lower winding of R480 to be energized in series with the unit relay R550 from battery at R550, when R710 subsequently restores, as previously explained.

Upon operating, the unit relay R550 connects the second line in the selected 10-line group to the link line of link 300, since the group unit relay R500 is not operated as previously explained. The units relay R550 also completes a circuit for testing the busy or idle condition of the second line in the selected 10-line group, and the operation of the busy relay R420 is dependent upon the busy or idle condition of the selected line as previously explained. At this time, if the selected line is idle, the counting relay network is conditioned to be responsive to a code selected digit dialed at the calling telephone station.

In extending the call to the third, fourth and fifth lines, respectively, in a previously selected 10-line group, the units digits 3, 4 and 5, respectively, are dialed, causing the counting relays R720, R730 and R740, respectively, to complete the operating circuits for the connector unit relays R540, R530 and R520, respectively in a manner which will be readily apparent from the preceding description. Upon operating, the units relays R540, R530 and R520 connect the third, fourth and fifth lines, respectively, in the previously selected 10-line group to the link line of the link 300. The operation of the apparatus is otherwise exactly the same as that previously described, and in each instance the apparatus is conditioned to respond to a code selecting digit dialed at the calling telephone station if the selected line is idle, or the busy relay R420 is caused to operate to apply busy tone current to the calling subscriber's loop circuit if the selected line is busy.

In extending a connection from the calling line to the sixth line in a previously selected 10-line group, the units digit 6 is dialed, which causes the counting relays R700, R710, R720, R730, R740 and R750 in the counting relay network sequentially to operate in the order named, as previously described. At the end of the digit, the relay R750 is held energized in series with the relay R810. The counting relay R740 is caused to operate when the fifth ground pulse is transmitted over the impulsing lead C1292, and the counting relay R750 is caused to operate when the sixth ground pulse is transmitted over the impulsing lead C1292. Shortly after the counting relay R750 operates, the relay R810 is energized in series therewith and, upon operating, interrupts at RA814 the circuit for holding the counting relay R740 energized in series with the relay R820, causing the two last-named relays to restore. When the counting relay R740 operates, it prepares at RA741 a point in the operating circuit for the group unit relay R500 in the connector switch 500, and when the counting relay R750 operates, it completes at RA751 the prepared circuit for energizing the group unit relay R550, this circuit extending from ground at RA741 by way of RA751, C1318, RA475, RA482, C1359, and the winding of R500 to battery.

Upon operating, the group unit relay R500 completes at RA509 an obvious holding circuit for itself extending to the grounded conductor C1300, and at its armatures RA501, RA502, and RA503, disconnects the link conductors C1281, C1290, and C1358, respectively, from the conductors C1365, C1367 and C1367', respectively, and connects them to the conductors C1366, C1368 and C1368', respectively, thereby rendering the unit relays R560, R550, R540, R530 and R520 effective to connect the sixth, seventh, eighth, ninth and tenth lines in a previously selected 10-line group to the link line of the link 300.

Also, at the end of this digit and when R800 restores, the unit relay R560, common to the first and sixth lines in the previously selected 10-line group in the connector switch 500, is energized over a circuit extending from ground at RA323 by way of the conductor C1300, C1343, RA804, RC806, RA817, C1348, RA477, RA487, C1331, RA756, the conductor C1406 in the cable C1333, and the winding of R560 to battery. Upon operating, the unit relay R560 completes the operating circuit for the ring pick-up relay R430, causing the last-named relay to operate and short-circuit the units relay R480 as previously explained. Thereafter and when the operated counting relay R750 restores, the relay R480 is energized in series with the unit relay R560 from battery at R560 and operates to perform the functions outlined above.

With the group unit relay R500 operated, the unit relay R500, upon operating, connects the sixth line in the previously selected 10-line group to the line conductors of the link 300, the link conductor C1281 being connected by way of RA501, C1366, RA562 and the contact springs of the operated gang relay, individual to the selected 10-line group, to one side of the sixth line in the selected 10-line group, and the link conductor C1290 being connected by way of RA502, C1368, RA564 and the contact springs of the operated gang relay, individual to the selected 10-line group, to the other side of the sixth line in the selected 10-line group. The unit relay R560 also completes at RA566 a circuit for testing the busy or idle condition of the sixth line in the selected 10-line group, the operation of the busy relay R420 being dependent upon the busy or idle condition of the selected line, as previously explained. At this time, if the selected line is idle, the counting relay network is conditioned to be responsive to the impulses of a code selecting digit to select the proper code of the ringing current to be applied to the selected called line.

In extending connections to the seventh, eighth, ninth and tenth lines, respectively, in a previously selected 10-line group, the units digits 7, 8, 9 and 0, respectively, are dialed, causing the counting relays R760, R770, R780 and R790, respectively, to select the unit relays R550, R540, R530 and R520, respectively, for energization. In each instance the group unit relay R500 in the connector switch 500 is caused to operate in a manner similar to that previously explained. Upon operating, the unit relays R550, R540, R530 and R520, and the group unit relay R500 connect the seventh, eighth, ninth and tenth lines, respectively, in the previously selected 10-line group to the link 300. The operation of the arrangement is otherwise the same as that previously described, and in each instance the code selecting digit is dialed at the calling telephone station if the selected line is idle or the busy relay R420 is operated to apply busy tone current to calling subscriber's loop circuit if the selected line is busy.

From the above description of the operation of the connector switch 500, it is apparent that each of the unit relays R560, R550, etc., controls the selection of a corresponding line between 1 and 5, or a corresponding line between 6 and 10 in a previously selected 10-line group, depending upon the non-operated or operated condition, respectively, of the group unit relay R500. This arrangement provides a connector switch of extremely simple and economical construction which is thoroughly reliable in operation.

*Applying code ringing current to a selected line in the connector switch*

After a particular line in the connector switch has been selected and found to be idle, a code selecting digit is dialed at the telephone station initiating the call in order to select the code of the ringing current to be applied to the selected called line. In the present telephone system, as many as ten telephone stations may be connected to a particular line, the telephone stations being arranged in two groups of five telephone stations each. The ringers of the first group of telephone stations are connected between one side of the line and ground, while the ringers of the second group of telephone stations are connected between the other side of the line and ground. In signaling a particular telephone station, code ringing current is applied to the side of the line to which the ringers of the group, including the particular called telephone station, are connected. In order to indicate which one of the five telephone stations of the group is being called, a selected one of five different ringing codes comprising five different combinations of short and long ringing impulses is utilized in ringing over the selected line. When a code selecting digit of from 1 to 5 is dialed, the ringers of the first group are selected for energization by the ringing current, the particular character of the selected code indicating which one of the five telephone stations of the first group is being called. On the other hand, when a code digit between 6 and 0 is dialed, the ringers of the second group are selected for energization by the coded ringing current applied to the other side of the line, the particular character of the selected code indicating which one of the five telephone stations of the second group is being called.

In signaling the first telephone station in the first group of telephone stations connected to a selected line, the code selecting digit 1 is dialed at the calling substation. At the end of the digit when ground is removed from the impulsing lead C1292, the relay R830 is locked energized in series with the counting relay R700 in the counting relay network. These two relays are, in this case, held operated over a holding circuit extending from battery at R700 by way of the winding of R700, RA703, C1278, the winding of R830, RC826, RA824, RA834, RC835, C1349, RA488 and RA454 to the grounded conductor C1300. The relay R830 and the counting relay R700 are held operated during the ringing period and until the ring cut-off relay R450 operates in the manner described hereinafter, to interrupt at RA454 the previously traced holding circuit for these two relays. Shortly after ground is removed from the impulsing lead C1292, the slow-to-release relay R800 restores to complete the operating circuit for the switching relay R410, this circuit extending from ground at RA323 by way of the conductor C1300, C1343, RA804, RC806, RA837, C1348, RA477, RA487, RA426 and the winding of R410 to battery.

Upon operating, the switching relay R410 completes at RA419 an obvious holding circuit for itself and completes at RA418 a circuit for energizing the ring pickup relay R430, this latter circuit extending from battery at R430 by way of the winding of R430, RA418, RA436, the conductor C1350 connected to the code interrupter apparatus 1000 and the contacts of a relay, not shown but included in the code interrupter apparatus 1000, to ground. Upon operating, the switching relay R410 interrupts at RA419' the start circuit of the busy and dial tone apparatus 840, and completes at RA419' a start circuit for the code interrupter apparatus 1000, the latter circuit extending from ground at RA325 by way of C1302, RA419', RA455, C1346 and the winding of a start relay, not shown but included in the code interrupter apparatus 1000 to battery, thereby setting the code interrupter apparatus 1000 into operation. The switching relay R410 also interrupts at RA416 a point in the operating circuit of the busy relay R420 and grounds at RA416 the control conductor C1358, thereby to mark the selected called line as busy and to energize the cut-off and lockout-relays individual to the selected line. For example, if the line 20 connected to the telephone station 1B is selected, the cut-off relay R120 and the lockout relay R115, individual thereto, are caused to operate, the energizing circuit for these relays extending from ground at RA416 by way of the control conductor C1358, RA503, C1368', RA526, the contact springs of the gang relay R570, the control conductor C1205 of the line 20, the winding of R120, and the winding of R115 to battery. The cut-off relay R120 now operates and interrupts at RA121 and RA122 the operating circuit of the line relay R125 individual to the line 20, thereby preventing operation of the latter relay to initiate the operation of one of the links.

Also, the switching relay R410 interrupts at RA415 a point in the impulsing circuit as traced above interrupts at RA414 the path for applying dial and busy tone currents to the link conductor C1281, and completes at RA417 a point in the circuit for applying coded ringing current to the selected called line.

The switching relay R410 also prepares at RA411 and RA412 a further point in the circuit for conducting ringing current to the called subscriber's substation. Also, the switching relay R410 removes ground at RA412 from the link conductor C1282 connected to the link conductor C1261 at RA352, and connects at RA412 the line relay R310 directly across the link conductors C1261 and C1263 to hold this relay operated over the calling subscriber's loop circuit, the link conductor C1261 being connected by way of RA352, the link conductor C1282, RA412, the link conductor C1283, RA333, and the lower winding of R310 to ground, and the link conductor C1263 being connected by way of RA355, RA335 and the upper winding of R310 to battery.

When the ring pick-up relay R430 operates, it interrupts at RA436 its original operating circuit, and completes at RA436 and RA433 a holding circuit for itself, this circuit extending from battery at R430 by way of the winding of R430, RA418, RA436, RA433 and RA453 to the grounded conductor C1300, thereby placing the operation of the ring pick-up relay R430 under the control of the ring cut-off relay R450. Upon operating, the ring pick-up relay R430 interrupts at RA431 and RA432 points in the operating circuit of the called party answer relay R365, and prepares at RA431 and RA432 a further point in the path for applying coded ringing current to the link conductor C1281, and a point in the circuit for energizing the ring cut-off relay R450.

Upon operating, the code interrupter apparatus 1000 grounds the start lead C1352 of the ringing apparatus 850. The ringing apparatus 850 now operates and applies ground to the conductor C1355, and pulsating battery to the conductor C1354, in order to control the operation of the code interrupter apparatus 1000. The code interrupter apparatus 1000 operates to apply five different combinations of short and long battery and ground impulses to the conductors C1338, C1337, C1336, C1335 and C1334. At this time, the coded ringing current applied to the conductor C1337, C1336, C1335 and C1334 are of no effect as the conductors mentioned are open-circuited, while the coded ringing current applied to the conductor C1338 is conducted to the link conductor C1281 over a path extending from the conductor C1338 by way of RA704, C1313, RA441, RA431 and RA411 to the link conductor C1281. This coded ringing current is further conducted over the link conductor C1281 and by way of the connector switch 500, one side of the selected line, and through the ringers respectively provided at the first five telephone stations to ground. While each of the ringers of this first group are actuated, the character of the code ring indicates which one of the telephone stations in the first group is being called. Also, a portion of this coded ringing current applied to the link conductor C1281 is conducted by way of RA411, the condenser 1286[b], the link conductor C1288, the condenser 1286[a], the link conductor C1283, RA412, the link conductor C1282 and RA352, the link conductor C1261, the finder switch 200, one side of the calling line, the receiver at the calling telephone station, the other side of the calling line, the finder switch 200, C1263, RA355, RA335 and the upper winding of R310 to battery. The current flowing over this circuit causes ring-back tone to be generated by the receiver at the calling telephone station, thereby to indicate that the called telephone station is being run.

When the call is answered by removing the receiver at the called telephone station from its associated switch hook, a talking loop circuit is completed between the calling and called telephone stations by way of the link 300, and the operating circuit of the ring cut-off relay R450 is completed. The operating circuit of the ring cut-off relay R450 extends from battery at R450 by way of the upper winding of R450, RA451, RA442, RA432, RA413, the link conductor C1280 and the connector switch 500 to one side of the called line, through the telephone instrument at the called telephone station connected across the two sides of the called line, and from the other side of the called line by way of the connector switch 500, the link conductor C1281, RA411, RA431, RA441, C1313, RA704 and the conductor C1338 to ground in the code interrupter apparatus 1000.

Shortly thereafter, the slow-to-operate ring cut-off relay R450 operates and completes at RA452 a holding circuit for itself, this circuit extending from the grounded conductor C1300 by way of RA452 and the upper and lower windings of R450 in series to battery. Upon operating, the ring cut-off relay R450 interrupts at RA453 the holding circuit of the ring pick-up relay R430, causing the latter relay to restore. The ring cut-off relay R450 also interrupts at RA454 the circuit for holding the relay R830 and the counting relay R700 energized in series, whereupon the latter relays restore. The ring cut-off relay R450 also interrupts at RA451 its original operating circuit, and interrupts at RA455 the start circuit of the code interrupter apparatus 1000. The code interrupter apparatus 1000 is then released if none of the other links are performing a ringing function at this time, and removes ground from the conductor C1352, thereby releasing the ringing apparatus 850.

When the ring pick-up relay R430 restores, it connects at RA431 and RA432 talking battery at the called party answer relay R365 across the link conductors C1281 and C1280, which conductors are connected by way of the connector switch 500 and the called line to the telephone instrument at the called telephone station, the link conductor C1281 being connected by way of RA411, RA431, C1285, and the upper winding of R365 to ground, and the link conductor C1290 being connected by way of RA413, RA432, C1287 and the lower winding of R365 to battery.

The called party answer relay R365 now operates and completes at RA366 a circuit for energizing the called party slave relay R330. Upon operating, the called party slave relay R330 reverses at RA332 and RA334 the talking battery applied through the line relay R310 to the link conductors C1261 and C1263, which conductors are connected by way of the finder switch 200 and the calling line to the telephone instrument at the calling telephone station, the link conductor C1261 being connected by way of RA352, the link conductor C1282, RA412, the link conductor C1283, RA333, RA332 and the upper winding of R310 to battery, and the link conductor C1263 being connected by way of RA355, RA335, RA334 and the lower winding of R310 to ground. The called party slave relay R330 also interrupts at RA331 a point in the operating circuit of the link releasing relay R300, thereby to prevent this relay from operating to initiate the release of the link in the manner described above.

The release of the established connection is primarily under the control of the calling telephone party. More particularly, the connection is released in a manner similar to that described previously in connection with the release of the apparatus when the called line is busy at the time it is selected. Thus, when the receiver at the calling telephone station is replaced upon its associated switch hook, the operating circuit of the line relay R310 is interrupted, causing the latter relay to restore to interrupt the holding circuit of the hold relay R320. The hold relay R320 then restores and removes ground from the conductor C1300. When ground is removed from the conductor C1300, the apparatus including the switching relay R410 and the ring cut-off relay R450, is released, and the operating circuit of the called party answer relay R365 is interrupted causing this relay and the called party slave relay R330 to restore. The finder switch 200 and the connector switch 500 are released and conditioned for further use in the manner set forth above.

In signaling the second, third, fourth, or fifth telephone station in the first group of telephone stations connected to a selected line, one of the code selecting digits 2, 3, 4, or 5, respectively, is dialed, so that at the end of the digit, when ground is removed from the impulsing lead C1292, one of the counting relays R710, R720, R730 or R740, respectively, is locked energized in series with one of the associated relays R820, R810, R830, or R820, respectively, as previously explained. The apparatus including the code interrupter apparatus 1000 is operated as described above, and the coded ringing current applied to the selected one of the conductors C1337, C1336, C1335 or C1334 is applied to the link conductor C1281 in a manner similar to that described above, the one of the codes selected depending upon which of the code selecting digits 2, 3, 4, or 5 is dialed. The circuit from the conductor C1337 extends by way of RA714, C1312, RA417, RA441, RA431 and RA411 to the link conductor C1281; the circuit from the conductor C1336 extends by way of RA724, C1313, RA441, RA431, and RA411 to the link conductor C1281; the circuit from the conductor C1335 extends by way of RA734, C1312, RA417, RA441, RA431, and RA411 to the link conductor C1281; and the circuit from the conductor C1334 extends by way of RA745, C1313, RA441, RA431, and RA411 to the link conductor C1281. The remainder of the apparatus operates as previously described.

In signaling the first telephone station in the second group of telephone stations connected to a selected line, the code digit 6 is dialed. During the impulses of this digit the counting relay R750 in the counting relay network operates before the counting relay R740 restores. When the counting relay R740 operates, it prepares at RA741 a point in the circuit for energizing the generator reversing relay R440, and when the counting relay R750 operates it completes at RA751 the operating circuit for the generating reversing relay R440, this circuit extending from ground at RA741 by way of RA751, C1318, RA475, RA482, RA444 and the winding of R440 to battery. The generator reversing relay R440 now operates and completes at RA443 and RA444 an obvious holding circuit for itself, this circuit extending to the grounded conductor C1300. At RA441 and RA442, the relay R440 prepares a point in the circuit for energizing the ring cut-off relay R450, and a point in the path for conducting coded ringing current by way of the link conductor C1290 to the ringer at the called telephone station.

At the end of the digit, ground is removed from the impulsing lead C1292, causing the relay R810 to be locked energized in series with the counting relay R750, these relays being held operated until the ring cut-off relay R450 operates in a manner similar to that previously explained. Shortly after ground is removed from the impulsing lead C1292, the slow-to-release relay R800 restores and the switching relay R410 is caused to operate as previously explained, the operating circuit of the switching relay R410 extending from ground at RA323 by way of the conductor C1300, C1343, RA804, RC806, RA817, C1348, RA477, RA487, RA426 and the winding of R410 to battery. At this time coded ringing current as applied to the conductor C1338 is conducted to the link conductor C1290 over a path extending from pulsating battery and ground in the code interrupter apparatus 1000 by way of the conductor C1338, RA755, C1312, RA417, RA442, RA432 and RA413, to the link conductor C1290. The coded ringing current is conducted from the link conductor C1290 by way of the connector switch 500 and the other side of the called line through the ringers respectively provided at the stations forming the second group of five telephone stations to ground. While each of the ringers of the second group is actuated, the character of the coded ring indicates which of the telephone stations is being called.

When the call is answered, the operating circuit for the ring cut-off relay R450 is completed, and this circuit extending from battery at R450 by way of the upper winding of R450, RA451, RA441, RA431, RA411 to the link conductor C1281; from the link conductor C1281 through the connector switch 500, one side of the called line, the telephone instrument at the called telephone station, the other side of the called line and the connector switch 500 to the link conductor C1290; and from the link conductor C1290 by way of RA413, RA432, RA442, RA417, C1312, RA755, and C1338 to ground in the code interrupter apparatus 1000. The ring cut-off relay R450 and the remainder of the apparatus operate as described above.

In signaling the second, third, fourth, or fifth telephone stations in the second group of telephone stations connected to a selected line, one of the code selecting digits 7, 8, 9, and 0, respectively is dialed. As each of these code selecting digits comprises more than six impulses, the generator reversing relay R440 is caused to operate to prepare a path for applying coded ringing current to the link conductor C1290, as explained above. At the end of the digit, ground is removed from the impulsing lead C1292, causing one of the counting relays R760, R770, R780, or R790, respectively, in the counting relay network, to be locked energized in series with one of the associated relays R830, R820, R810, or R830, respectively, as previously explained. The apparatus including the code interrupter apparatus 1000 is operated as described above and the coded ringing current applied to the selected one of the conductors C1337, C1336, C1335 or C1334 is conducted to the link conductor C1290 in a manner similar to that described above, the one of the enumerated conductors which is connected to C1290 depending upon which of the code selecting digits 7, 8, 9 and 0 is dialed. The circuit from the conductor C1337 extends by way of RA764, C1313, RA442, RA432 and RA413 to the link conductor C1290; the circuit from the conductor C1336 extends by way of RA774, C1312, RA417, RA442, RA432 and RA413 to the link conductor C1290; the circuit from the conductor C1335 extends by way of RA786, C1313, RA442, RA432 and RA413 to the link conductor C1290; and the circuit from the conductor C1334 extends by way of RA795, C1312, RA417, RA442, RA432 and RA413 to the link conductor C1290. The remainder of the apparatus operates as previously described.

From the foregoing description, it is apparent that upon dialing the code digits 1 to 5, inclusive, corresponding coded ringing currents are applied to the link conductor C1281 in order to actuate the ringers of the first group of five telephone stations, the called telephone station being indicated by the character of the code ring, and upon dialing the code digits 6 to 0, inclusive, corresponding coded ringing currents are applied to the link conductor C1290 in order to actuate the ringers of the second group of five telephone stations, the called telephone station being indicated by the character of the code ring.

*Selecting an idle inter-office trunk line in the connector switch*

With the arrangement illustrated, as many as five lines in each of the second and third 10-line groups of lines terminated in the connector switch 500 may be utilized as inter-office trunk lines, equipment being illustrated for utilizing the first, second and third lines in the second 10-line group, and for utilizing the first and second lines in the third 10-line group as inter-office trunk lines. In extending a connection to an idle one of the inter-office trunk lines in the second 10-line group, the digit 0 is dialed at the telephone station initiating the call; and in extending a connection to an idle one of the inter-office trunk lines in the third 10-line group, the digit 9 is dialed at the telephone station initiating the call.

Assuming that the connection is to be extended to one of the inter-office trunk lines in the second 10-line group, the digit 0 is dialed. At the end of the digit ground is removed from the impulsing lead C1292, causing the counting relay R790 in the counting relay network to be held energized in series with the relay R830. Shortly after ground is removed from the impulsing lead C1292, the slow-to-release relay R800 restores to complete the operating circuit for the gang relay R570, individual to the second 10-line group, this circuit extending from ground at RA323 by way of the conductor C1300, C1343, RA840, RC806, RA837, C1348, RA477, C1320, RA793, C1319, RA466, the conductor C1303 in the cable C1315, and the winding of R570 to battery. Upon operating, the gang relay R570 closes its contact springs to connect the inter-office trunk lines 21, 22 and 23 to the armature springs of the connector unit relays and completes the operating circuit for the busy relay R420, this circuit extending from battery at R420 by way of RA472, C1357, the contact springs of the gang relay R570, the conductor C1303 in the cable C1315, RA466, C1319, RA793, C1320, RA477, C1348, RA837, RC806, RA804, and C1343 to the grounded conductor C1300. Upon operating, the busy relay R420 completes the above traced path for short-circuiting the upper winding of the tens relay R470. Thereafter and when the operating circuit for R570 is opened through the restoration of the counting relay R790, the upper winding of the relay R470 is energized in series with R570, causing R470 to operate and R570 to remain operated. The tens relay R470, upon operating, completes at RA473 a holding circuit for itself, this circuit extending from battery at R470 by way of the lower winding of R470, and RA473 to the grounded conductor C1300. At RA471 and RA472, the relay R470 completes a holding circuit for the gang relay R570, this circuit extending from ground at RA471 by way of RA472, C1357, the contact springs of R570, and the winding of R570 to battery. At RA472, the relay R470 interrupts the operating circuit of the busy relay R420, causing the latter relay to restore.

Simultaneously, with the operation of the gang relay R570, one of the unit relays R560, R550 or R540 in the connector switch 500 is caused to operate to select an idle one of the lines 21, 22 or 23. For example, if none of the lines 21 to 23, inclusive, is busy, the unit relay R560 is energized over a circuit extending from ground at RA489 by way of RA464, C1279, RA791, C1316, RA461, C1329, the contact springs of the gang relay R570, C1376, RA1101, C1370, and the winding of R560 to battery. Upon operating, the unit relay R560 connects the link conductors C1281 and C1290 to the conductors C1200 and C1201, respectively, of the line 21 in the cable C1252, the link conductor C1281 being connected by way of RA501, C1365, RA561, and the contact springs of the gang relay R570 to the conductor C1200, and the link conductor C1290 being connected by way of RA502, C1367, RA563, and the contact springs of the gang relay R570 to the conductor C1201. The unit relay R560 also connects the control conductor C1358 to the control conductor C1202 of the line 21, thereby preparing a circuit for marking the line 21 as busy, this circuit extending from the control conductor C1358 by way of RA503, C1367', RA565 and the contact springs of the gang switch R570 to the conductor C1202. Also, the unit relay R560 completes at RA567 a circuit for operating the ring pick-up relay R430, this circuit extending from battery at R430 by way of the winding of R430, RA485, C1360, RA567, C1370, RA1101, C1376, the contact springs of the gang relay R570, C1329, RA461, C1316, RA791, C1279, and RA464 to ground at RA489. Upon operating, the ring pick-up relay R430 prepares at RA434 and RA435 a path, traced hereinafter, for short-circuiting the lower winding of the units relay R480.

When the gang relay R570 and the unit relay R560 operate a circuit is completed for energizing the upper winding of the switching through relay R350, this circuit extending from battery at R350 by way of the upper winding of R350, RA358, C1294, RA476, C1330, RA796, C1329, RA461, C1316, RA791, C1279 and RA464 to ground at RA489. When its upper winding is energized the switching through relay R350 only partially operates to complete at RA359 a path for short-circuiting its lower winding, this path extending from the grounded conductor C1300 by way of RA359 and the lower winding of R350 to ground as extended to RA358 over the circuit just traced. At RA360, the relay R350, upon partially operating, completes the above-mentioned path for short-circuiting the lower winding of R480, this path extending from the grounded hold conductor C1300 by way of RA360, C1301, RA435, RA434, the lower winding of R480, C1360 to ground as extended to RA567.

When the operated counting relay subsequently restores the paths short-circuiting the lower winding of R480 and the upper winding of R470 are interrupted, permitting the lower winding of R480 to be energized in series with the winding of the unit relay R560 and the upper winding of R470 to be energized in series with R570, as explained above. The relay R480 now operates to complete at RA486 a holding circuit for itself, this extending to the grounded conductor C1300. At RA484 and RA485, the relay R480 completes a circuit for holding the unit relay R560 operated, this circuit extending from ground at RA484 by way of RA485, C1360, RA567 and the winding of R560 to battery. At RA485, the relay R480 interrupts the operating circuit of the ring pick-up relay R430. The two relays R470 and R480 are so adjusted that the relay R470 operates a substantial time interval before the operation of R480 occurs. At RA471 and RC472, this relay R470 opens a point in the above-traced operating circuit for the busy relay R420, causing the last-named relay to restore to open at RA421 a point in its holding circuit before the units relay R480 operates to complete this circuit at RA481. At RA476, the relay R470 opens a point in the path short-circuiting the lower winding of R350, permitting the two windings of the last-named relay to be energized in series. The switching through relay R350 now completes its operation to interrupt at RA353 a point in the operating circuit of the link releasing relay R300; to complete at RA356 a path in multiple with the armature RA321 of the hold relay R320 and extending from ground at RA304 by way of RA356 to the conductor C1251 in order to retain the finder switch 200 operated after the hold relay R320 restores; and to prepare at RA357 a path for marking the line 21 as busy.

Also upon operating, the toll switch relay R350 connects at RA351 and RA354, respectively, the link conductors C1261 and C1263 to the link conductors C1281 and C1290, respectively. At this time, the calling telephone station is connected by way of the calling line and the finder switch 200 to the link conductors C1261 and C1263, the link conductor C1261 being connected by way of RA352, RA351, the link conductor C1281, the connector switch 500, the line conductor C1200 of the line 21 in the cable C1252 to the repeater 187, and the link conductor C1263 being connected by way of RA355, RA354, the link conductor C1290, the connector switch 500 and the conductor C1201 of the line 21 in the cable C1252 to the repeater 187. The control conductor C1202 of the line 21 is grounded, thereby marking the line 21 as busy, over a path extending from the grounded conductor C1300 by way of RA357, C1293, C1358 and the connector switch 500 to the control-conductor C1202 of the line 21.

When the control conductor C1202 of the line 21 is grounded, a circuit is completed for energizing the cut-off and lock-out relays R105 and R100, respectively, individual to the line 21, this circuit extending from battery at R100 by way of the winding of R100 and the winding of R105 to the grounded control conductor C1202. The cut-off relay R105 now operates to interrupt at RA106 and RA107 the operating circuit of the line relay R110. The lock-out relay R100 operates to interrupt at RA102 and RA103 further points in the start circuits extending to the common equipment illustrated in Fig. 6.

Also, when the switching relay R350 operates to switch the calling subscriber line through to a selected trunk line, it interrupts at RA352 and RA355 the operating circuit of the line relay R310. The line relay R310 now restores and interrupts at RA311 the holding circuit of the link impulsing relay R305, which latter relay restores and completes at RA307 the operating circuit of the relay R315. The relay R315 operates and interrupts at RA316 the holding circuit of the hold relay R320, causing the last-named relay to restore and remove ground at RA323 from the conductor C1300 and the conductor C1264 connected thereto. However, before the hold relay R320 restores to remove ground at RA323 from the conductor C1300, the line and hold relays conventionally provided in the repeater 187 operate to return ground to the conductor C1300, this path extending by way of RA357, C1293, C1358, the connector switch 500, and the control conductor C1202 of the line 21 in the cable C1252 to ground in the repeater 187. When the toll switch relay R350 operates to connect the calling telephone station through to the trunk line 21, the repeater 187 operates to switch the calling subscriber's loop circuit through to the automatic switching equipment in the distant exchange 185. Since ground is retained on the hold conductor C1300 independently of the hold relay R320, the switching through relay R350 remains operated after R320 restores. Also, the switching through relay R350 retains ground at RA356 upon the conductor C1251, thereby to maintain the operated one of the finder gang relays R270, R280, etc., the operated one of the finder unit relays R200, R205, etc., and the finder group unit relay R225, if operated, in their respective operated position.

At this time, the circuit from the calling telephone station extends by way of the calling line, the finder switch 200, the link 300, the connector switch 500, the repeater 187, and the line 21 to one of the finder switches, such, for example, as the finder switch 180, and through the operated finder switch to the connector switch associated therewith. Assuming the finder-connector link 180, 181 is assigned to the use of the line 21, the connection may be extended by way of the connector switch 181 to the called telephone station A by dialing the proper digits into the connector switch 181 in the usual manner, thereby completing a loop between the calling telephone station and the called telephone station A, and rendering the release of the apparatus under the control of the called telephone station A in a manner well understood in the art.

When the lock-out relay R100, individual to the line 21, operates, it completes at RA104 a circuit for energizing the slave relay R1180 embodied in the apparatus for selecting the next idle inter-office trunk line in the second 10-line group for use when the next inter-office trunk call is received, this circuit extending from ground at RA104 by way of C1380 and the winding of R1180 to battery. Upon operating, the relay R1180 completes at RA1181 circuits for energizing the relays R1100 and R1110, the operating circuit of the relay R1100 extending from ground at RA1181 by way of the winding of R1100 to battery, and the operating circuit of the relay R1110 extending from ground at RA1181 by way of RA1183 and the winding of R1110 to battery. Upon operating, the relay R1100 interrupts at RA1101 the previously traced circuit extending from ground at RA489 by way of C1376, RA1101 and C1370 for energizing the unit relay R560 in the connector switch 500. This relay, namely R1100, also functions to interrupt the operating circuits for the first unit relays in all of the other connector switches, corresponding to the unit relay R560 in the connector switch 500, in order to prevent an inter-office trunk call initiated while the line 21 is busy from being connected to the line 21. Also, the relay R1100 completes at RA1102 a point in a chain circuit, traced hereinafter, for energizing the busy relay R420 when all of the inter-office trunk lines 21, 22 and 23 are busy, as will be explained subsequently. Upon operating, the relay R1110 completes at RA1111 an obvious holding circuit for the relays R1100 and R1110, and prepares at its armatures, individual to the other connector switches, and corresponding to the armature RA1112, individual to the connector switch 500, circuits for operating the unit relays in the other connector switches corresponding to the second unit relay R550 in the connector switch 500. The relay R1110 also interrupts at RA1113 a point in the above-mentioned chain circuit for energizing the busy relay R420.

Assuming that the inter-office trunk line 21 is involved in a connection routed thereto over another link, and that an inter-office trunk call is then routed by way of the link 300 to one of the trunk lines in the second 10-line group at the end of the trunk selecting digit 0 the gang relay R570, the busy relay R420 and the upper winding of the switching through relay R350 are simultaneously energized, as previously explained. In this case the relays R1100 and R1110 are operated so that, when R800 restores and the relay R570 operates at the end of the digit, a circuit is completed for energizing the second connector unit relay R550, this circuit extending from ground at RA489 by way of RA464, C1279, RA791, C1316, RA461, C1329, the contact springs of the gang relay R570, C1376, RA1112, C1371, and the winding of R550 to battery. Upon operating, the unit relay R550 connects the link conductors C1281 and C1290 to the conductors of the line 22, and grounds the control conductor of the line 22, thereby marking the line 22 as busy. From this point on the operation of the link to extend the connection to the trunk line 22 is identical with that described above with reference to the selection of the trunk line 21.

When the line 22 is marked busy, the cut-off and lock-out relays, individual thereto, are energized and operate, causing the slave relay R1182 controlled by the lock-out relay, individual to the line 22, to be energized. Upon operating, the relay R1182 completes at RA1183 a circuit for energizing the relay R1120, this circuit extending from ground at RA1181 by way of RA1183, RA1185 and the winding of R1120 to battery. At RA1183, the relay R1180 interrupts the operating circuit of the relay R1110.

The relay R1110 now restores and interrupts at RA1111 the holding circuit of the relay R1100, interrupts at RA1112 the above traced operating circuit for the unit relay R550, and completes at RA1113 a point in the above-mentioned chain circuit for energizing the busy relay R420. Upon operating, the relay R1120 prepares at its armatures, individual to the other connector switches, and corresponding to the armature RA1121, individual to the connector switch 500, circuits for energizing the unit relays in the other connector switches corresponding to the third unit relay R540 in the connector switch 500. The relay R1120 also interrupts at RA1122 a point in the chain circuit for energizing the busy relay R420.

Assuming that the inter-office trunk lines 21 and 22 are busied by other connections routed thereto through other links and that a connection is then routed by way of the link 300 to an inter-office trunk line in the second 10-line group, when the trunk select digit 0 is dialed into the link 300, the gang relay R570, the busy relay R420, and the upper winding of the switching through relay R350 are simultaneously energized, as previously explained. When R570 operates, the operating circuit for the unit relay R540 is completed, this circuit extending from ground at RA489 by way of RA464, C1279, RA791, C1361, RA461, C1329, the contact springs of the gang relay R570, C1376, RA1121, C1372 and the winding of R540 to battery. Upon operating, the unit relay R540 connects the link conductors C1281 and C1290 to the conductors of the line 23, and grounds the control conductor of the line 23, thereby marking the line 23 as busy. When the line 23 is marked busy, the cut-off and lock-out relays individual thereto are energized, causing the slave relay R1184, controlled by the lock-out relay individual to the line 23, to be operated. Upon operating, the relay R1184, at RA1185, applies ground to the conductor C1390. In the illustrated arrangement the conductor C1390 is open-circuited, as only the lines 21, 22 and 23 are utilized as inter-office trunk lines. However, if the lines 24 and 25 were also utilized as inter-office trunk lines, the conductor C1390 would be connected through a chain circuit to two relays successively operable to assign the lines 24 and 25, successively, for use. The relay R1184 also interrupts at RA1185 the operating circuit of the relay R1120, causing the latter relay to restore. Upon restoring, the relay R1120 interrupts at RA1121 the above traced operating circuit for the unit relay R540, and completes at RA1122 a point in the above-mentioned chain circuit for energizing the busy relay R420.

In the illustrated arrangement, when the lines 21 and 22 are busy, the relays R1180 and R1182, controlled by the lock-out relays individual to the lines 21 and 22, respectively, are operated. The relay R1180 retains the relay R1100 operated, and the relay R1182 retains the relay R1120 operated and causes the relay R1110 to be restored. The operated relay R1100 renders the line 21 inaccessible to the links; the restored relay R1110 renders the line 22 inaccessible to the links; and the operated relay R1120 renders the line 23 accessible to the links when the digit 0 is again dialed. At this time, if the line 22 should become idle before the digit 0 is again dialed to extend a call to the line 23, the lock-out relay, individual to the line 22, restores and interrupts the operating circuit of the relay R1182, causing the latter relay to restore. When the relay R1182 restores, it interrupts at RA1183 the operating circuit of the relay R1120 and completes at RA1183 the operating circuit of the relay R1110. Upon restoring, the relay R1120 renders the line 23 inaccessible to the links, and the operated relay R1110 renders the line 22 accessible to the links. Thus, when the digit 0 is again dialed the calling line will be connected through to the line 22 in preference to the line 23. In a similar manner, if the line 21 should become idle before the digit 0 is again dialed to extend a connection to the line 23, the lock-out relay individual to the line 21 restores and interrupts the operating circuit of the relay R1180, causing the latter relay to restore. When the relay R1180 restores it interrupts at RA1181 the operating circuits of the relays R1100 and R1120, and the latter relays restore. Upon restoring, the relay R1120 renders the line 23 inaccessible to the links. Upon restoring, the relay R1100 renders the line 21 accessible to the links. Thus, when the digit 0 is again dialed, the calling line will be extended to the line 21 in preference to the line 23.

Also, when the line 21 is busy, the relay R1180, controlled by the lock-out relay individual to the line 21, is operated. The relay R1180 retains the relays R1100 and R1110 operated. The operated relay R1100 renders the line 21 inaccessible to the links, and the operated relay R1110 renders the line 22 accessible to the links and retains at RA1111 the holding circuits of the relays R1100 and R1110 completed. At this time, if the line 21 should become idle before a connection is extended to the line 22 on another inter-office trunk call, the lock-out relay individual to the line 21, restores and interrupts the operating circuit of the relay R1180, causing the latter relay to restore. When the relay R1180 restores, it interrupts at RA1181 the operating circuits of the relays R1100 and R1110. However, these relays do not restore as the holding circuits of the relays R1100 and R1110 are retained completed at RA1111 by the relay R1110. Thus, when another inter-office trunk call is initiated, the call will be extended to the line 22 in spite of the fact that the line 21 is idle.

When each of the lines 21, 22 and 23 is busy, the lock-out relays individual thereto are all operated to hold the relays R1180, R1182 and R1184 operated. At this time, the relay R1180 retains the relay R1100 operated, and the relays R1182 and R1185 hold the relays R1110 and R1120 in restored position. The operated relay R1100 and the restored relays R1110 and R1120 complete at RA1102, RA1113 and RA1122, respectively, points in the chain circuit for energizing the busy relay R420 when a fourth inter-office trunk call is initiated. If another trunk call is initiated while all of the lines 21, 22 and 23 are busy, busy tone current is applied to the calling subscriber's loop circuit. With the link illustrated, for example, this is accomplished by the substantially simultaneous energization of the gang relay R570 and the units relay R480. The operating circuit of the gang relay R570 extends from ground at RA323 by way of C1300, C1343, RA804, RC806, RA837, C1348, RA477, C1320, RA793, C1319, RA466, the conductor C1303 in the cable C1315 and the winding of R570 to battery. When the gang relay R570 operates, it completes the operating circuit of the busy relay R420. The circuit for energizing the busy relay R420 extends from battery at R420 by way of the winding of R420, RA472, C1357, the contact springs of R570, the conductor C1303 in the cable C1315, RA466, C1319, RA793, C1320, RA477, C1348, RA837, RC806, RA804 and C1343, to the grounded hold conductor 1300. The circuit for energizing the units relay R480 extends from ground at RA1122 by way of RA1113, RA1102, C1361, the operated armature RA571 of the gang relay R570, C1383, RA478, RA465, C1311, RA792, C1317 and the upper winding of R480 to battery. Upon operating, the units relay R480 completes at RA486 its holding circuit, prepares at RA481 a point in the holding circuit of the busy relay R420, and interrupts at RA489 a point in the common portion of the operating circuits for the switching through relay R350 and the connector unit relays R560, R550, etc. Upon operating, the busy relay R420 completes at RA421 its holding circuit extending from ground at RA421 by way of RA481, C1280, RA324, C1280' and the winding of R420 to battery. The busy relay R420 also completes at RA424 a connection between the link conductor C1291 and the busy tone lead C1351, thereby to apply busy tone current from the busy and dial tone apparatus 840 to the loop extending to the calling subscriber's loop circuit. As previously explained, the busy tone generated by the receiver of the telephone instrument at the calling telephone station, indicates to the calling party that the desired connection cannot immediately be obtained.

It will be noted from the foregoing description that the units relay R480 operates before the tens relay R470 in those instances where all of the inter-office trunks 21, 22 and 23 are busy, and upon operating remains locked energized over its holding circuit to maintain the holding circuit completed for the busy relay R420 and to hold the common portion of the circuits for energizing the upper winding of the switching through relay R350 and for energizing the connector unit relays open at RA489. With the relay R480 operated the subsequent operation of the tens relay is without effect in so far as the two relays R350 and R420 are concerned. More particularly, when the operated counting relay R790 and the operated relay R830 restore to interrupt the path short-circuiting the upper winding of the tens relay R470, the last named relay operates to complete its holding circuit and the previously traced holding circuit for the connector gang relay R570. At RA472, the relay R470 opens a point in the operating circuit for the busy relay R420, but the busy relay is now held energized over its holding circuit. At RA476, the relay R470 opens a further point in the circuit for energizing the switching through relay R350. Thus, the busy relay is held operated to return busy tone to the calling subscriber, and the switching through relay is prevented from operating to switch the calling line through to a busy inter-office trunk line.

From the foregoing description, it will be apparent that when a calling subscriber dials the digit 0 the connection is extended from the calling telephone station to an idle one of the inter-office trunk lines 21, 22 or 23, or, if all of the enumerated trunk lines are busy, busy tone is returned to the calling subscriber. Moreover, the lines 21, 22 and 23 are successively assigned for use through the operation of the apparatus including the relays R1100, R1110 and R1120.

Assuming that a connection is to be extended by way of the link 300 to one of the inter-office trunk lines in the third 10-line group, the digit 9 is dialed at the calling substation, and at the end of the digit ground is removed from the impulsing lead C1292, causing the counting relay R780 in the counting relay network to be held energized in series with the relay R810 over a circuit including C1327. Shortly after ground is removed from the impulsing lead C1292, the slow-to-release relay R800 restores to complete the operating circuit for the connector gang relay R580, individual to the third 10-line group, this circuit extending from ground at RA323 by way of the conductor C1300, C1343, RA807, RC808, RA818, C1347, RA479, C1322, RA783, C1321, RA463, the conductor C1304 in the cable C13.5 and the winding of R580 to battery. Upon operating, the gang relay R580 closes its contact springs to connect the inter-office trunk lines 31 and 32 to the armature springs of the connector unit relays, and to complete the operating circuit for the busy relay R420 as previously explained, this circuit extending from battery at R420 by way of RA472, C1357, the contact springs of the gang switch R580, the conductor C1304 in the cable C1315, RA463, C1321, RA783, C1322, RA479, C1347, RA818, RC808, RA807 and C1343 to the rounded conductor C1300. Upon operating, the busy relay R420 short-circuits the upper winding of the tens relay R470 as previously explained.

When the connector gang relay R580 operates, a circuit is completed for energizing one of the connector unit relays R560 and R550 in order to seize a previously selected idle one of the trunk lines 31 or 32. If neither of the lines 31 or 32 is busy, a circuit is completed for energizing the unit relay R560, this circuit extending from ground at RA489 by way of RA464, C1279, RA781, C1316, RA461, C1329, the contact springs of the gang relay R580, C1377, RA1131, C1370 and the winding of R560 to battery. Upon operating, the unit relay R560 connects the link conductors C1281 and C1290 to the conductors C1206 and C1207, respectively, of the line 31. The unit relay R560 also connects the control conductor C1358 to the control conductor C1208 of the line 31, thereby to mark the line 31 as busy. Also, the unit relay R560 completes at RA567 the previously traced circuit for energizing the ring pick-up relay R430. The ring pick-up relay R430 now operates to prepare the above-traced path for short-circuiting the lower winding of the units relay R480 in the manner previously described.

Simultaneously, with the completion of the operating circuit for the gang relay R580, a circuit is completed for energizing the switching through relay R350, this circuit extending from battery at R350 by way of the upper winding of R350, RA358, C1294, RA476, C1330, RA787, C1329, RA461, C1316, RA781, C1279 and RA464 to ground at RA489. The switching-through relay R350 now partially operates to short-circuit its lower winding and to complete the path for short-circuiting the lower winding of R480, as previously described.

Shortly following the partial operation of R350, the counting relay R780 restores to interrupt the paths short-circuiting, respectively, the upper winding of R470 and the lower winding of R480 in the manner described above. The relay R470 is now energized in series with R580 and operates to complete its holding circuit to complete the holding circuit for R580, and to open the path short-circuiting the winding of R350, all in the manner set forth above. The relay R350 now completes its operation. Shortly following the restoration of the busy relay R420, the units relay R480 operates to complete its holding circuit, to complete the holding circuit for R560, and to open the operating circuit for the pick-up relay R430, causing the last-mentioned relay to restore.

When the switching-through relay operates the calling subscriber's loop circuit is switched through, by way of the link line conductors C1281 and C1290, to the repeater 188. This repeater operates in a well known manner to extend the connection to the automatic switching equipment 184 in the distant exchange 186, and to return ground over the control conductor C1203 of the seized trunk to hold the link 300 operated in the manner described above with reference to the operation of the apparatus to extend a connection by way of the trunk line 21.

When the switching-through relay R350 operates, it interrupts at RA352 and RA355 the operating circuit of the line relay R310. The line relay R310 then restores to open the holding circuit for the hold relay R320, causing the last-mentioned relay to restore and remove multiple ground from the hold conductor C1300 and the control conductor C1264 connected thereto. Before the hold relay R320 restores to remove ground at RA323 from the conductor C1300, however, a path is completed for maintaining ground on the conductor C1300 independently of the hold relay, this path extending by way of RA357, C1293, C1358, the connector switch 500 and the control conductor C1208 of the line 31 to ground in the operated repeater 188.

When the control conductor C1208 of the line 31 is grounded, an operating circuit is completed for the cut-off and lock-out relays R135 and R130, respectively, individual to the line 31, this circuit extending from battery at R130 by way of the winding of R130 and the winding of R135 in series to the grounded control conductor C1208. The cut-off relay R135 operates to open at RA136 and RA137 points in the operating circuit of the line relay R140, thereby to prevent the operation of the line relay R140 to complete the start circuits extending to the common equipment illustrated in Fig. 6. The lock-out relay R130 operates to interrupt at RA132 and RA133 further points in the start circuits noted.

Following the operation of the repeater 188 to extend the connection to the exchange 186, the connection may be further extended to the desired called telephone station, as for example, the station C, by dialing the proper digits into the automatic switching equipment 184 in the usual manner. The release of the operated link is initiated when the connection is cleared out to cause the repeater 188 to remove ground from the control conductor C1208. When ground is removed from this conductor, all of the operated relays in the link are caused to restore in the manner described previously.

During the operation of the apparatus to extend a connection by way of the trunk line 31 and when the lock-out relay R130, individual to the line 31, operates, it completes at RA134 a circuit for energizing the slave relay R1186, embodied in the apparatus for selecting for use the next idle inter-office trunk line in the third 10-line group, this circuit extending from ground at RA134 by way of C1381 and the winding of R1186 to battery. Upon operating, the relay R1186 completes at RA1187 obvious circuits for energizing the relays R1130 and R1140, the operating circuit of the relay R1130 extending from ground at RA1187 by way of the winding of R1130 to battery, and the operating circuit of the relay R1140 extending from ground at RA1187 by way of RA1189 and the winding of R1140 to battery. Upon operating, the relay R1130 interrupts at RA1131 the previously traced circuit, extending from ground at RA489 by way of C1377, RA1131 and C1370, for energizing the unit relay R560 in the connector switch 500. It will be understood that the circuits for operating the unit relays in all of the other connector switches corresponding to the unit relay R560 in the connector switch 500 are similarly interrupted in order to prevent the busy line 31 from being assigned to the use of another link on a succeeding trunk call. The relay R1130 also completes at RA1132 a point in the chain circuit for energizing the busy relay R420 when both of the inter-office trunk lines 31 and 32 are busy, as will be explained subsequently. Upon operating, the relay R1140 completes at RA1141 an obvious holding circuit for the relays R1130 and R1140, and prepares at its armatures, individual to the other connector switches, and corresponding to the armature RA1142, individual to the connector switch 500, circuits for energizing the unit relays in the other connector switches corresponding to the second unit relay R550 in the connector switch 500. The relay R1140 also interrupts at RA1143 a point in the chain circuit for the busy relay R420.

Assuming that the inter-office trunk line 31 is involved in a connection routed through another link, that a connection is then routed by way of the link 300 to an inter-office trunk line in the third 10-line group, and that the line 32 is idle, when the digit 9 is dialed at the calling substation, the gang relay R580, the unit relay R550, and the switching-through relay R350 are caused to operate in the manner previously explained. Following the operation of the three relays noted, the control apparatus in the link causes the connection to be forwarded by way of the trunk line 32 to the distant exchange in a manner substantially similar to that set forth above with reference to the operation of the apparatus to extend a connection by way of the line 31. In this case, the operating circuit for the unit relay extends from ground at RA489 by way of RA464, C1279, RA781, C1316, RA461, C1329, the contact springs of the gang relay R580, C1377, RA1142, C1371 and the winding of R550 to battery. Upon operating, the unit relay R550 grounds the control conductor of the line 32, thereby marking the line 32 as busy. When the line 32 is marked busy, the cut-off and lock-out relays, individual thereto, are operated, causing the slave relay R1188, controlled by the lock-out relay individual to the line 32, to be operated. Upon operating, the relay R1188 completes at RA1189 a path for applying ground to the conductor C1391. In the present instance, the conductor C1391 is open-circuited, as only the lines 31 and 32 are utilized as inter-office trunk lines. However, if the lines 33, 34 and 35 are also utilized as inter-office trunk lines, the conductor C1391 would be connected through a chain circuit to three relays successively and individually operable to select the lines 33, 34 and 35, respectively, for use. The relay R1188 also interrupts at RA1189 the operating circuit of the relay R1140, causing the latter relay to restore. Upon restoring, the relay R1140 interrupts at RA1141 the holding circuit of the relay R1130; interrupts at its armatures corresponding to and including RA1142 the operating circuits extending to the respective second connector unit relays provided in the various links; and completes at RA1143 a point in the chain circuit for energizing the busy relay R420.

From the foregoing description it will be seen that, when the lines 31 and 32 become busy, the relays R1186 and R1188, controlled by the lock-out relays individual to the lines 31 and 32, are operated. The relay R1186 retains the relay R1130 operated, and the relay R1188 retains the relay R1140 restored. The operated relay R1130 renders the line 31 inaccessible to the links, while the restored relay R1140 renders the line 32 inaccessible to the links. At this time, if the line 32 should become idle before a trunk call to a line in the third 10-line group is initiated, the lock-out relay, individual to the line 32, restores and interrupts the operating circuit of the relay R1188, causing the latter relay to restore and complete at RA1189 the operating circuit of the relay R1140. The relay R1140 then reoperates to render the line 32 accessible to the links. On the other hand, if the line 31 should become idle before a trunk call to a line in the third 10-line group is initiated, the lock-out relay, individual to the line 31, restores and interrupts the operating circuit of the relay R1186, causing the latter relay to restore and interrupt at RA1187 the operating circuit of the relay R1130. The relay R1130 then restores to render the line 31 accessible to the connector portions of the various links. If the line 31 should become idle at a time when the line 32 is idle, the lock-out relay, individual to the line 31, restores and interrupts the operating circuit of the relay R1186, causing the latter relay to restore. When the relay R1186 restores, it interrupts at RA1187 the operating circuits of the relays R1130 and R1140. However, these relays do not restore, as the holding circuits of the relays R1130 and R1140 are retained completed at RA1141 by the relay R1140. Thus, when the trunk select digit 9 is again dialed at a calling telephone station, the connection will be routed by way of line 32 in spite of the fact that the line 31 is idle.

When both of the lines 31 and 32 are busy, the lock-out relays individual thereto are operated to retain the relays R1186 and R1188 operated in the manner described above. At this time, the relay R1186 retains the relay R1130 operated, and the relay R1188 retains the relay R1140 in restored position. The operated relay R1130 and the restored relay R1140, at RA1132 and RA1143, respectively, maintain prepared the chain circuit for energizing the busy relays respectively provided in the links and corresponding to R420 embodied in the link illustrated. With the apparatus in this condition and if the trunk selecting digit 9 is dialed at a calling substation, busy tone is returned to the calling subscriber and the calling subscriber's line is not connected to one of the busy trunk lines of the third group of lines. The manner in which the apparatus of the link illustrated operates to return busy tone to the calling subscriber attempting to route a connection by way of one of the trunks 31 and 32 when both of these trunks are busy is substantially similar to the mode of operation, described above, of the link when a trunk call, intended to be routed by way of one of the trunks 21, 22 and 23, is initiated at a time when all of the trunks are busy. In fact, the only departure from the operation as described previously pertains to the circuit over which the units relay R480 is energized. On a call to be extended by way of one of the trunks 31 and 32 initiated when both of these trunks are busy, the units relay R480 is energized at the end of the trunk selecting digit 9, dialed at the calling substation over a circuit extending from ground at RA1143 by way of RA1132, C1382, RA581, C1383, RA478, RA465, C1311, RA782, C1317 and the upper winding of R480 to battery. Aside from this variation, the operation of the link circuit apparatus is so closely similar to that set forth previously as to be readily understandable without further explanation.

*Selecting an idle P. B. X trunk line in the connector switch*

In the system illustrated, as many as five lines in each of the ninth and tenth 10-line groups terminating at the connector switch 500 may be utilized as trunk lines extending to a private branch exchange, equipment being illustrated for utilizing the first, second and third lines in the tenth 10-line group as P. B. X trunk lines. In extending a connection from a calling telephone station by way of the link 300 to an idle one of the P. B. X trunk lines in the tenth 10-line group, the number 8011 comprising the prefix digit 8, the tens digit 0, the units digit 1, and the ringing digit 1, is dialed at the telephone station initiating the call; and in extending the call to an idle one of the P. B. X trunk lines in the ninth 10-line group, the number 8911 comprising the prefix digit 8, the tens digit 9, the units digit 1 and the ringing digit 1, is dialed at the telephone station initiating the call.

Assuming that the call is to be extended to one of the P. B. X trunk lines in the tenth 10-line group, the prefix digit 8 is first dialed. At the end of the digit, the reverting call relay R400, the prefix digit relay R340 and the prefix digit slave relay R460 are caused to operate in the manner previously explained. The tens digit 0 is then dialed, and at the end of this digit when ground is removed from the impulsing lead C1292, the counting relay R790 in the counting relay network is held energized in series by way of C1278 with the relay R830. Shortly after ground is removed from the impulsing lead C1292, the slow-to-release relay R800 restores to complete an operating circuit for the connector gang relay R1170, individual to the tenth 10-line group, this circuit extending from ground at RA323 by way of the conductor C1300, C1343, RA804, RC806, RA837, C1348, RA477, C1320, RA793, C1319, RA466, the conductor C1310 in the cable C1315, and the winding of the gang relay R1170 to battery. This gang relay operates and closes its contact springs to connect the P. B. X trunk lines 1, 2 and 3 to the armature springs of the connector unit relays and to complete the operating circuit for the busy relay R420, this circuit being similar to that previously traced. Assuming all of the P. B. X trunk lines are idle, the gang relay R1170, upon operating, prepares, at RA1171 and RC1173, a circuit for energizing the first unit relay R560 when the units digit is subsequently dialed at the calling telephone station.

Upon operating, the busy relay R420 completes a path, similar to that traced previously, for short-circuiting the upper winding of the tens relay R470. Shortly after the busy relay operates the operated counting relay R790 restores in the manner described above to interrupt the path short-circuiting the upper winding of the tens relay R470, permitting this upper winding to be energized in series with R1170. The relay R470 now operates to complete its holding circuit, to complete the holding circuit for R1170, to open the operating circuit for the switching through relay R350, and to open the operating circuit for the busy relay R420, all in the manner set forth above. The busy relay restores to prepare, at RA423, the path for short-circuiting the lower winding of the units relay R480. The apparatus is now conditioned to respond to the impulses of the third or units digit dialed at the calling telephone station.

Assuming that all of the P. B. X trunk lines are idle, the unit relay R560 in the connector switch 500 is operated when the units digit 1 is dialed. More particularly, at the end of the digit when ground is removed from the impulsing lead C1292, the counting relay R700 in the counting relay network is held energized in series with the relay R830. Shortly after ground is removed from the impulsing lead C1292, the slow-to-release relay R800 restores to complete the operating circuit for the connector unit relay R560, this circuit extending from ground at RA323 by way of C1300, C1343, RA807, RC808, RA839, C1347, RA479, RA490, C1332, RA705, the first conductor C1401 in the cable C1333, C1375, RA1171, RC1173, C1379, RA1151, C1370, and the winding of R560 to battery.

Upon operating, the unit relay R560 connects the link conductors C1281 and C1290 to the P. B. X trunk line 1 and completes at RA567 a circuit for energizing the ring pick-up relay R430, which latter relay operates to complete at RA434 and RA435 the above-traced path for short-circuiting the lower winding of the units relay R480 as previously explained. Shortly after the ring pick-up relay R430 operates the counting relay R700 restores to interrupt the path short-circuiting the lower winding of R480, permitting this lower winding to be energized in series with the winding of the operated unit relay R560. The relay R480 now operates to complete its holding circuit to complete the holding circuit for R560 and to open the operating circuit for the relay R430. The apparatus is now conditioned to respond to the impulses of the fourth or ringing digit dialed at the calling telephone station.

When the digit 1 is dialed and when ground is removed from the impulsing lead C1292 at the end of the digit, the relay R830 is held energized in series with the counting relay R700 over a holding circuit extending from battery at R700 by way of the winding of R700, RA703, C1278, the winding of R830, RC826, RA824, RA834, RC835, C1349, RA488 and RA454, to the grounded conductor C1300. Shortly after ground is removed from the impulsing lead C1292, the slow-to-release relay R800 restores, and an operating circuit is completed for the switching relay R410, this circuit extending from ground at RA323 by way of the conductor C1300, C1343, RA804, RC806, RA837, C1348, RA477, RA487, RA426 and the winding of R410 to battery.

The relay R410 now operates to complete at RA419 its previously traced holding circuit, to complete at RA418 the previously traced operating circuit of the ring pick-up relay R430, to complete at RA419' the previously traced start circuit extending to the code interrupter apparatus 1000, to ground at RA416 the control conductor C1358, thereby to mark the P. B. X trunk line 1 as busy, and to prepare at RA411 and RA412 a path for applying ringing current to the selected called line.

When the ring pick-up relay R430 operates, it interrupts at RA436 its original operating circuit, completes at RA436 and RA433 its previously traced holding circuit under the control of the ring cut-off relay R450, interrupts at RA431 and RA432 points in the operating circuit of the called party answer relay R365, and prepares at RA431 and RA432, a further point in the path for conducting ringing current to the called line and the previously traced circuit for energizing the ring cut-off relay R450.

Upon operating, the code interrupter apparatus 1000 grounds the start lead C1352 to initiate the operation of the ringing apparatus 850. Upon operating, the ringing apparatus 850 applies ground to the conductor C1355 and pulsating battery to the conductor C1354 in order to control the operation of the code interrupter apparatus 1000. The code interrupter apparatus 1000 operates to apply ringing current to the conductor C1338, which ringing current is extended by way of the link conductor C1281 and one of the line conductors of the selected called line to the private branch exchange to signal the operator thereat in a well-known manner.

When the call is answered at the operator's telephone station of the P. B. X., a talking loop is completed between the calling and operator's telephone stations, this loop by way of the operated link 300. When the P. B. X operator answers, a circuit similar to that previously traced is completed for energizing the ring cut-off relay R450. The operation of the apparatus following the operation of the ring cut-off relay R450 is the same as that previously described.

When the switching relay R410 operates and applies ground at RA416 to the control conductor C1358, the cut-off and lock-out relays individual to the P. B. X trunk line 1 are operated in a manner similar to that previously explained. Upon operating, the lock-out relay, individual to the P. B. X trunk line 1, completes a circuit for energizing the slave relay R1190 embodied in the apparatus for setting up the next idle P. B. X trunk line in the tenth 10-line group to be seized when the next call to be extended to a P. B. X trunk line in the tenth 10-line group is initiated at another telephone station. Upon operating, the relay R1190 completes at RA1191 obvious circuits for energizing the relays R1150 and R1160, the operating circuit of the relay R1150 extending from ground at RA1191 by way of the winding of R1150 to battery, and the operating circuit of the relay R1160 extending from ground at RA1191 by way of RA1193 and the winding of R1160 to battery. Upon operating, the relay R1150 interrupts at RA1151 the previously traced operating circuit for the unit relay R560 in the connector switch 500. It will be understood that the circuits for energizing the unit relays in all of the other connector switches corresponding to the unit relay R560 in the connector switch 500 are similarly interrupted in order to prevent a call initiated at a calling telephone station from being connected to the line 1. Upon operating, the relay R1160 completes at RA1161 an obvious holding circuit for the relays R1150 and R1160, and prepares at its armatures, individual to the other connector switches, and corresponding to the armature RA1162, individual to the connector switch 500, circuits for energizing the unit relays in the other connector switches corresponding to the second unit relay R550 in the connector switch 500.

Assuming that the P. B. X trunk line 1 is busy by a call routed thereto through another link, and that a call is then routed by way of the link 300 to a P. B. X trunk line in the tenth 10-line group, when the prefix digit 8 is again dialed, the reverting call relay R400, the prefix digit relay R340 and the prefix digit slave relay R460 are caused to operate as previously described. Also, when the tens digit 0 is again dialed, the gang relay R1170, individual to the tenth 10-line group, and the tens relay R470 are caused to operate in the manner described above. When the units digit 1 is dialed, an operating circuit for the unit relay R550 is completed, this circuit extending from ground at RA323 by way of C1300, C1343, RA807, RC808, RA839, C1347, RA479, RA490, C1332, RA705, the first conductor C1401 in the cable C1333, C1375, RA1171, RC1173, C1379, RA1162, C1371, and the winding of R550 to battery.

Upon operating, the unit relay R550 connects the link conductors C1281 and C1290 to the P. B. X trunk line 2 as previously explained. The unit relay R550 also completes at RA557 the circuit for operating the ring pick-up relay R430, which latter relay causes the units relay R480 to operate as previously explained.

When the ringing digit 1 is dialed, the switching relay R410 and the ring pick-up relay R430 are caused to operate as previously explained. The code interrupter apparatus 1000 now operates to apply ringing current to the slected line 2. When the call is answered, the ring cut-off relay R450 operates as explained above.

When the switching relay R410 operates and grounds at RA416 the control conductor C1358, the cut-off and lock-out relays, individual to the P. B. X trunk line 2, complete a circuit for energizing the slave relay R1192, which latter relay, upon operating, completes at RA1193 a circuit for energizing the relay R1160', individual to the third trunk line. The relay R1192 also interrupts at RA1193 the operating circuit of the relay R1160, causing the latter relay to restore. Upon restoring, the relay R1160 interrupts at RA1161 the holding circuit of the relay R1150 and interrupts at RA1162 the above-traced operating circuit for the unit relay R550.

When the relay R1160' operates it prepares, at its armatures RA1162', etc., points in the operating circuits for the respective third unit relays provided in the various connector switches, thereby conditioning these switches to seize the third P. B. X trunk line in the event another P. B. X trunk call is initiated while the first two P. B. X trunks are busy. The manner in which the link illustrated, for example, operates to seize this third P. B. X trunk line is in all respects similar to that described above with reference to the seizure of the first P. B. X trunk line, the only difference being that the third unit relay of the operated connector switch is caused to operate at the end of the units digit, rather than the first or second unit relays. It is pointed out that since the third P. B. X trunk line is the last line of the P. B. X trunk group, no slave relay, corresponding to R1190 and R1192 for the first two trunks, is provided in association therewith. Hence, R1160' is held energized when all of the P. B. X trunks are busy and until the second trunk of the group becomes idle.

In the illustrated arrangement, when the P. B.

X lines 1, 2 and 3 are busy, the relays R1190 and R1192, controlled by the lock-out relays individual to the two lines are operated. The relay R1190 retains the relay R1150 operated, the relay R1192 retains the relay R1160 restored, and the relays R1190 and R1192 together retain the relay R1160' operated. The operated relay R1150 renders the line 1 inaccessible to the links, the restored relay R1160 renders the line 2 inaccessible to the links, and the operated relay R1160' renders the third P. B. X trunk accessible to the link. If, with the first two trunks busy, the second line should become idle before the number 8011 is again dialed to extend a call to a P. B. X trunk line in the tenth group, the lock-out relay, individual to the line 2, restores and interrupts the operating circuit of the relay R1192, causing the latter relay to restore, to open the operating circuit for R1160' and to complete at RA1193 the operating circuit of the relay R1160. The relay R1160 is then operated to render the line 2 accessible to the links when the number 8011 is again dialed at a calling telephone station. On the other hand, if the line 1 should become idle at a time when two or more of the P. B. X lines are busy and before the number 8011 is again dialed to extend a call to a P. B. X trunk line in the tenth 10-line group, the lock-out relay, individual to the line 1, restores and interrupts the operating circuit of the relay R1190, causing the latter relay to restore to interrupt at RA1191 the operating circuit of the relays R1150 and R1160'. The relays R1150 and R1160' then restore to render the first P. B. X trunk line accessible to the links when the number 8011 is again dialed at a calling station. If the P. B. X line 1 should become idle when none of the other similar lines are busy, the lock-out relay, individual to the line 1, restores and interrupts the operating circuit of the relay R1190, causing the latter relay to restore. When the relay R1190 restores, it interrupts at RA1191 the operating circuits of the relays R1150 and R1160. However, these relays do not restore as the holding circuits of the relays R1150 and R1160 are retained completed at RA1161 by the relay R1160. Thus, when the number 8011 is again dialed, the call will be extended to the second P. B. X line in spite of the fact that the first P. B. X line is idle.

When all of the P. B. X lines are busy, the lock-out relays individual to lines 1 and 2 are operated to retain the relays R1190 and R1192 operated, the relay R1190 retaining the relay R1150 operated, the relay R1192 retaining the relay R1160 in restored position, and the relays R1190 and R1192 together retaining R1160' operated. If, with all of the P. B. X lines busy, the number 8011 is again dialed at a calling station, busy tone current is returned to the calling subscriber. This is accomplished in a manner substantially similar to that described above with reference to the operation of the apparatus to return busy tone to the calling subscriber when a called subscriber line is tested and found busy. More particularly, on a P. B. X trunk call initiated when all of the trunks are busy and routed by way of the link illustrated, the reverting call relay R400, the prefix digit relay R340 and the prefix digit slave relay R460 operate in the manner described previously when the prefix digit 8 is dialed at the calling telephone station. Also, when the tens digit 0 is again dialed, the gang relay R1170, individual to the tenth line group, and the tens relay R470 are caused to operate in the manner described above.

As pointed out above, when all of the P. B. X trunks are busy, the relay R1160' is operated to hold prepared an operating circuit for the third connector unit relay R540. Also the third P. B. X trunk is marked as busy in the connector switch through the application of ground potential to the control conductor thereof. With the apparatus in this condition and shortly following the end of the units digit dialed at the calling substation, a circuit similar to those traced previously is completed for energizing R540. Specifically, the operating circuit for R540 extends from ground at RA323 by way of C1300, C1343, RA807, RC808, RA839, C1347, RA479, RA490, C1332, RA705, the first conductor C1401 in the cable C1333, C1375, RA1171, RC1173, C1379, RA1162', C1372 and the winding of R540. Upon operating, the unit relay R540 completes the test circuit to the busy relay, this circuit extending from ground as applied to the control conductor of the busy third P. B. X trunk line by way of RA545, C1367', RA503, C1358, RA416, C1342, RA801, C1341 and through the winding of the busy relay R420 to battery. When the busy relay operates, it completes its holding circuit and opens, at RA426, a point in the operating circuit for the switching relay R410, thereby to prevent the latter relay from subsequently operating to cause ringing current to be projected out over the busy line. Upon operating, the busy relay also returns busy tone to the calling subscriber in the manner set forth above. From this point on the operation of the apparatus is exactly the same as that described previously with reference to the selection of a busy subscriber line.

Assuming that a connection is to be extended by way of the link illustrated to one of the P. B. X trunk lines in the ninth 10-line group, the prefix digit 8 is first dialed at the calling substation. Upon dialing the prefix digit 8, the reverting call relay R400, the prefix digit relay R340 and the prefix digit slave relay R460 are caused to operate as previously explained. The tens digit 9 is then dialed, and at the end of the digit when ground is removed from the impulsing lead C1292, the counting relay R780 is held energized in series with the relay R810. Shortly after ground is removed from the impulsing lead C1292, the slow-to-release relay R800 restores to complete the operating circuit for the connector gang relay R1195, individual to the ninth line group terminated in the connector switch 500, this circuit extending from ground at RA323 by way of the conductor C1300, C1343, RA807, RC808, RA818, C1347, RA479, C1322, RA783, C1321, RA463, the conductor C1309 in the cable C1315, and the winding of the gang relay R1195, individual to the ninth 10-line group, to battery. This gang relay operates and closes its contact springs to connect the P. B. X trunk lines 91, 92, etc., to the armature springs of the connector unit relays, and completes the operating circuit for the busy relay R420 in a manner similar to that previously explained. Also, upon operating, the gang relay at RA1196 disconnects the conductor C1375 from the conductor C1378 and connects it to the conductor C1387 to prepare an operating circuit for the connector unit relay R560, this circuit extending by way of apparatus (not shown) for hunting an idle P. B. X trunk line in the ninth 10-line group.

Following the operation of the connector gang relay R1195, the busy relay R420 and the tens relay R470 are caused to operate as explained above. Upon operating, the tens relay R470 completes at RA473 its previously traced holding circuit, interrupts at RA472 the operating circuit of the busy relay R420, and completes at RA471 and RA472 the holding circuit of the gang relay R1195 in a manner similar to that previously explained.

Apparatus for setting up idle P. B. X trunk lines in the ninth 10-line group is provided, which comprises relays corresponding to the relays R1150, R1160 and R1160', and to the relays R1190 and R1192 embodied in the apparatus for setting up idle P. B. X trunk lines in the tenth 10-line group. This apparatus for setting up idle P. B. X trunk lines in the ninth 10-line group operates in a manner identical to the operation of the apparatus for setting up idle P. B. X trunk lines in the tenth 10-line group, and in the interests of simplifying the disclosure has not been illustrated in detail. Since the P. B. X trunk preselecting apparatus is identical in each of the two cases, it is believed that the method by which the link illustrated completes its operation to select the first P. B. X trunk in the ninth 10-line group will be apparent without further explanation. Also, the method by which the other P. B. X trunks of this ninth group are successively selected and taken for use and the method of returning busy tone to a calling subscriber, on a call initiated when all of the ninth group, P. B. X trunks are busy, is in all respects identical to that set forth above with respect to the operation of the link on calls to the P. B. X trunks of the tenth group.

In the apparatus for setting up idle P. B. X trunk lines in the ninth and tenth 10-line groups, it will be observed that the operating circuits for the unit relays R560, R550, R540, etc., and extending by way of the conductor C1401 include the armature RA1171 of the gang relay R1170, individual to the tenth 10-line group, and the armature RA1196 of the gang relay R1195, individual to the ninth 10-line group. This arrangement places the selection of one of the unit relays R560, R550, etc., in the connector switch 500, under the control of the apparatus for setting up idle P. B. X trunk lines in the ninth and tenth 10-line groups, depending upon whether the number 8911 or 8011, respectively, is dialed. In extending a call to a telephone station connected to a subscriber line such, for example, as the lines 41, 51, 61, etc., the corresponding tens digit is dialed in order to cause the operation of the corresponding gang relay individual to the 10-line group. The units digit 1 is then dialed in order to complete the operating circuit for the unit relay R560, this operating circuit extending from ground at RA323 by way of C1300, C1343, RA807, RC808, RA839, C1347, RA479, RA490, C1332, RA705, the first conductor C1401 in the cable C1333, C1375, RA1171, RC1172, C1386, RA1196, RC1198, C1378, and the winding of R560 to battery. In extending a call to the private branch exchange terminating the P. B. X trunk lines of the tenth line group, the prefix digit 8, the tens digit 0, and the units digit 1 are dialed, in the order named. When the units digit is dialed, the operating circuit for one of the connector unit relays R560, R550, etc., is completed. As indicated above the particular one of the unit relays which is energized depends upon which of the P. B. X trunk lines in the tenth 10-line group over which the call is routed is idle. The operating circuits for the first three relays extend from the grounded first conductor C1401 in the cable C1333 by way of C1375, RA1171, RC1173, C1379; RA1151, RA1162 or RA1162'; C1370, C1371 or C1372, respectively; and the winding of R560, the winding of R550, or the winding of R540, respectively; to battery. In extending a call to the P. B. X connected to the P. B. X trunk lines 91, 92, etc., the prefix digit 8 is dialed, the tens digit 9 is dialed, and the units digit 1 is dialed, causing one of the connector unit relays R560, R550, etc., to be energized, the particular one selected for energization depending upon which of the P. B. X trunk lines in the ninth 10-line group has been previously selected for use. The circuits for energizing these relays extend from the grounded first conductor C1401 in the cable C1333 by way of C1375, RA1171, RC1172, C1386, RA1196, RC1197, C1387, the apparatus for preselecting P. B. X trunk lines in the ninth 10-line group; C1370, C1371 or C1372; and the winding of R560, the winding of R550 or the winding of R540, respectively; to battery.

*Reverting calls*

In the system illustrated, a reverting call or a call between a calling telephone station connected to a given line, and a called telephone station connected to the same line, is initiated at the calling telephone station by dialing the directory number of the called telephone station in the usual manner. For example, in making a call between the telephone station 1B connected to the line 20 and the telephone station 2B connected to the same line, the call is initiated when the receiver at the telephone station 1B is removed from its hook to cause the operation of the line relay R125. When R125 operates, the common equipment illustrated in Fig. 6 operates to cause an idle link, previously selected by the allotter 600, to seize the calling line and to switch the calling line through to the link circuit apparatus. The party at the calling telephone station then receives dial tone, indicating that a link has been seized and that the dialing operation may be started. The directory number of the called telephone station 2B comprising the tens digit 2, the units digit 0 and a code selecting digit, individual to the called telephone station 2B, is then dialed.

If, for example, the link illustrated is delegated by the allotter to the use of the calling line, the gang relay R270, the group unit relay R225 and the unit relay R220 in the finder switch 200 operate to connect the line 20 to the link circuit apparatus, and to ground the control conductor C1205 of the line 20, thereby marking the line 20 busy, in the manner previously explained. The path for marking the line 20 busy extends from ground at RA323 by way of C1300, C1264, RA228, C1258, RA224', and the contact springs of the gang relay R270 to the control conductor C1205 of the line 20, and over the control conductor C1205 of the line 20 to the contact springs of the gang relays in the various connector switches. After the tens digit 2 and the units digit 0 are dialed, the gang relay R570, the group unit relay R500 and the unit relay R520 in the connector switch 500, are caused to operate. The previously traced ground circuit, marking the line 20 as busy, is then extended from the contact springs of the gang relay R570 by way of RA526, C1368' and RA503 to the control conductor C1358, and from the control conductor C1358 by way of RA416, C1342, RA801, C1341 and the winding of the busy relay R420 to battery. The busy relay R420 now operates to complete at RA421 its previously traced holding circuit, and to complete at RA427 a circuit for energizing the reverting call relay R400. The operating circuit of the reverting call relay R400 extends from battery at R400 by way of the winding of R400, RA427, C1340, RA802, C1339, RA402, C1326, the contact springs of the gang relay R570 in the connector switch 500, a control conductor in the cable C1252, the contact springs of the gang relay R270 in the finder switch 200, C1222, RA229, C1260, RA221', the tenth conductor in the cable C1262, RA508, C1374 and RA527 to ground as extended to C1360.

Upon operating, the reverting call relay R400 completes at RA401, RA402 and RA404 a holding circuit for itself, this circuit extending from ground at RA304 by way of RA336, C1289, RA401, RA402, C1339, RA802, C1340, RA404 and the winding of R400 to battery. The reverting call relay R400 also places multiple ground at RA407 upon the conductor C1302 in order to initiate the operation of the code interrupter apparatus 1000, places multiple ground at RA406 upon the conductor C1300 in order to retain the tens relay R470, the units relay R480 and the group unit relay R500 in the connector switch 500 operated after the hold relay R320 restores in the manner to be described presently. As previously explained, the tens relay R470 and the units relay R480 retain operated the gang relay R570 and the unit relay R520 in the connector switch 500.

Following the operation of the reverting call relay R400, the link circuit apparatus is conditioned to respond to the impulses of the code selecting digit individual to the called telephone station 2B. At the end of the code selecting digit, the one of the counting relays which corresponds to the particular ringing code individual to the called telephone station is locked energized in the manner set forth above, thereby to prepare a circuit including the selected one of the ringing current conductors for applying ringing current to the proper side of the calling line. When the code selecting digit has been dialed, the calling party replaces his receiver upon its associated switch hook, thereby to interrupt the circuit over which the line relay R310 is being held energized. The line relay R310 now restores to interrupt the circuit over which the hold relay R320 is being held energized. Upon restoring, the hold relay R320 interrupts at RA324 the holding circuit of the busy relay R420, removes multiple ground at RA323 from the conductor C1300 and removes ground at RA321 from the conductor C1251. When ground is removed from the conductor C1251, the gang relay R270, the group unit relay R225 and the unit relay R220 in the finder switch 200 all restore, thereby releasing the finder switch 200 When the finder switch 200 is released, the circuit for holding the cut-off relay R120 and the lock-out relay R115 energized in series, is interrupted, and the cut-off relay R120 restores immediately. However, the lock-out relay R115, being of the slow-to-release type, does not restore immediately.

When the busy relay R420 restores, it completes at RA426 a circuit for energizing the switching relay R410, this circuit extending from battery at R410 by way of the winding of R410, RA426, RA487, RA477, C1348; one of the armatures RA817, RA827 and RA837, respectively, of the operated one and the relays R810, R820 and R830; RC806, RA804 and C1343, to the grounded conductor C1300. Upon operating, the switching relay R410 completes at RA418 a circuit for energizing the ring pick-up relay R430, grounds at RA416 the control conductor C1356, completes at RA419' the start circuit extending to the code interrupter apparatus 1000, and connects at RA411 and RA413 the link conductors C1281 and C1290 to the conductors for applying coded ringing current to the calling line and included in the circuit for energizing the ring cut-off relay R450. Ringing current of the selected code is now applied to one of the link conductors C1281 and C1290. If a code digit between 1 and 5, inclusive, has previously been dialed, the ringing current is conducted by way of the link conductor C1281 and one side of the calling line to the ringer at the calling telephone station, and if a code selecting digit between 6 and 0 has been dialed, the ringing current is conducted by way of C1290 and the other side of the calling line to the ringer at the called telephone station.

When the control conductor C1356 is grounded, a circuit is completed for reenergizing the cut-off relay R120 and for holding the lock-out relay R115 operated, thereby to mark the line 20 as busy in the connector switches to which it extends, this circuit extending from ground at RA416 by way of C1356, RA503, C1368', RA526, the contact springs of the gang relay R570, the control conductor C1205 of the line 20, the winding of R120 and the winding of R115 to battery.

When the call is answered at the called telephone station 2B, the previously traced operating circuit of the ring cut-off relay R450 is completed. Upon operating, the ring cut-off relay R450 interrupts at RA453 the holding circuit of the ring pick-up relay R430, causing the latter relay to restore. Upon restoring, the ring pick-up relay R430 connects at RA431 and RA432 the called party answer relay R365 across the link conductors C1281 and C1290. The called party answer relay R365 now operates and completes at RA366 the circuit for energizing the called party slave relay R330. Upon operating, the called party slave relay R330 interrupts at RA336 the holding circuit of the reverting call relay R400, and the latter relay restores. Upon restoring, the reverting call relay R400 removes ground at RA407 from the conductor C1302, thereby interrupting the start circuit extending the code interrupter apparatus 1000, and removes ground at RA406 from the hold conductor C1300. When ground is removed from the conductor C1300, the tens relay R470, the units relay R480 and the group unit relay R500 in the connector switch 500 restore. Upon restoring, the tens relay R470 and the units relay R480 interrupt the holding circuit of the gang relay R570 and the unit relay R520, respectively, in the connector switch 500, causing the latter relays to restore. Thus, the link is entirely released and is in readiness for further use.

When the connector switch 500 is released, ground is removed from the control conductor C1205 of the line 20 to interrupt the circuits over which the cut-off and lock-out relays R120 and R115 are being held energized. The lock-out relay R115, being of the slow-to-release type, does not restore immediately, while the cut-off relay R120 restores immediately. Upon restoring, the cut-off relay R120 connects at RA121 and RA122 the line relay R125 to the conductors C1203 and C1204, respectively, of the line 20, thereby completing the operating circuit of the line relay R125. The line relay R125 now operates and completes at RA127 the holding circuit of the lock-out relay, this circuit extending from ground at RA127 by way of RA117 and the winding of R115 to battery. Thus, the lock-out relay R115 is held operated until the connection is cleared out. This relay cooperates with the line relay R125 to hold ground on the control conductor C1205 of the line 20, thereby marking the line 20 busy in the various connector switches.

A reasonable time interval after the receiver at the calling telephone station 1B is replaced upon its associated switch hook, the calling party removes his receiver from its hook to ascertain whether the call at the called telephone station has been answered. Assuming that the call has been answered at the called telephone station 2B, a talking loop is completed between the calling and called telephone stations 1B and 2B, respectively. The connection is released in an obvious manner when the receivers at the telephone stations 1B and 2B are replaced upon their associated switch hooks. When this occurs the line and lock-out relays R125 and R115 are caused to restore in an obvious manner and in the order named.

*Operation of the alarm apparatus*

The alarm apparatus 860 comprises a relay R880 which is operated when an urgent faulty condition appears in the telephone system, and a relay R890 which is operated when a non-urgent faulty condition appears in the telephone system. The relay R880 is operated when one of the fuse links associated with the links of the telephone system is operated or blown and when one of the ring pick-up relays of a link fails to operate to apply code ringing current to the link. For example, if the fuse device F260', associated with the finder switch 200 in the link 300, should be blown, a circuit for operating the relay R880 is completed, this circuit extending from battery by way of the fuse device F260', the lower winding of the allotter relay R280 individual to the link 300, C1271 and the upper winding of R880 to ground. Also, if the ring pick-up relay R430 fails to operate to apply code ringing current to the link conductor C1281 or C1290 of the link 300, the relay R880 is operated, this circuit extending from battery at the ring pick-up relay R430 by way of the winding of R430, RA418, RA436, C1350, the contacts of an operated relay in the code interrupter apparatus 1000, C1353 and the lower winding of R880 to ground. The relay R890 is energized when a hot coil develops in the apparatus associated with the telephone system or when the exchange battery associated with a link of the telephone system needs charging. When a hot coil develops in the apparatus associated with the telephone system, a thermo-responsive device associated therewith completes a ground circuit through the upper winding of the relay R890 to battery at R890. When a battery associated with a link of the telephone system needs charging, a charge responsive device completes a ground circuit through the lower winding of the relay R890 to battery at R890. The alarm apparatus 860 also includes an audible alarm or buzzer 861 and a plurality of control relays R863, R866, R870 and R875. The relay R866 is normally energized over a circuit extending from ground at R866 by way of the winding of R866 and the resistor 862 to battery, and holds interrupted at RA869 an obvious operating circuit for the buzzer 861. When a fault appears in the telephone system, causing operation of the relay R880 or R890, a circuit is completed, extending from ground at RA885 or RA895 by way of RA877, RA864 and the resistor 862 to battery, thereby short-circuiting the winding of the relay R866. The relay R866 then restores and completes at RA869 the operating circuit of the buzzer 861 to give an audible alarm, prepares at RA 868 and the associated contact RC869' a circuit for energizing the relay R870, and completes at RA867 a circuit between the conductors C1401' and C1402' of the line 1400 connected to a trunk line extending to an alarm center.

When the circuit between the conductors C1401' and C1402' of the line 1400 is completed, an alarm is actuated at the alarm center over the trunk line connected to the line 1400. When the alarm is actuated in the alarm center, the control conductor C1403' of the line 1400 is grounded, thereby rendering the trunk line connected to the line 1400 busy. Upon grounding the conductor C1403' of the line 1400, the relay R870 is operated and completes at RA871 an obvious circuit for energizing the relay R875. Shortly thereafter, the relay R875, being of the slow-to-operate type, operates and completes at RA876 an obvious holding circuit for itself and interrupts at RA877 the short-circuit around the winding of the relay R866. The relay R866 re-operates and interrupts at RA867 the circuit between the conductors C1401' and C1402' of the line 1400 connected to the trunk extending to the alarm center, transfers its armature RA868 from the associated contact RC869' to the associated contact RC868', and interrupts at RA869 the operating circuit of the buzzer 861. When the circuit between the conductor C1401' and C1402' is interrupted at the armature RA867 of the relay R866, operation of the alarm in the alarm center is interrupted, and the trunk line extending between the line 1400 and the alarm center is rendered idle. The relay R870 then restores and interrupts at RA871 the original operating circuit of the relay R875. The relay R875 remains operated until the faulty condition causing the operation of the relay R880 or R890 is removed from the telephone system.

When the trunk line extending between the alarm center and the line 1400 is otherwise busy, ground is placed upon the control conductor C1403' of the line 1400, causing the relay R863 to operate, this circuit extending from the grounded conductor C1403' by way of RA868, RC868' and the winding of R863 to battery. Upon operating, the relay R863 interrupts at RA864 the short-circuit around the winding of the relay R866, thereby preventing restoration of the relay R866 until the trunk line extending between the alarm center and the line 1400 is idle, at which time the operating circuit of the relay R863 is interrupted, and shortly thereafter the relay R863, being of the slow-to-release type, restores. Upon restoring, the relay R863 completes at RA864 the short-circuit around the winding of the relay R866. The relay R866 then restores in order to actuate the alarm in the alarm center as previously described.

Also, when the relay R880 or R890 operates, ground at RA881 or RA891, respectively, is placed upon the start conductor C1314 of the busy and dial tone apparatus 840, thereby setting this apparatus into operation, and ground at RA882 or RA892, respectively, is placed upon the start conductor C1352 of the ringing apparatus 850, thereby setting this apparatus into operation.

Further, the alarm apparatus 860 includes a line 1411 comprising conductors C1404', C1405' and C1406' which is connected to the first line in the first 10-line group in the connector switches.

The line 1411 is under the control of the supervisory operator and is utilized by the supervisory operator to ascertain the operating condition of the apparatus in the exchange 10. This line may be connected to the telephone instrument of the supervisory operator by dialing the supervisory number 8111 comprising the prefix digit 8, the tens digit 1, the units digit 1 and the code selecting digit 1. Since the line 1411 connected to line 11 is utilized only by the supervisory operator, no line equipment is associated with line 11 in the telephone system.

In order to ascertain the condition of the telephone system, the supervisory operator dials the supervisory number 8111 and obtains a characteristic sound in the receiver of the telephone instrument at the supervisory operator station, indicating the operating condition of the telephone system. If the system is operating properly, the supervisory operator receives an interrupted tone in the receiver of her telephone instrument corresponding to the code digit 1. On the other hand, if a fault is present in the system, no tone is received by the supervisory operator if the fault is of the urgent type, and she receives a continuous tone derived directly from the ringing apparatus 850, if the fault is of the non-urgent type.

Battery is permanently connected to the conductor C1404' of the line 1411 in order to prevent operation of the busy relays of the links when the supervisory number 8111 is dialed. The conductors C1405' and C1406' are arranged to be under the control of the relays R880 and R890, as will be explained subsequently.

Upon dialing the supervisory number 8111, assuming that the link 300 is assigned for use, the connector switch 500 operates to seize the line 1411. Now, if no fault is present in the exchange 10, the conductors C1405' and C1406' of the line 1411 are open-circuited. Thus, the tone current of the ringing apparatus R850 is not applied to the link conductor C1281 by way of the line 1411 terminating in the connector switch 500. The usual coded ringing current corresponding to the code digit 1, is, however, applied to the link conductor C1281 from the code interrupter apparatus 1000, as previously explained. A corresponding ring-back tone current is applied to the link conductor C1261 from the link conductor C1281 by way of RA411, the condenser C1286[b], the link conductor C1286, the condenser C1286[a], the link conductor C1283, RA412, the link conductor C1262 and RA352, as previously explained. This ring-back tone current is conducted through the receiver of the supervisory operator's telephone, thereby indicating to the supervisory operator that no fault is present in the telephone system.

On the other hand, when the alarm in the alarm center is actuated by way of the line 1400 connected to the trunk line extending between the line 1400 and the alarm center, the supervisory operator may be advised that a fault is present in the telephone system. The supervisory operator then dials the supervisory number 8111 to ascertain the character of the fault. If the link illustrated is assigned to the call and the fault is of the urgent type, then the relay R880 has previously been operated to ground at RA884 the conductor C1405' of the line 1411 terminating in the connector switch 500. Hence, when the connector switch 500 seizes the line 1411, the ring cut-off relay R450 is immediately energized over a circuit extending from ground at RA884 by way of the conductor C1405' of the line 1411, the operated gang and unit relays in the connector switch 500, the link conductor C1290, RA413, RA432, RA442, RA451 and the upper winding of R450 to battery. The ring cut-off relay R450 now operates and interrupts at RA453 the operating circuit of the ring pick-up relay R430, causing the latter relay to restore to interrupt at RA431 the circuit for applying coded ringing current to the link conductor C1281 from the code interrupter apparatus 1000. Thus, no ring-back tone current is applied to the calling operator's loop from the code interrupter apparatus 1000. Moreover, the relay R880 interrupts at RA883 a point in the circuit extending between the conductor C1406' of the line 1411 and the conductor C1354, extending to the ringing apparatus 850. Accordingly, the ringing current of the ringing apparatus is not applied over the line 1411 to the calling operator's loop. Thus, the supervisory operator fails to receive any tone, thereby being informed that a fault of the urgent type is present in the exchange 10.

If the fault is of the non-urgent type, then the relay R890 is operated to ground at RA894 the conductor C1405' of the line 1411 terminating in the connector switch 500, and to complete at RA893 the connection between the conductor C1406' of the line 1411 and the conductor C1354 of the ringing apparatus 850. With the conductor C1405' of the line 1411 grounded, the ring cut-off relay R450 operates as described above, and, upon operating to connect the conductor C1406' of the line 1411 to the ringing apparatus 850, completes a circuit, extending from pulsating battery in the ringing apparatus 850 by way of the conductor C1354, RA893, the condenser 886, RA883, the conductor C1406' of the line 1411, the operated gang and unit relays in the connector switch 500 to the link conductor C1281, thereby applying the ringing current of the ringing apparatus 850 to the link conductor C1281. A corresponding ring-back current is applied to the link conductor C1261 through the previously traced circuit between the link conductors C1261 and C1281. This ring-back current is conducted through the receiver of the supervisory operator's telephone and indicates to the supervisory operator that a fault of the non-urgent type is present in the apparatus located in the exchange 10.

While there has been described what is at present considered to be the preferred embodiment of the invention, it will be understood that various modifications may be made therein, and it is intended to cover in the appended claims all such modifications as fall within the true spirit and scope of the invention.

I claim:

1. In a telephone system, a group of lines, said group of lines being divided into two subgroups comprising even and odd lines, respectively, a finder switch having access to said group of lines and operative to select a line therefrom, a group of unit relays and a subgroup relay in said finder switch, each of said unit relays being operative to select a corresponding line from each of said subgroups depending upon the operated or non-operated condition of said subgroup relay, means responsive to the initiation of a call on an even line for causing the operation of the corresponding unit relay and said subgroup relay, thereby to select said even calling line, and means responsive to the initiation of a call on an odd line for causing the operation of the corresponding unit relay without casing the operation of said subgroup relay, thereby to select said odd calling line.

2. In a telephone system, a group of lines, said lines being divided into two subgroups, a finder switch having access to said lines, a group of unit relays and a subgroup relay included in said switch, each of said unit relays being operative to select either of two lines of said group depending upon the operated or non-operated condition of said subgroup relay, the two lines corresponding to each unit relay being included in different ones of said two subgroups, a group of auxiliary relays individually corresponding to said unit relays, means responsive to the creation of a calling condition on one of said lines for causing the operation of one of said auxiliary relays, means responsive to the operation of said one auxiliary relay for causing the operation of said subgroup relay and the one of said unit relays which is operative to select said one line in the event said one line is in one of said subgroups, said last-named means also being operative to cause the operation of said one unit relay which is operative to select said one line without causing the operation of said subgroup relay in the event said one line is included in the other of said subgroups.

3. In a telephone system, a group of lines, said group of lines being divided into two subgroups comprising even and odd lines, respectively, a finder switch having access to said lines, a group of unit relays and a subgroup relay included in said switch, each of said unit relays being operative to select either of two lines of said group depending upon the operated or non-operated condition of said subgroup relay, the two lines corresponding to each unit relay being included in different ones of said two subgroups, a group of auxiliary relays individually corresponding to said unit relays, means responsive to the creation of a calling condition one one of said lines for causing the operation of one of said auxiliary relays, means responsive to the operation of said one auxiliary relay for causing the operation of said subgroup relay and the one of said unit relays which is operative to select said one line in the event said one line is in one of said subgroups, said last-named means also being operative to cause the operation of said one unit relay which is operative to select said one line without causing the operation of said subgroup relay in the event said one line is included in the other of said subgroups.

4. In a telephone system, a group of lines, said group of lines being divided into two subgroups, a finder switch having access to said group of lines and operative to select a line therefrom, a group of unit relays and a subgroup relay in said finder switch, each of said unit relays being operative to select a corresponding line from each of said subgroups depending upon the operated or non-operated condition of said subgroup relay, a group of auxiliary relays individually corresponding to said unit relays, means responsive to the initiation of a call on a line in one of said subgroups for causing the operation of one of said auxiliary relays, means responsive to the operation of said auxiliary relay for causing the operation of the corresponding unit relay and said subgroup relay, thereby to select the calling line, means responsive to the initiation of a call on a line in the other of said subgroups for causing the operation of another of said auxiliary relays, and means responsive to the operation of said last-mentioned auxiliary relay for causing the operation of the corresponding unit relay without causing the operation of said subgroup relay, thereby to select the calling line.

5. In a telephone system, a group of lines, said group of lines being divided into two subgroups, a finder switch having access to said group of lines and operative to select a line therefrom, a group of unit relays and a subgroup relay in said finder switch, an operating circuit for said subgroup relay and each of said unit relays, each of said unit relays being operative to select a corresponding line from each of said subgroups depending upon the operated or non-operated condition of said subgroup relay, a group of auxiliary relays individually corresponding to said unit relays, means responsive to the initiation of a call on a line in one of said subgroups for causing the operation of one of said auxiliary relays and for preparing the operating circuit of said subgroup relay, means responsive to the operation of said auxiliary relay for completing the operating circuit of the corresponding unit relay and for completing the operating circuit of said subgroup relay, thereby to select the calling line, means responsive to the initiation of a call on a line in the other of said subgroups for causing the operation of another of said auxiliary relays, and means responsive to the operation of said last-mentioned auxiliary relay for completing the operating circuit of the corresponding unit relay without causing the operation of said subgroup relay thereby to select the calling line.

6. In a telephone system, a group of lines, said group of lines being divided into two subgroups, a finder switch having access to said group of lines and operative to select a line therefrom, a group of unit relays and a subgroup relay in said finder switch, said subgroup relay being operable between two positions, an operating circuit for each of said unit relays, an operating circuit for said subgroup relay, each of said unit relays being operative to select a line from each of said subgroups depending upon the position of said subgroup relay, a first auxiliary relay, a group of second auxiliary relays individually corresponding to said unit relays, means responsive to the initiation of a call on a line in one of said subgroups for causing the operation of said first auxiliary relay and one of said second auxiliary relays, means responsive to the operation of said first auxiliary relay for preparing the operating circuit of said subgroup relay, contacts controlled by said second auxiliary relay for preparing the operating circuit of the corresponding unit relay, means responsive to the operation of said second auxiliary relay for completing the operating circuit of said corresponding unit relay and for completing the operating circuit of said subgroup relay to operate said subgroup relay to one of its positions, thereby to select the calling line, means responsive to the initiation of a call on a line in the other of said subgroups for causing the operation of another of said second auxiliary relays, and means responsive to the operation of said last-mentioned second auxiliary relay for completing the operating circuit of the corresponding unit relay while said subgroup relay occupies its other position, thereby to select the calling line.

7. In a telephone system, a number of lines divided into a plurality of groups, each of said groups of lines being divided into two subgroups, a finder switch having access to said number of lines and operative to select a line therefrom, a plurality of group relays, a group of unit relays and a subgroup relay in said finder switch, each of said group relays being operative to select a corresponding group of lines from said plurality of groups, each of said unit relays being operative to select a corresponding line from each of the subgroups depending upon the operated or non-operated condition of said subgroup relay, means responsive to the creation of a calling condition on a line in one of the subgroups in one of the groups for causing the substantially simultaneous operation of the corresponding group and unit relays and of said subgroup relay, thereby to select the calling line, and means responsive to the creation of a calling condition on a line in the other of the subgroups in one of the groups for causing the substantially simultaneous operations of the corresponding group and unit relays without causing the operation of said subgroup relay, thereby to select the calling line.

8. In a telephone system, a number of lines divided into a plurality of groups, each of said groups of lines being divided into two subgroups, a finder switch having access to said number of lines and operative to select a line therefrom, a plurality of group relays, a group of unit relays and a subgroup relay in said finder switch, an operating circuit for each of said group and unit relays, an operating circuit for said subgroup relay, each of said group relays being operative to select a corresponding group of lines from said plurality of groups, each of said unit relays being operative to select a corresponding line from each of the subgroups depending upon the operated or non-operated condition of said subgroup relay, means responsive to the initiation of a call on a line in one of said subgroups of a group of lines for completing substantially simultaneously the operating circuits of the corresponding group and unit relays and of the subgroup relay, thereby to select the calling line, and means responsive to the initiation of a call on a line in the other of said subgroups of a group of lines for completing substantially simultaneously the operating circuits of the corresponding group and unit relays without completing the operating circuit of said subgroup relay, thereby to select the calling line.

9. In a telephone system, a number of lines divided into a plurality of groups, each of said groups of lines being divided into two subgroups, a finder switch having access to said number of lines and operative to select a line therefrom, a plurality of group relays in said finder switch, a plurality of first auxiliary relays, a group of unit relays in said finder switch, a group of second auxiliary relays, a subgroup relay in said finder switch, each of said group relays being operative to select a corresponding group of lines from said plurality of groups, each of said unit relays being operative to select a corresponding line from each of the subgroups depending upon the operated or non-operated condition of said subgroup relay, said first auxiliary relays individually corresponding to said group relays, said second auxiliary relays individually corresponding to said unit relays, means responsive to the initiation of a call on a line in one of said subgroups of a group of lines for causing the operation of one of said first and one of said second auxiliary relays, means responsive to the operation of said first and second auxiliary relays for causing the substantially simultaneous operation of the corresponding group and unit relays and of said subgroup relay, thereby to select the calling line, means responsive to the initiation of a call on a line in the other of said subgroups of a group of lines for causing the operation of one of said first and one of said second auxiliary relays, and means responsive to the operation of said first and second auxiliary relays for causing the substantially simultaneous operation of the corresponding group and unit relays without causing the operation of said subgroup relay, thereby to select the calling line.

10. In a telephone system, a group of lines, a group of finder switches having access to said lines, a group of allotter relays individually corresponding to said finder switches, means for causing the operation of a previously assigned idle one of said finder switches to select one of said lines having a calling condition thereon, an operating circuit controlled by the operation of said previously assigned finder switch for energizing the corresponding allotter relay, a holding circuit for energizing said corresponding allotter relay, said holding circuit of said corresponding allotter relay being completed in response to the operation of said corresponding allotter relay, circuits controlled by the operation of said corresponding allotter relay for assigning an idle one of said finder switches to the use of the next one of said lines having a calling condition thereon and for preventing the assignment of said corresponding finder switch to the use of said lines having a calling condition thereon, and means responsive to the operation of another of said allotter relays for interrupting said holding circuit of said corresponding allotter relay, whereby said corresponding allotter relay restores in the event said corresponding finder switch is in a non-operated position.

11. In a telephone system, a group of lines, a group of finder switches having access to said lines, each of said finder switches including a control relay operative to cause the finder switch to select one of said lines having a calling condition thereon, operating circuits for said control relays, a group of allotter relays individually corresponding to said finder switches, means for completing the operating circuit of the control relay of a previously assigned idle one of said finder switches, an operating circuit controlled by the operation of said previously assigned finder switch for energizing the corresponding allotter relay, and means controlled by the operation of said corresponding allotter relay for interrupting a point in the operating circuit of the control relay of said previously assigned finder switch and for preparing the operating circuit of the control relay of an idle one of said finder switches, thereby to assign said last-mentioned finder switch to the use of the next one of said lines having a calling condition thereon.

12. In a telephone system, a group of lines, a group of finder switches having access to said lines, each of said finder switches including a control relay operative to cause the finder switch to select one of said lines having a calling condition thereon, operating circuits for said control relays, a group of allotter relays individually corresponding to said finder switches, means for completing the operating circuit of the control relay of a previously assigned idle one of said finder switches, an operating circuit controlled by the operation of said previously assigned finder switch for energizing the corresponding allotter relay, a holding circuit for energizing said corresponding allotter relay, said holding circuit of said corresponding allotter relay being completed in response to the operation of said corresponding allotter relay, means controlled by the operation of said corresponding allotter relay for interrupting a point in the operating circuit of the control relay of said previously assigned finder switch and for preparing the operating circuit of the control relay of an idle one of said finder switches, thereby to assign said last-mentioned finder switch to the use of the next one of said lines having a calling condition thereon, and means responsive to the operation of another of said allotter relays for interrupting said holding circuit of said corresponding allotter relay, whereby said corresponding allotter relay restores in the event said corresponding finder switch is in a non-operated position.

13. In a telephone system, a group of lines comprising a plurality of trunk lines and at least one subscriber line, a numerical switch having access to said lines, a first relay and a group of second relays in said switch, said second relays individually corresponding to said lines and being operative in conjunction with the operation of said first relay to select corresponding lines from said group, means responsive to a prefix digit followed by two predetermined and successive line selecting digits for causing the operation of said first relay and one of said second relays corresponding to said subscriber line, thereby to select said subscriber line, and means responsive to a prefix digit followed by two predetermined and successive line selecting digits including at least one digit different from said first-mentioned two line selecting digits for causing the operation of said first relay and one of said second relays corresponding to an idle one of said trunk lines, thereby to select said one trunk line.

14. In a telephone system, a group of lines comprising a plurality of trunk lines and at least one subscriber line, a numerical switch having access to said lines, a first relay and a group of second relays in said switch, said second relays individually corresponding to said lines and being operative in conjunction with the operation of said first relay to select corresponding lines from said group, means responsive to a prefix digit followed by a predetermined line selecting digit for causing the operation of said first relay, means responsive to a predetermined digit following said line selecting digit for causing the operation of the one of said second relays corresponding to said subscriber line, thereby to select said subscriber line, and means responsive to a different predetermined digit following said first-mentioned line selecting digit for causing the operation of one of said second relays corresponding to an idle one of said trunk lines, thereby to select said one trunk line.

15. In a telephone system, a group of lines comprising a plurality of trunk lines and at least one subscriber line, a pair of numerical switches having access to said lines, a first relay and a group of second relays in each of said switches, said second relays individually corresponding to said lines and being operative in conjunction with the operation of the associated first relay to select corresponding lines from said group, means responsive to a predetermined digit transmitted to one of said switches for causing the operation of said first relay in said one switch, means responsive to a predetermined digit transmitted to said one switch following said first-mentioned digit for causing the operation of the one of said second relays in said one switch corresponding to said subscriber line, thereby to select said subscriber line, means responsive to a different predetermined digit transmitted to said one switch following said first-mentioned digit for causing the operation of a previously conditioned one of said second relays in said one switch corresponding to an idle trunk line, thereby to select said one trunk line, and means responsive to the selection of said one trunk line for conditioning another of the second relays in the other of said switches and corresponding to another idle trunk line to be operated when said different digit is again dialed following said first-mentioned digit.

16. In a telephone system, a plurality of groups of lines comprising at least one group including a plurality of trunk lines and at least one subscriber line, a numerical switch having access to said lines, a group of first relays and a group of second relays in said switch, said first relays individually corresponding to said groups and said second relays individually corresponding to a particular line in each of said groups, each of said first relays being operative in conjunction with the operation of said second relays to select corresponding lines from corresponding groups selected from said plurality of groups, means responsive to a prefix digit followed by a predetermined line selecting digit for causing the operation of the one of said first relays corresponding to said one group, means responsive to a predetermined digit following said line selecting digit for causing the operation of the one of said second relays corresponding to said subscriber line, thereby to select said subscriber line, and means responsive to a different predetermined digit following said line selecting digit for causing the operation of one of said second relays corresponding to an idle one of said trunk lines, thereby to select said one trunk line.

17. In a telephone system, a plurality of groups of lines comprising at least one group including a plurality of trunk lines and at least one subscriber line, a pair of numerical switches having access to said lines, a group of first relays and a group of second relays in each of said switches, said first relays individually corresponding to said groups and said second relays individually corresponding to a particular line in each of said groups, each of said first relays being operative in conjunction with the operation of the associated second relays to select corresponding lines from corresponding groups selected from said plurality of groups, means responsive to a predetermined digit transmitted to one of said switches for causing the operation of the one of said first relays in said one switch corresponding to said one group, means responsive to a predetermined digit transmitted to said one switch following said first-mentioned digit for causing the operation of the one of said second relays in said one switch corresponding to said subscriber line, thereby to select said subscriber line, means responsive to a different predetermined digit transmitted to said one switch following said first-mentioned digit for causing the operation of a previously conditioned one of said second relays in said one switch and corresponding to one idle trunk line, thereby to select said one trunk line, and means responsive to the selection of said one trunk line for conditioning another of said second relays embodied in the other of said switches and corresponding to another idle trunk line to be operated when said different digit is again dialed following said first-mentioned digit.

18. In a telephone system, a group of lines comprising a plurality of trunk lines and at least one subscriber line, a numerical switch having access to said group of lines and operative to select a line therefrom, means responsive to a predetermined digit and a predetermined digit following said first-mentioned digit for causing the operation of said switch to select said subscriber line, means responsive to said first-mentioned digit and a different predetermined digit following said first-mentioned digit for causing the operation of said switch to select a previously assigned idle one of said trunk lines, and means responsive to the selection of said one trunk line for assigning another idle one of said trunk lines to be selected when said different digit is again dialed following said first-mentioned digit.

19. In a telephone system, a group of first trunk lines, a group of second trunk lines, and a group of subscriber lines, a numerical switch having access to said groups of lines and operative to select a line therefrom, means responsive to a predetermined digit and a predetermined digit following said first-mentioned digit for causing the operation of said switch to select an idle trunk line from said group of first trunk lines or to select a particular subscriber line from said group of subscriber lines depending upon the character of said second-mentioned digit, and means responsive to a single predetermined digit for causing the operation of said switch to select an idle trunk line from said group of second trunk lines.

20. In an automatic telephone system wherein the digits P, X, Y and Z of different character may be dialed at calling telephone stations for automatic switch control purposes, a group of first trunk lines, a group of second trunk lines, and a group of subscriber lines, a numerical switch having access to said groups of lines and operative to select a line therefrom, means responsive to the prefix digit P, the digit X and the digit Y dialed in the order named for causing the operation of said switch to select an idle trunk line from said group of first trunk lines, means responsive to the prefix digit P, the digit X and the digit X or Z dialed in the order named for causing the operation of said switch to select a particular subscriber line from said group of subscriber lines, and means responsive to the digit X dialed alone for causing the operation of said switch to select an idle trunk line from said group of second trunk lines.

21. In a telephone system, a plurality of lines divided into groups, an automatic switch having access to said lines and operative to select a desired line therefrom, said switch including means responsive to impulses transmitted to said switch, said impulses being divided into a plurality of digits including at least two line selecting digits, means responsive to the operation of said first-named means during the impulses of certain first digits transmitted to said switch for causing said switch to select the groups of lines corresponding to said first digits, and means responsive to the operation of said first-named means during the impulses of a predetermined first digit preceding all line selecting digits for conditioning said switch to select a predetermined group of said lines when the impulses of a predetermined second digit are transmitted to said switch.

22. In a telephone system, a plurality of lines divided into groups, an automatic switch having access to said lines and including group relays individually corresponding to said groups of lines, said switch including a group of impulse counting relays sequentially operative in response to succeeding impulses transmitted to said switch, said impulses being divided into digits including at least two line selecting digits, means controlled by certain of said impulse counting relays for causing the operation of corresponding ones of said group relays at the end of certain first digits transmitted to said switch, and means controlled by one of said impulse counting relays and operative at the end of a predetermined first digit preceding all line selecting digits for conditioning one of said group relays to be operated at the end of a second predetermined digit.

23. In a telephone system, a plurality of lines divided into groups, an automatic switch having access to said lines and including group relays individually corresponding to said groups of lines, operating circuits for said relays, said switch including a group of impulse counting relays sequentially operative in response to succeeding impulses transmitted to said switch, said impulses being divided into digits including at least two line selecting digits, means controlled by certain of said impulse counting relays for completing the operating circuits of corresponding group relays at the end of certain first digits of impulses transmitted to said switch, means controlled by one of said impulse counting relays and operative at the end of a predetermined first digit preceding all line selecting digits for preparing the operating circuit for a predetermined one of said group relays, and means controlled by one of said impulse counting relays and operative at the end of a predetermined second digit transmitted to said switch for completing said prepared operating circuit.

24. In a telephone system, a plurality of lines divided into groups, an automatic switch having access to said lines and including group relays individually corresponding to said groups of lines, operating circuits for said relays, said switch including a group of impulse counting relays sequentially operative in response to succeeding impulses transmitted to said switch, said impulses being divided into digits including at least two line selecting digits, means controlled by certain of said impulse counting relays for completing the operating circuits of corresponding group relays at the end of certain first digits transmitted to said switch, means controlled by one of said impulse counting relays and operative at the end of a predetermined first digit preceding all line selecting digits for preparing the operating circuits for predetermined ones of said group relays, and means controlled by certain of said impulse counting relays and operative at the end of a second digit transmitted to said switch for completing the prepared operating circuit of the group relay corresponding to said second digit.

25. In a telephone system, a plurality of lines divided into groups, an automatic switch having access to said lines and including group relays individually corresponding to said lines and unit relays individually corresponding to the lines of each group, said switch including a group of impulse counting relays sequentially operative in response to succeeding impulses transmitted to said switch, means controlled by one of said impulse counting relays and operative at the end of a predetermined single digit transmitted to said switch for causing the operation of one of said group relays and one of said unit relays, means controlled by certain of said counting relays for causing the operation of corresponding ones of said group relays at the end of certain first digits transmitted to said switch, and means controlled by one of said first impulse counting relays and operative at the end of a predetermined first digit transmitted to said switch for conditioning one of said group relays to be operated at the end of a predetermined second digit transmitted to said switch.

26. In a telephone system, a plurality of lines divided into groups, an automatic switch having access to said lines and including group relays individually corresponding to said lines and unit relays individually corresponding to the lines of each group, operating circuits for said relays, said switch including a group of impulse counting relays sequentially operative in response to succeeding impulses transmitted to said switch, means controlled by one of said impulse counting relays and operative at the end of a predetermined single digit transmitted to said switch for completing the operating circuit for one of said group relays and the operating circuit for one of said unit relays, means controlled by certain of said counting relays for completing the operating circuits of corresponding ones of said group relays at the end of certain first digits transmitted to said switch, means controlled by one of said impulse counting relays and operative at the end of a predetermined first digit transmitted to said switch for preparing the operating circuit for one of said group relays, and means controlled by one of said counting relays and operated at the end of a predetermined second digit transmitted to said switch for completing said prepared operating circuit.

27. In an automatic telephone system, a finder switch for connecting with calling lines, said switch comprising a plurality of tens relays, each adapted to select a group of ten lines, a plurality of units relays, each adapted to select two lines from the group selected by any tens relay, a switching relay for selecting one line from the two selected by any units relay, and means controlled over any calling line for selectively energizing said relays.

28. In an automatic telephone system, a trunk line, a finder switch for extending said trunk line to calling lines, said finder switch comprising tens and units relays, means responsive to a call for energizing one tens relay and one units relay, contacts on the energized relays for selecting the calling line and another line, and relay means controlled over the calling line for making a selection between the calling line and said other line and for connecting the calling line through the contacts of the energized tens and units relays to said trunk line.

29. In an automatic telephone system, a finder switch for connecting with calling lines, said lines being divided into groups and each group being divided into two sub-groups, a plurality of main selecting relays each adapted to select all the lines of a group, a plurality of auxiliary selecting relays each adapted to select corresponding lines from the two sub-groups of the group selected by any main selecting relay, means for selecting one or the other of the two lines selected by any auxiliary relay, and means whereby said main and auxiliary relays and said selecting means are controlled over calling lines.

30. In an automatic telephone system, a finder switch comprising three orders of relays providing for three stages of selection, a trunk line, control relays responsive to a call, circuits completed by said control relays for energizing a relay of each of said three orders, and contacts on the energized relays for connecting the calling line to said trunk line.

31. In a telephone system, a finder switch comprising a plurality of group relays each including contact sets for terminating the conductors of a group of lines, a plurality of unit relays and a subgroup relay, a trunk line including talking conductors, said unit and sub-group relays including contacts operative in different combinations to connect the talking conductors of said trunk line to contacts of any contact set of any of said group relays, a line including talking conductors terminating at the contacts of one of the contact sets of one of said group relays, and means responsive to the initiation of a call on said line for energizing said one group relay, said sub-group relay and one of said unit relays, thereby to connect the talking conductors of said line to the talking conductors of said trunk line through the contacts of the energized group, unit and sub-group relays.

32. In a telephone system, a finder switch comprising a plurality of group relays each including contact sets for terminating the conductors of a group of lines, a plurality of unit relays and a sub-group relay, a trunk line including talking conductors, said unit and sub-group relays including contacts operative in different combinations to connect the talking conductors of said trunk line to contacts of any contact set of any of said group relays, a first line including talking conductors terminating at the contacts of one of the contact sets of one of said group relays, a second line also including talking conductors terminating at the contacts of one of the contact sets of one of said group relays, means responsive to the initiation of a call on said first line for energizing said sub-group relay and the group and unit relays which correspond to said first line, thereby to connect the talking conductors of said first line to the talking conductors of said trunk line through the contacts of the energized group, unit and sub-group relays, and means responsive to the initiation of a call on said second line for energizing the group and unit relays which corresponds to said second line without energizing said sub-group relay, thereby to connect the talking conductors of said second line to the talking conductors of said trunk line through the contacts of the energized group and unit relays and the contacts of the deenergized sub-group relay.

33. In a relay type connector, a plurality of group relays, one and two digit groups of lines adapted to be selected by said relays, the two digit groups having the same prefix, counting relays, marking conductors normally extending from certain of said counting relays to the single digit group relays, a relay for switching said marking conductors from the single digit group relays to the two digit group relays, and a marking conductor extending from the counting relay which corresponds to the prefix digit to said switching relay.

34. In a relay automatic exchange, a connector having group and units relays for extending connections to called lines, a train of counting relays for controlling said group and units relays, a marking conductor extending from contacts of one counting relay to one of said group relays, a marking conductor extending from contacts of another counting relay to the same group relay, and a relay for switching said last mentioned marking conductor to another group relay.

35. In a relay automatic exchange, a connector having group and units relays for extending connections to called lines, a train of counting relays for controlling said group relays, a marking conductor selectable by one of said counting relays and extending to one of said group relays, a relay for switching said marking conductor to another group relay, means for energizing either group relay over said marking conductor, and means including a marking conductor selectable by another of said counting relays for energizing said switching relay.

36. In a relay type connector, group relays having access to called lines, counting relays for selectively energizing said group relays, marking conductors over which such energization is effected, additional group relays in said connector, relay switching means, means for energizing said switching means, and contacts operated by said switching means for switching said marking conductors from said first mentioned group relays to said additional group relays, whereby the latter relays may be selectively energized under control of said counting relays.

37. In a relay automatic exchange, a relay connector having group relays for connecting with groups of lines, counting relays responsive to group selecting digits, marking conductors corresponding to the respective group digits selected by said counting relays for energizing said group relays, a connection from one marking conductor to another marking conductor to energize the group relay corresponding to said other marking conductor, and means for switching said one marking conductor from said other marking conductor to another group relay.

38. In a relay automatic exchange, a connector including group and units relays, two groups of trunk lines accessible to said connector through contacts of said units relays and two of said group relays, means effective in case either group of trunk lines is called for energizing the corresponding group relay responsive to the dialing of a digit, units relay control apparatus common to said connector and other connectors, means effective automatically in response to the energization of the group relay corresponding to one of said groups of trunk lines for operating one of said units relays corresponding to an idle trunk line in said one group of trunk lines, and means effective in case the group relay corresponding to the other group of trunk lines is energized for operating one of said units relays corresponding to an idle trunk line in said other group of trunk lines in response to the dialing of another digit.

FRANK KESSLER.